(12) United States Patent
Ludden et al.

(10) Patent No.: US 10,311,825 B2
(45) Date of Patent: Jun. 4, 2019

(54) DISPLAY DRIVER

(71) Applicant: National Semiconductor Corporation, Santa Clara, CA (US)

(72) Inventors: Christopher Ludden, Pittsford, NY (US); Imre Knausz, Fairport, NY (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 0 days.

(21) Appl. No.: 15/044,090

(22) Filed: Feb. 15, 2016

(65) Prior Publication Data

US 2016/0163277 A1 Jun. 9, 2016

Related U.S. Application Data

(60) Continuation of application No. 13/559,743, filed on Jul. 27, 2012, now Pat. No. 9,264,682, which is a
(Continued)

(51) Int. Cl.
*H04N 9/69* (2006.01)
*G09G 3/36* (2006.01)

(52) U.S. Cl.
CPC ......... *G09G 3/3696* (2013.01); *G09G 3/3607* (2013.01); *G09G 3/3688* (2013.01);
(Continued)

(58) Field of Classification Search
CPC .. G09G 3/3648; G09G 3/3696; G09G 3/3607; G09G 3/3611; G09G 3/3688;
(Continued)

(56) References Cited

U.S. PATENT DOCUMENTS 6,281,944 B1 8/2001 Kim
7,081,901 B1 7/2006 Ludden et al.
(Continued)

FOREIGN PATENT DOCUMENTS

EP 0654908 A1 5/1995
JP 2005-49868 2/2005
(Continued)

*Primary Examiner* — Nitin Patel
*Assistant Examiner* — Amen W Bogale
(74) *Attorney, Agent, or Firm* — Andy Viger; Charles A. Brill; Frank D. Cimino

(57) ABSTRACT

An LC display driver including a gamma reference circuit to generate N gamma-compensated reference voltages based on at least one pre-defined gamma curve divided into M regions defined by M+1 breakpoint voltages, each generated by a range-region DAC coupled to a subset of voltage taps of a range resistor string (some subsets overlapping). An output circuit generates the N gamma-compensated reference voltages, and includes a reference resistor string with N reference voltage taps, and M+1 breakpoint locations to receive respective breakpoint voltages, the N reference voltage taps divided into M subsets corresponding to the M regions of the gamma curve, each of the M subsets of reference voltage taps forming a voltage divider. N output selector circuits output a corresponding one of the N gamma-compensated reference voltages based on a respective reference voltage tap and the associated voltage divider.

20 Claims, 29 Drawing Sheets

Related U.S. Application Data division of application No. 12/128,169, filed on May 28, 2008, now abandoned.

(60) Provisional application No. 60/932,910, filed on Jun. 1, 2007.

(52) U.S. Cl.
CPC ....... *H04N 9/69* (2013.01); *G09G 2310/0297* (2013.01); *G09G 2320/0276* (2013.01); *G09G 2320/0673* (2013.01); *G09G 2330/021* (2013.01)

(58) Field of Classification Search
CPC .. G09G 3/3614; G09G 3/3685; G09G 3/3275; G09G 3/3283; G09G 3/2011; G09G 3/3291; G09G 3/3677; G09G 3/2007; G09G 2320/0276; G09G 2320/0673; G09G 2320/0271; G09G 2310/027
See application file for complete search history.

(56) References Cited

U.S. PATENT DOCUMENTS

| | | | |
|---|---|---|---|
| 7,176,869 B2 | 2/2007 | Kumada et al. | |
| 7,868,864 B2 | 1/2011 | Hsieh | |
| 8,072,394 B2 | 12/2011 | Ludden et al. | |
| 9,264,682 B2 * | 2/2016 | Ludden | G09G 3/3688 |
| 2003/0151616 A1 * | 8/2003 | Morita | G09G 3/2011 |
| | | | 345/690 |
| 2003/0151617 A1 | 8/2003 | Morita | |
| 2004/0036706 A1 * | 2/2004 | Endou | G09G 3/3233 |
| | | | 345/690 |
| 2005/0168416 A1 * | 8/2005 | Hashimoto | G09G 3/3233 |
| | | | 345/76 |
| 2005/0200584 A1 | 9/2005 | Kudo et al. | |
| 2006/0023001 A1 | 2/2006 | Sung | |
| 2006/0033695 A1 | 2/2006 | Kudo et al. | |
| 2006/0038764 A1 | 2/2006 | Takahashi et al. | |
| 2006/0087483 A1 * | 4/2006 | Takada | G09G 3/3688 |
| | | | 345/89 |
| 2007/0001974 A1 * | 1/2007 | Kumagai | G09G 3/20 |
| | | | 345/98 |
| 2007/0002061 A1 | 1/2007 | Kumagai et al. | |
| 2007/0018922 A1 * | 1/2007 | Lee | G09G 3/3696 |
| | | | 345/89 |
| 2007/0057884 A1 * | 3/2007 | Akai | G09G 3/3688 |
| | | | 345/89 |
| 2007/0090983 A1 * | 4/2007 | Yen | G09G 3/3611 |
| | | | 341/155 |
| 2007/0229435 A1 | 10/2007 | Lee | |
| 2007/0262972 A1 * | 11/2007 | Nakata | G09G 3/3696 |
| | | | 345/204 |
| 2008/0048935 A1 * | 2/2008 | Yoshioka | G09G 3/3688 |
| | | | 345/55 |
| 2008/0055135 A1 * | 3/2008 | Li | H03M 1/765 |
| | | | 341/144 |
| 2008/0303836 A1 | 12/2008 | Ludden et al. | |

FOREIGN PATENT DOCUMENTS

| | | |
|---|---|---|
| JP | 2006-146134 | 6/2006 |
| KR | 10-1999-017529 A | 3/1999 |

\* cited by examiner

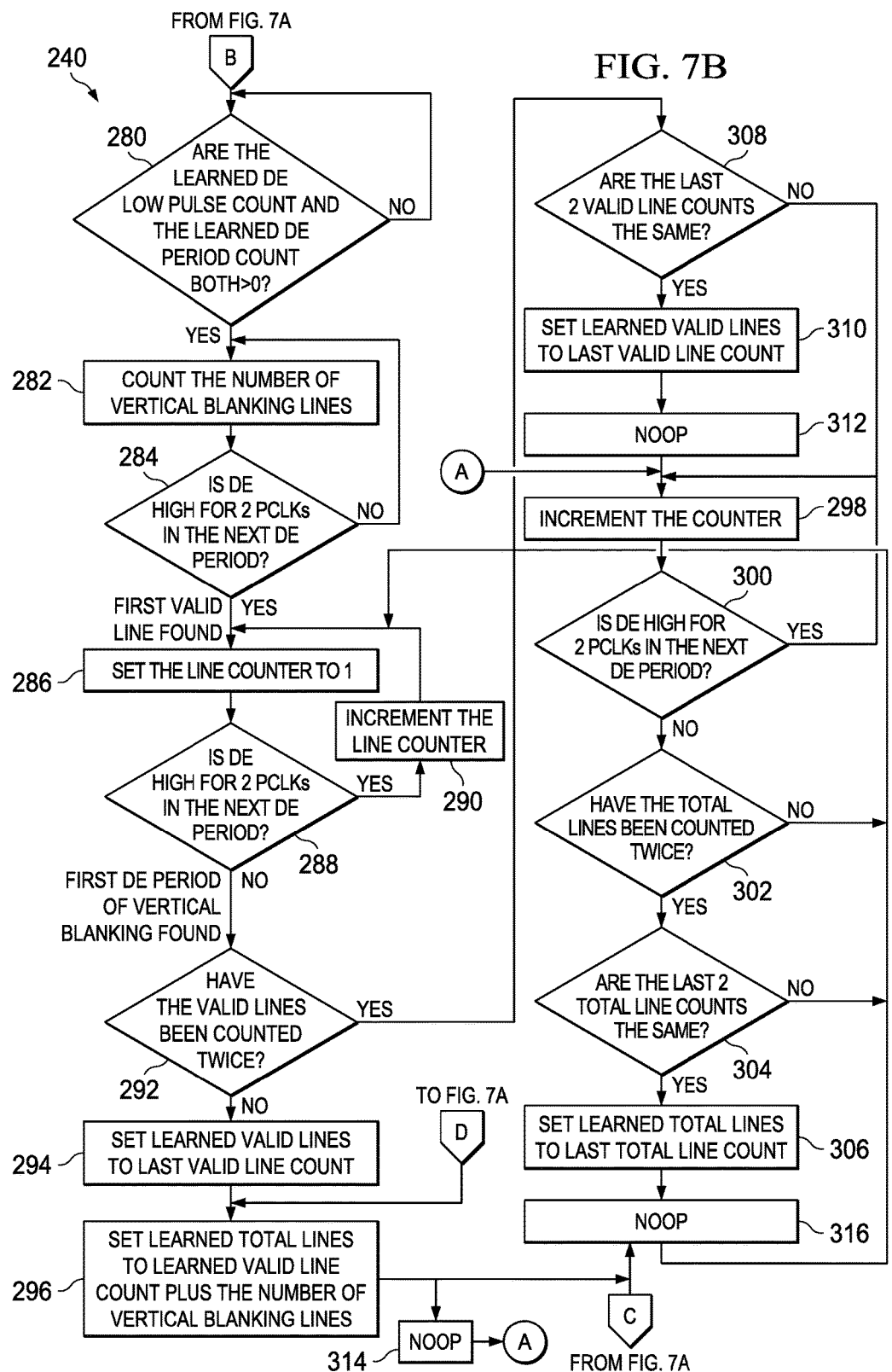

FIG. 24A

| GREY LEVEL | OUTPUT VOLTAGES | | | | | |
|---|---|---|---|---|---|---|
| | CURVE 00 | CURVE 01 | CURVE 10 | CURVE 11 | | |
| 0 | | | | | | V0 |
| 1 | 11.2% | 12.4% | 39.0% | 9.6% | OF (V7-V0) | + V0 |
| 2 | 24.5% | 22.0% | 50.0% | 22.7% | OF (V7-V0) | + V0 |
| 3 | 39.9% | 41.2% | 60.0% | 38.8% | OF (V7-V0) | + V0 |
| 4 | 53.4% | 57.2% | 69.0% | 55.0% | OF (V7-V0) | + V0 |
| 5 | 68.9% | 73.2% | 79.0% | 70.8% | OF (V7-V0) | + V0 |
| 6 | 84.5% | 87.6% | 90.0% | 83.9% | OF (V7-V0) | + V0 |
| 7 | | | | | | V7 |
| 8 | 8.4% | 8.8% | 7.9% | 7.4% | OF (V24-V7) | + V7 |
| 9 | 18.1% | 18.2% | 15.7% | 14.7% | OF (V24-V7) | + V7 |
| 10 | 23.7% | 24.2% | 24.4% | 20.6% | OF (V24-V7) | + V7 |
| 11 | 32.0% | 30.8% | 31.5% | 27.9% | OF (V24-V7) | + V7 |
| 12 | 38.9% | 36.8% | 38.6% | 33.8% | OF (V24-V7) | + V7 |
| 13 | 45.9% | 42.8% | 45.7% | 39.7% | OF (V24-V7) | + V7 |
| 14 | 51.4% | 48.2% | 51.2% | 47.1% | OF (V24-V7) | + V7 |
| 15 | 57.0% | 53.5% | 55.9% | 52.9% | OF (V24-V7) | + V7 |
| 16 | 62.5% | 58.8% | 63.0% | 58.9% | OF (V24-V7) | + V7 |
| 17 | 68.1% | 64.8% | 67.7% | 64.7% | OF (V24-V7) | + V7 |
| 18 | 72.3% | 71.5% | 73.2% | 70.6% | OF (V24-V7) | + V7 |
| 19 | 77.8% | 75.5% | 78.7% | 75.0% | OF (V24-V7) | + V7 |
| 20 | 81.9% | 78.8% | 82.7% | 80.9% | OF (V24-V7) | + V7 |
| 21 | 86.2% | 83.5% | 87.4% | 86.8% | OF (V24-V7) | + V7 |
| 22 | 90.4% | 88.8% | 91.3% | 91.2% | OF (V24-V7) | + V7 |
| 23 | 95.8% | 94.2% | 96.9% | 95.6% | OF (V24-V7) | + V7 |
| 24 | | | | | | V24 |
| 25 | 3.3% | 2.8% | 4.1% | 3.5% | OF (V56-V24) | + V24 |
| 26 | 5.5% | 4.9% | 6.8% | 7.0% | OF (V56-V24) | + V24 |
| 27 | 8.8% | 7.6% | 11.6% | 10.4% | OF (V56-V24) | + V24 |
| 28 | 12.1% | 10.3% | 13.7% | 14.0% | OF (V56-V24) | + V24 |
| 29 | 15.5% | 14.5% | 17.1% | 17.5% | OF (V56-V24) | + V24 |
| 30 | 18.7% | 17.2% | 19.9% | 19.7% | OF (V56-V24) | + V24 |

FROM FIG. 24A

| | | | | | | |
|---|---|---|---|---|---|---|
| 31 | 22.0% | 20.9% | 23.3% | 23.3% | OF (V56-V24) | + V24 |
| 32 | 24.3% | 23.6% | 26.7% | 26.8% | OF (V56-V24) | + V24 |
| 33 | 27.5% | 26.3% | 30.1% | 29.0% | OF (V56-V24) | + V24 |
| 34 | 30.8% | 29.5% | 32.2% | 32.6% | OF (V56-V24) | + V24 |
| 35 | 32.9% | 31.6% | 35.6% | 36.1% | OF (V56-V24) | + V24 |
| 36 | 36.3% | 34.8% | 38.4% | 38.3% | OF (V56-V24) | + V24 |
| 37 | 39.6% | 37.5% | 41.1% | 41.9% | OF (V56-V24) | + V24 |
| 38 | 42.9% | 40.7% | 45.2% | 44.2% | OF (V56-V24) | + V24 |
| 39 | 45.1% | 43.3% | 47.9% | 47.6% | OF (V56-V24) | + V24 |
| 40 | 48.4% | 46.0% | 50.7% | 50.0% | OF (V56-V24) | + V24 |
| 41 | 51.7% | 49.2% | 53.4% | 53.5% | OF (V56-V24) | + V24 |
| 42 | 53.9% | 51.9% | 56.8% | 55.8% | OF (V56-V24) | + V24 |
| 43 | 57.2% | 55.1% | 59.6% | 59.3% | OF (V56-V24) | + V24 |
| 44 | 60.5% | 57.2% | 62.3% | 61.7% | OF (V56-V24) | + V24 |
| 45 | 63.8% | 60.4% | 65.1% | 65.1% | OF (V56-V24) | + V24 |
| 46 | 66.0% | 63.6% | 67.8% | 67.5% | OF (V56-V24) | + V24 |
| 47 | 69.3% | 66.3% | 71.2% | 71.0% | OF (V56-V24) | + V24 |
| 48 | 72.6% | 69.5% | 74.7% | 73.3% | OF (V56-V24) | + V24 |
| 49 | 75.8% | 72.7% | 77.4% | 76.8% | OF (V56-V24) | + V24 |
| 50 | 79.1% | 75.3% | 80.1% | 80.3% | OF (V56-V24) | + V24 |
| 51 | 82.4% | 78.5% | 83.6% | 82.6% | OF (V56-V24) | + V24 |
| 52 | 85.7% | 81.7% | 86.3% | 86.1% | OF (V56-V24) | + V24 |
| 53 | 89.0% | 84.9% | 89.7% | 89.6% | OF (V56-V24) | + V24 |
| 54 | 92.4% | 88.7% | 93.2% | 93.0% | OF (V56-V24) | + V24 |
| 55 | 96.7% | 94.5% | 97.3% | 96.5% | OF (V56-V24) | + V24 |
| 56 | | | | | | V56 |
| 57 | 11.9% | 4.5% | 5.6% | 6.9% | OF (V63-V56) | + V56 |
| 58 | 23.5% | 8.5% | 12.1% | 11.9% | OF (V63-V56) | + V56 |
| 59 | 35.4% | 16.5% | 19.6% | 20.4% | OF (V63-V56) | + V56 |
| 60 | 47.0% | 24.5% | 28.0% | 27.1% | OF (V63-V56) | + V56 |
| 61 | 61.8% | 31.8% | 37.4% | 37.3% | OF (V63-V56) | + V56 |
| 62 | 79.3% | 50.5% | 50.5% | 54.2% | OF (V63-V56) | + V56 |
| 63 | | | | | | V63 |

DISPLAY DRIVER

CROSS-REFERENCE TO RELATED APPLICATIONS

This application is a continuation of U.S. patent application Ser. No. 13/559,743, filed on Jul. 27, 2012, which is a divisional of U.S. patent application Ser. No. 12/128,169, filed on May 28, 2008 (U.S. Pat. No. 8,072,394), which claims priority from U.S. Provisional Patent Application No. 60/932,910, filed on Jun. 1, 2007. Each of these applications is incorporated herein by reference for all purposes.

BACKGROUND

Liquid Crystal Displays (LCDs) are used in a variety of products, including cell phone, digital music players, personal digital assistants, web browsing devices, and smart phones such as the announced Apple I-phone that combines one or more of the foregoing into a single, handheld apparatus. Other uses are in hand-held games, hand-held computers, and laptop/notebook computers. These displays are available in both gray-scale (monochrome) and color forms, and are typically arranged as a matrix of intersecting rows and columns. The intersection of each row and column forms a pixel, or dot, the density, and/or color of which can be varied in accordance with the voltage applied to the pixel in order to define the gray shades of the liquid crystal display. These various voltages produce the different shades of color on the display, and are normally referred to as "shades of gray" even when speaking of a color display.

The image displayed on the screen may be controlled by individually selecting one row of the display at a time, and applying control voltages to each column of the selected row. The period during which each such row is selected may be referred to as a "row drive period." This process is carried out for each individual row of the screen; for example, if there are 480 rows in the array, then there are typically 480 row drive periods in one display cycle. After the completion of one display cycle during which each row in the array has been selected, a new display cycle begins, and the process is repeated to refresh and/or update the displayed image. Each pixel of the display is periodically refreshed or updated many times each second, both to refresh the voltage stored at the pixel as well as to reflect any changes in the shade to be displayed by such pixel over time.

Liquid crystal displays used in computer screens require a relatively large number of such channel driver outputs. Channel drivers are coupled to a source terminal of a thin film resistor that is fabricated onto the glass of the LCD. Many smaller display devices, including cameras, cell phones and personal digital assistants, have sensors that detect the orientation of the display. Such devices may change the view from portrait format to landscape format, depending upon the orientation of the device. Columns, which are vertical, become horizontal during landscape orientation. However, the same structure (the column) is still the driven structure, even though it assumes the orientation of a row. In order to avoid confusion, this patent shall refer to "channel driver" and that shall mean the structure for driving the source terminal of the thin film pass transistor.

Color displays typically require three times as many channel drivers as conventional "monochrome" LCD displays; such color displays usually require three columns per pixel, one for each of the three primary colors to be displayed. The channel driver circuitry is typically formed upon monolithic integrated circuits. Integrated circuits serve as channel drivers for active matrix LCD displays and generate different output voltages to define the various "gray shades" on a liquid crystal display. These varying analog output voltages vary the shade of the color that is displayed at a particular point, or pixel, on the display. The channel driver integrated circuit must drive the analog voltages onto the columns of the display matrix in the correct timing sequence.

LCDs are able to display images because the optical transmission characteristics of liquid crystal material change in accordance with the magnitude of the applied voltage. However, the application of a steady DC voltage to a liquid crystal will, over time, permanently change and degrade its physical properties. For this reason, it is common to drive LCDs using drive techniques which charge each liquid crystal with voltages of alternating polarities relative to a common midpoint voltage value. It should be noted that, in this context, the "voltages of alternating polarities" does not necessarily require the use of driving voltages that are greater than, and less than, ground potential, but simply voltages that are above and below a predetermined median display bias voltage. The application of alternating polarity voltages to the pixels of the display is generally known as inversion.

Accordingly, driving a pixel of liquid crystal material to a particular gray shade involves two voltage pulses of equal magnitude but opposite polarity relative to the median display bias voltage. The driving voltage applied to any given pixel during its row drive period of one display cycle is typically reversed in polarity during its row drive period on the next succeeding display cycle. The pixel responds to the RMS value of the voltage so the final "brightness" of the pixel only depends on the magnitude of the voltage and not the polarity. The alternating polarity is used to prevent "polarization" of the LC material due to impurities.

BRIEF DESCRIPTION OF THE DRAWINGS

For a more complete understanding of the present invention, and the advantages thereof, reference is now made to the following descriptions taken in conjunction with the accompanying drawings, in which:

FIGS. 7A and 7B depicts example operations involving the RAM of FIG. 3;

FIGS. 24A and 24B is a table of example values for gamma curves;

DETAILED DESCRIPTION

Figure 1A:
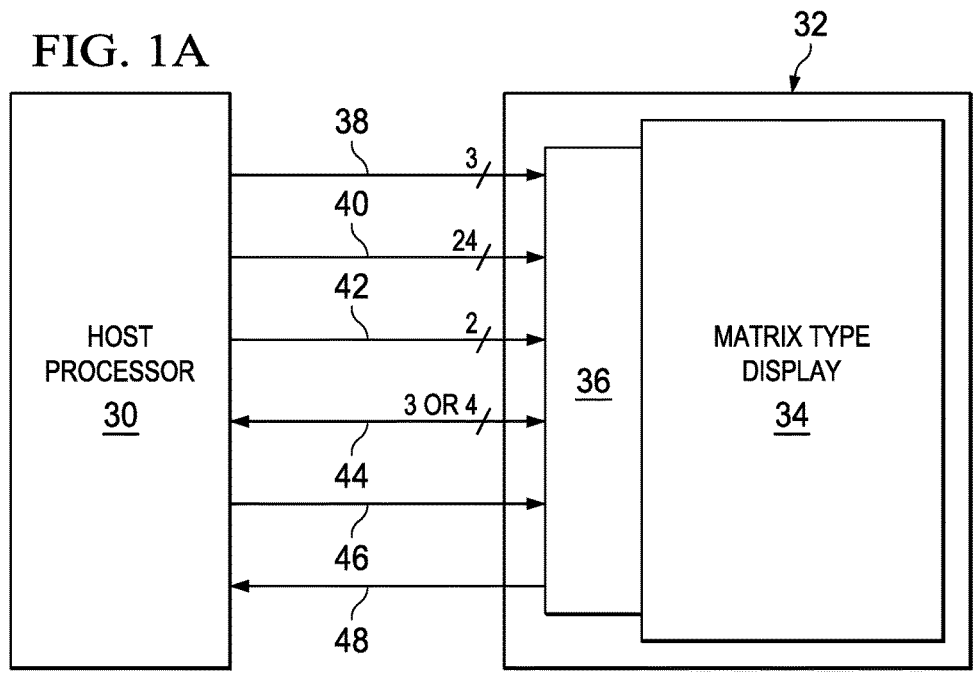
FIGS. 1 and 2 are block diagram showing example systems in accordance to the present invention.

Refer now to the drawings wherein depicted elements are, for the sake of clarity, not necessarily shown to scale and wherein like or similar elements are designated by the same reference numeral through the several views.

The discussion below uses a number of terms for which definitions are provided as follow:

Normal Mode: This is the display mode in which streaming video data is sent to the display. In this mode, timing is derived from the PCLK and DE signals that are received through the video interface. The Partial display memory 1406 is not used in this mode.

Partial Mode: This is the display mode in which data is read from the internal Partial display memory 1406 and sent to the display. Timing to the display is specified by register settings and is derived from an internal oscillator.

Alpha Mode: This is the display mode in which image data stored in the Partial display memory 1406 is blended with (or overlain on) the incoming video data. Timing is derived from the PCLK and DE signals that are received through the video interface.

Partial display memory 1406: On-chip memory which is used to store display data for the Partial display window.

Partial display window: A user-defined region on the display that is self-refreshed with image data stored in the Partial display memory 1406 when the device is operating in Partial Mode.

Color Mode: The Color Mode determines the bit depth of the data that is sent to the display, and is distinguishable from Packing Mode in that several different "packing schemes" could be used for a given Color Mode. For example, in Partial Mode, the BITS_PER_PIXEL register may be used to select one of the Color Modes:

1-Bit Mode: Each pixel is rendered using 1 bit (2 levels). The same data value is used for the red, green and blue subpixels. The source driver drive voltages can be adjusted to define a foreground color for the data=1 condition and a background color for the data=0 condition. The foreground and background colors are not limited to black/white values.

3-Bit Mode: Each pixel is rendered using 1 bit of data (2 levels) for each of the red, green and blue subpixels. The source driver drive voltages can be adjusted to define an 8-color palette which is not limited to the conventional B, W, R, G, B, C, Y, M colors.

3-Bit Mode LP: Lower system power and reduced LoSSI write speed. Otherwise identical to the 3-Bit Mode.

12-Bit Mode: Each pixel is rendered using 4 bits (16 levels) for each of the red, green and blue subpixels.

18-Bit Mode: Each pixel is rendered using 6 bits (64 levels) for each of the red, green and blue subpixels.

In Normal Mode, the output color mode is 24/18-Bit, regardless of the value of the BITS_PER_PIXEL register or of the PM Color Set command state.

Packing Mode: As data is written to the Partial display memory 1406 via the serial interface, it is packed according to the bit-depth that will be used when displaying the Partial display memory 1406 data (BITS_PER_PIXEL register). Five packing modes are provided (see Error! Reference source not found.5):

1-Bit Packing: Each byte sent over the serial interface contains six pixels.

3-Bit Packing: Each byte sent over the serial interface contains two pixels.

3-Bit Efficient Packing: Every three bytes sent over the serial interface contain eight pixels.

12-Bit Packing: Every two bytes sent over the serial interface contain one pixel.

18-Bit Packing: Every three bytes sent over the serial interface contain one pixel.

Configuration Registers which control the operating modes and settings which effect driver behavior.

Register Access Mode: This mode allows the Serial Interface to directly access the Configuration Register settings. The host CPU directly controls the settings of the Configuration Registers in this mode. Alternatively, the device can be controlled via the Command Mode. Register Access Mode is entered by sending the Enter Register Access Mode command.

Command Mode: This mode provides a method of controlling the display operation using high-level OpCodes. Each OpCode loads an associated set of Configuration Register values from an internal EEPROM. Thus, the host CPU need not have knowledge of the Configuration Registers. Alternatively, the device can be controlled via Register Access Mode. Command Mode may be entered by sending the Enter Command Mode command or by writing any data to register address 5Fh. After a reset, the FPD95120 is in the Command Mode.

Low-Speed Serial Interface (LoSSI) Protocols:

Serial Peripheral Interface (SPI) Protocol: Traditional SPI-like serial interface protocol which contains a Read/Write bit, 7-bit address field, and 8-bit data field. If used in Command Mode transactions, the R/W-bit plus address field is replaced by an 8-bit command and the data field(s) is optional.

Three Wire Serial Interface (TSI) Protocol: Serial interface protocol which contains a Cmd/Data bit, 8-bit command (or address) field, and optional 8-bit data field(s).

Figure 1B:
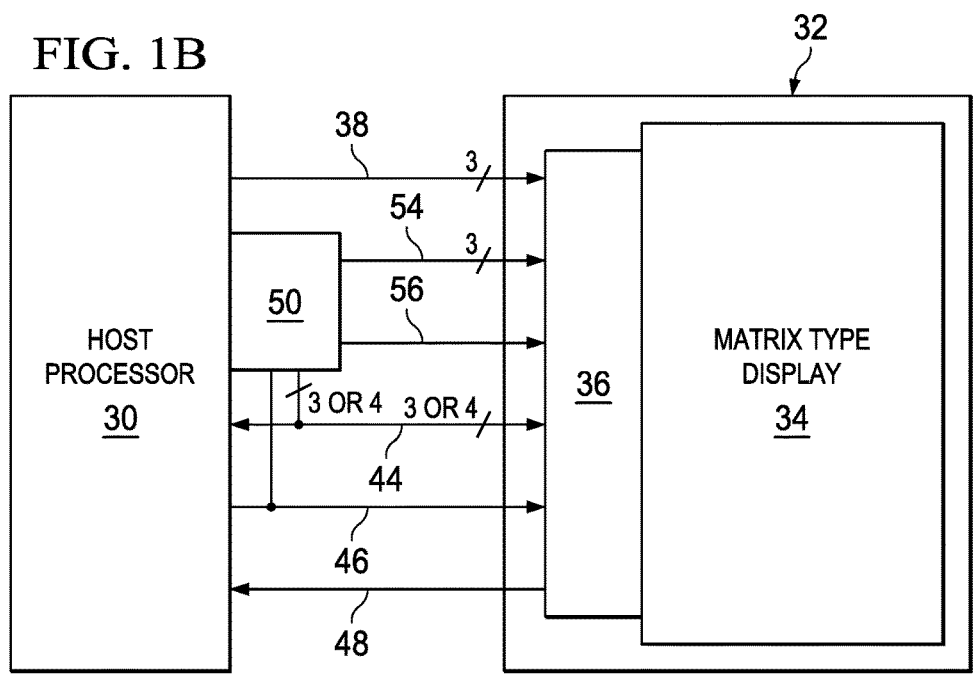

Turing to FIG. 1, a system 100-A in accordance with the present invention can be seen. As shown, the system 100-A generally comprises a host processor 102 and a display board or assembly 104. The display assembly 104 generally comprises a matrix type of display 106 (such as an liquid crystal display or LCD), and a display driver 102 (which passes image data from the host processor 102 to the display 106). As shown, two power supply voltages and ground are provided by the host processor 102 to the display driver 108 on bus 110 (which can be three lines wide). Video or RGB (red, green, and blue) data is provided on bus 112 (which can be 24 lines or bits wide), thus enabling the parallel transfer of up to 24 bit pixel data (8 bits per subpixel). Also transferred are two signals on bus 114 (i.e., signals PCLK and DE), which are synchronized by the host computer 102 to the video data. Bus 116 (which can be 3 or 4 lines or bits wide) provides a LoSSI between the host processor 102 and the display driver 108, which can be either encoded according to the SPI or TSI). A reset line or bus 118 to reset the display driver 108 by the host processor 102 is also provided, and a video transfer timing signal on line or bus 120 from the display driver 108 to the host processor 102 are also shown in FIG. 1. The video transfer timing signal transitions between high and low at the time that selected lines are being written into the display 106 in order for the host processor 102 to update the partial memory RAM 224 (as shown in FIG. 3) without displaying parts of two images at the same time on the display 106.

Figure 2:
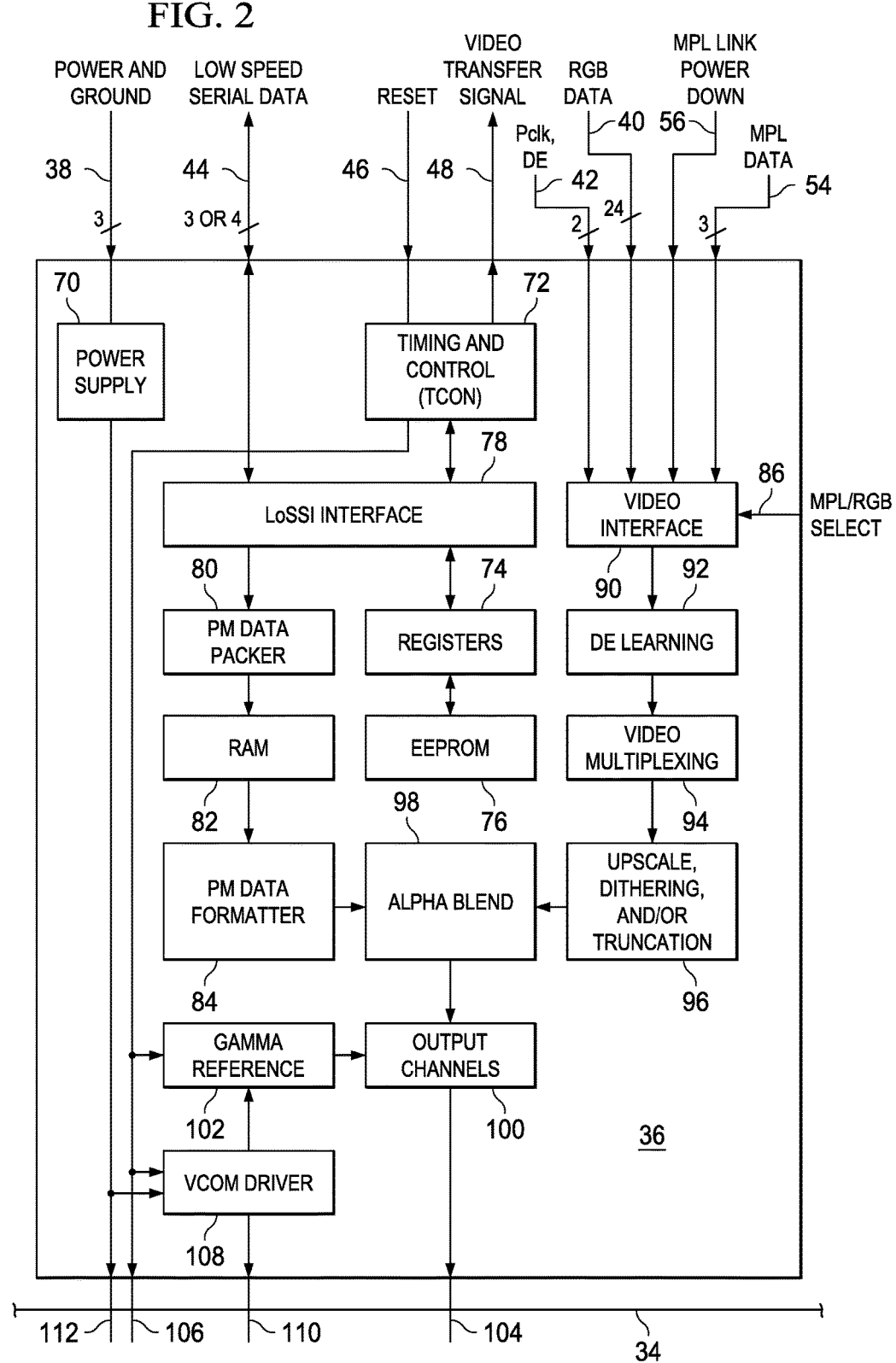

FIG. 2 is a block diagram showing a system 100-B, where the host processor 102 can provide serially encoded video data to the display driver 108 thorough an MPL interface circuit 122. The MPL interface circuit 122 receives parallel video data from the host processor 102, converts it to high-speed serial data, and places it on the MPL data bus 126 (which can be 3 bits or lines wide) along with an MPL power down signal on line or bus 124. The MPL data bus 126 can consist of a two differential signal pair and a clock line. The other wires and buses, 110, 116, 118, and 120, are also shown in FIG. 2. The MPL interface circuit 122 is also coupled to the LoSSI 116 (which can be 3 or 4 bits or lines wide) and to the reset line 118.

Figure 3:
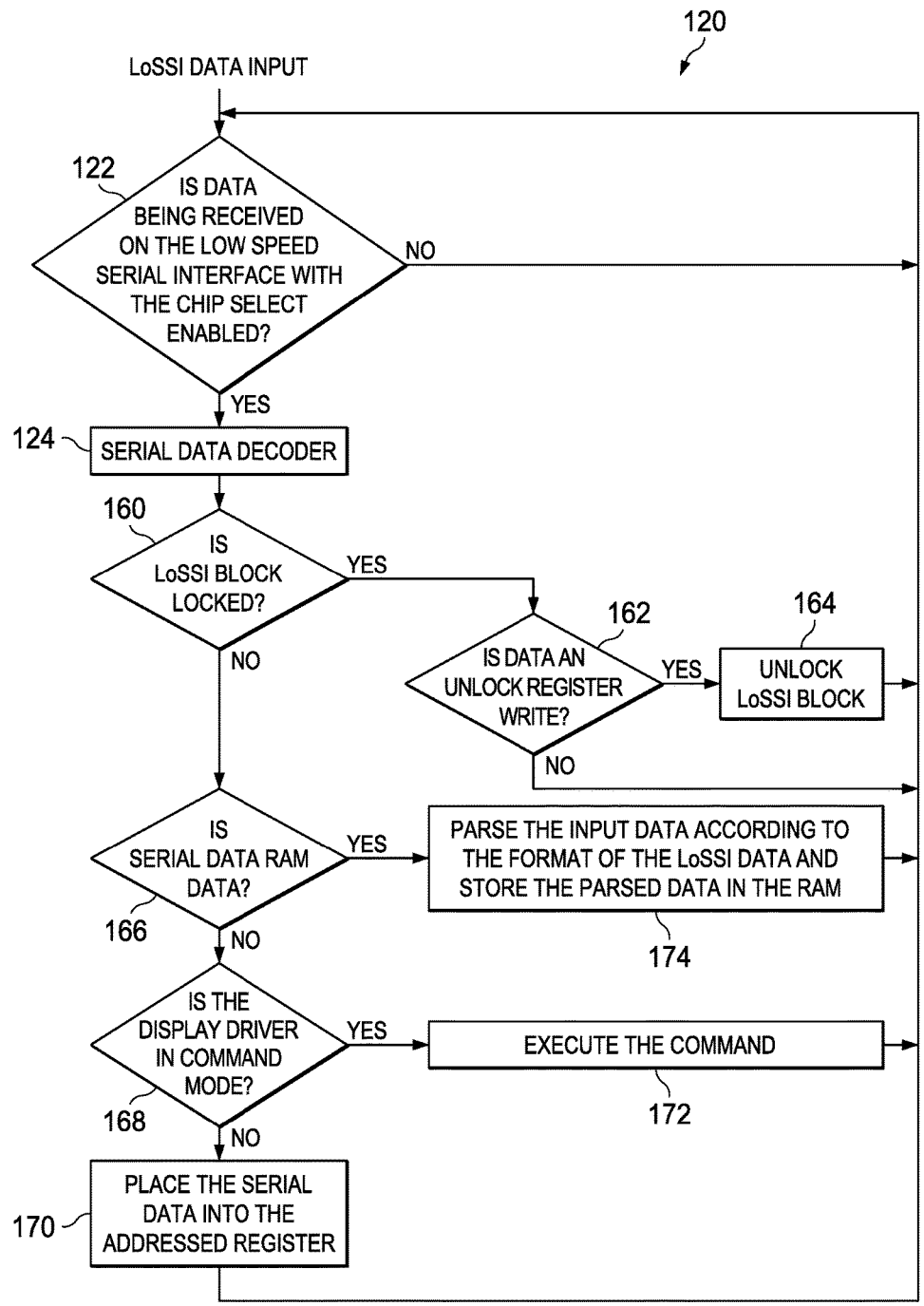
FIGS. 3 and 14 are a block diagram of examples of the display driver of FIGS. 1 and 2.

Turning to FIG. 3, an example of the display driver 108 (which is labeled 108-A) can be seen in greater detail. The display driver 108-A includes a power supply 202 which receives 2 power supply voltages and ground on bus 110 and provides various supply voltages to the rest of the display driver 108-A and to the display 106. Some of the voltages produced by the power supply 202 depend on the characteristics of the display 106 and other operating conditions set by the host processor 102 shown in FIGS. 1 and 2. The display driver 108-A also includes a timing and control block 204 which generates the timing signals used in the display driver 108-A and, depending on the register settings in the registers 214 and the mode in which the display driver 108-A is operating, provides the necessary control signals to the rest of the display driver 108-A. The registers 214 are coupled to an electronically erasable programmable read-only memory (EEPROM) 216 which holds certain nonvolatile data such as the settings for the various registers 214 when the display driver 108-A is first powered up and after being reset. The EEPROM 216 also holds a plurality of user set combinations of register settings so that the display driver 108-A can be switched to one of these stored combinations of register settings with a single command rather than having to directly enter each of the desired registered settings. When the display driver 108-A receives a command to switch to one of the stored combinations of register settings, the setting stored in the EEPROM 216 are transferred to the appropriate registers 214.

The display driver 108-A also has an LoSSI interface 206 which interfaces with the data on bus 116 and processes the data as described below. Except for the reset command on line 118, the display driver 108-A receives all of its operational commands, and sends data back to the host processor 102 through the LoSSI interface 206. As described in more detail below, the display driver 108-A has two basic operating configurations, a command mode and a register mode. When operating in the command mode, commands received at the LoSSI interface 206 are passed to the timing and control block 204, and when operating in the register mode, register writes are made to the selected registers 214.

The LoSSI interface 206 is used to pass image data for use when the display driver 108-A is in the partial mode or in the alpha mode, both of which are described in more detail below. The PM data packer 212 receives partial memory data from the LoSSI interface 206, strips the data of unused bits, and passes the remaining data to the RAM 224 as described in more detail below. When the image stored in the RAM 224 is to be displayed, a partial memory (PM) data formatter 226 formats the data depending on the format of the data stored in the RAM 224 and the operating mode of the display driver 108-A which is described in detail below.

The normal video data can be received by the display driver 108-A as 24 bits per pixel data on bus 112 together with the clock timing signal, PCLK, and the data enable signal, DE, on bus 114. Alternatively, the display driver 108-A can receive normal video data encoded according to the MPL standard on the three wire high-speed serial data bus 126 together with an MPL link power down signal of line 124. Which mode the display driver 108-A is set to receive the normal video data is determined by a wire jumper on the display board 32 as indicated by line 210 in FIG. 3.

A video interface 208 receives the normal video data, decodes the MPL data if the video data is sent over the MPL link, and converts the pixel data to 24 bits per pixel if the incoming video data is 18 or 16 bit pixel data according to algorithms known by those skilled in the art. The 24 bit pixel data is then passed to a DE learning block 218 which generates a substitute DE signal for the rest of the display driver 108-A and in so doing essentially digitally filters the DE incoming signal so that virtually all erroneous transitions in the DE incoming signal are corrected as described below in more detail. The DE learning block 218 also detects the vertical blanking time which enables the display driver 108-A to operate without receiving horizontal sync or vertical sync signals from the video source since the DE learning block 218 generates the substitute DE signal based only on the DE and PCLK signals.

The video data, after the DE learning process in block 218, is multiplexed into sets of two pixels (i.e., 2-pixel sets) processed in parallel by a video multiplexer block 220 which requires an output bus 48 bits wide. This allows the pixel data to be processed at half the data rate of the incoming video which eases the design layout requirements and lowers the power consumed by the display driver 108-A since the transitions from one logic state to the other can be essentially twice as long.

After the incoming data has been arranged into 2-pixel sets by the video multiplexer 220, the 24 bit data of each pixel is converted to 18 bit data. If the incoming video data is 24 bits per pixel, the 24 bit data can be converted to 18 bits either by dithering or truncation of the two least significant bits of each color channel or subpixel (i.e., red, green, and blue) by the upscale, dithering and/or truncation block 222.

The display driver 108-A has the ability to combine the video data with the data stored in the RAM 224 in the alpha blend block 228, the details of which are described in detail below. In addition to having the capability to blend the video data and the RAM 224 data, the alpha blend block 228 is also used when the display driver 108-A is in a video upscale mode to double the size of the incoming video by mapping each incoming pixel into four output pixels.

The output from the alpha blend block 228 is coupled to a column driver or output channels 230, which, in combination with a gamma reference 232, produces the analog gray level voltages which are passed to the subpixels in the display 106 on a bus 236 as described in detail below. Since a very common type of matrix display is an LCD type of display (e.g., display 106), the description below will describe an LCD type of display to keep from unduly complicating the description, but it will be understood that the display driver 108-A can be used with other types of matrix displays.

As is well known in the industry, the LCD display 106 is a matrix of polysilicon transistors (not shown), which receive the analog gray level voltages at their sources (hence the term "source driver") and are gated on and off on a line-by-line basis in sequential order. These signals are passed to the display 106 from the timing and control block 204 on a bus 240. As is also well known in the industry a VCOM voltage is used to adjust the voltage level across the liquid display elements (not shown) on a dot-by-dot basis, on a line-by-line basis, or an frame-by-frame basis and are generated in the VCOM driver block 108-A and passed to the display 106 on a bus 238. The current polarity of the VCOM voltage is passed to the gamma reference 232 to synchronize the polarity switching of the VCOM voltage and the gamma reference voltage. The power supply voltages required by the display 106 and are passed to the display 106 on a bus 242.

In general terms the display driver 108-A is controlled by the contents of the registers 214, although the display driver 108-A can be controlled by transactions sent over the low speed serial connection 116 which are decoded by the LoSSI interface 206 as either direct commands or as writes to the registers 214. Depending on the state of the registers 214, or in response to a direct command, the display driver 108-A either stores partial mode data in the RAM 224, enters into one of several modes of operation or performs other miscellaneous actions such as providing status data back to the host processor over the low speed serial connection 116.

Figure 4:
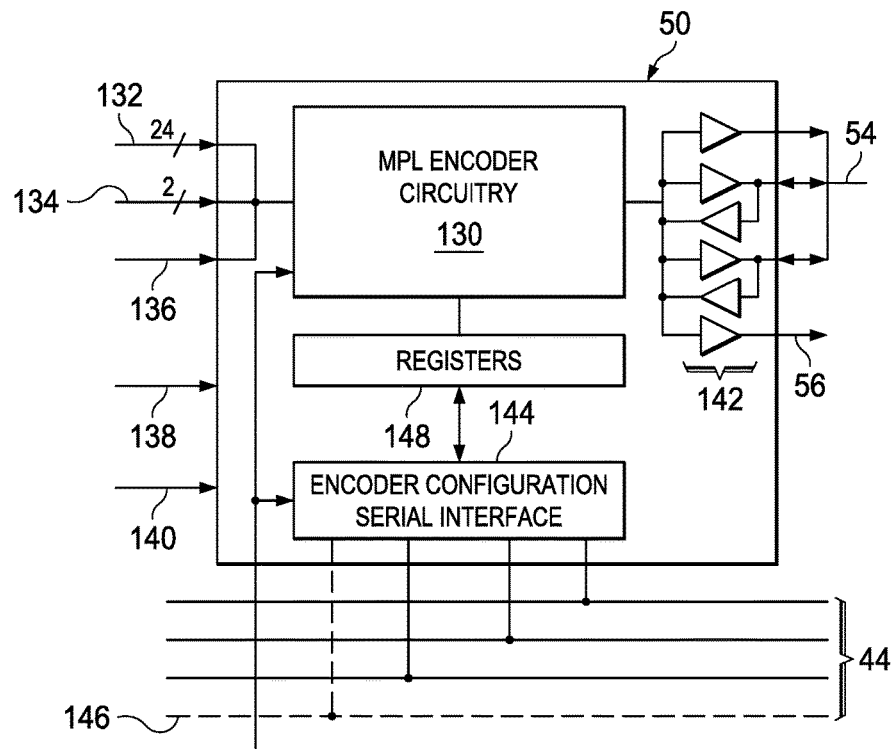
FIG. 4 depicts an example operation of the Low-Speed Serial Interface (LoSSI) interface of FIG. 3.

Turning now to FIG. 4, the flow of data into the LoSSI interface block 206 is shown in the flow diagram 120. As shown in FIG. 4 the LoSSI interface block 206 monitors the incoming serial data in step 302 ("Is data being received on the low speed serial interface with the chip select enabled?"). If the serial data bus is 3 wires (without a chip select line), the serial data is decoded in step 304 ("Serial data decoder"). If the serial data connection is 4 wires (with a chip select line), the LoSSI interface block passes the serial data to the serial decoder step 304 only if the chip select line is enabled to the display driver 108-A when the serial data is received by the LoSSI interface block 206.

The display driver 108-A can receive serial data according to one of two different protocols, SPI and TSI which is essentially the same protocol as the SPI protocol but with an additional synchronization bit at the beginning of a single read or write, and with an additional "1" bit between successive 8 bit data blocks in a multiple write operation.

The LoSSI interface 206 can be used in a system in which the display driver 108-A receives serial data which may be sent also to another peripheral device using the same serial bus 116 which has the chip select signal. In this mode of operation, the display driver 108-A has a LoSSI locked/unlocked register which holds data that disables (locks) the LoSSI interface 206 or enables (unlocks) the LoSSI interface 206. The host processor 102, if it is to send serial data to the display driver 108-A switches the LoSSI interface from locked to unlocked, if necessary, by sending a predetermined register write command to the LoSSI locked/unlocked register in the register block 214. Conversely, if the host processor wants to send serial data to another peripheral device which shares the serial bus 116, the host processor must lock the LoSSI interface 206, if necessary, before communicating with the other peripheral device.

Figure 5:
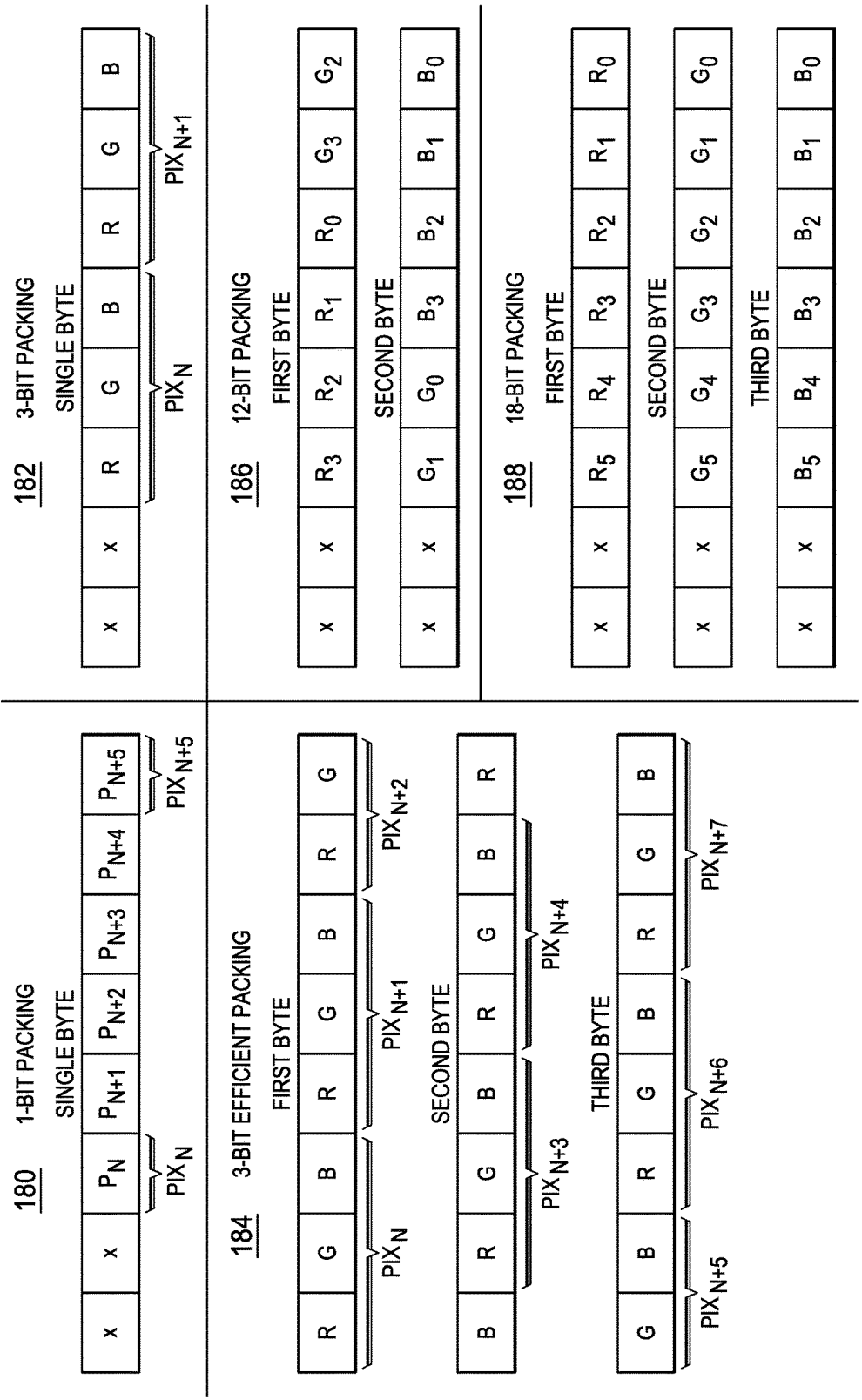
FIG. 5 is a block diagram of an example of the Mobile Pixel Link (MPL) interface of FIG. 2.

As shown in FIG. 2, the MPL encoder 122 shares the same serial bus 116 with the display driver 108-A. In FIG. 5 is a block diagram of the MPL encoder 122 which includes MPL encoder circuitry 402 that receives the 24 RGB lines on a bus 410, the PCLK and DE enable on a bus 412, the MPL power down signal on line or bus 414, various other control and timing signals for controlling the MPL encoder 122 are on a bus 416, and power and ground are on a bus 418. As shown in FIG. 2 the MPL encoder 122 is coupled to the display driver 108-A by a three wire bus 126 and the MPL power down line 124 which couple signals to and from the display driver 108-A by a plurality of line drivers and receivers 404. The MPL encoder 122 also includes an encoder configuration serial interface 408 which is coupled to the three or four line low speed serial bus 116. The line 420 (which is shown as coupledint interface 408 to bus 116) that is shown as a dashed line indicates that it is an optional line. With this line 420, separate data in and data out lines are available rather than using a single data line for bidirectional data flow. The encoder configuration serial interface 408 is coupled to registers 406 which are used by the MPL encoder circuitry 402 to select the parameters of the operation of the MPL encoder 122.

Since the signals between the host processor 102 and the display driver 108-A must pass through a hinged connection in a flip phone, it is desirable to keep the number of separate conductors to a minimum. The use of MPL encoder data and a three wire low speed serial interface helps to reduce the number of separate conductors to a minimum.

The encoder configuration interface 408, like the LoSSI interface 206, is in either a locked state meaning that all serial data is ignored except a command to write an unlock code to the registers 406, or in the unlocked state in which all incoming serial data is decoded if the chip select line 420, if present, is enabled, and is always decoded and processed if there is no chip select line 420. For simplicity, the lock and unlock control register for the display driver 108-A and the MPL encoder 122 have the same address, and the lock/unlock code is the data in the registers enabling the host processor to write a first lock/unlock code which will unlock one of the display driver 108-A or the MPL encoder 122 and also lock the other serial interface, or can send an lock/unlock code which will lock both serial interfaces in one embodiment of the invention. After the reset line 118 is activated, the display driver 108-A will be in the unlocked state and the MPL encoder 122 will be in the locked state in one embodiment of the invention. Thus, when the display driver 108-A is used without an MPL connection, the LoSSI interface 206 will be unlocked and ready to process serial data on the low speed serial data bus 116, and the host processor 102 will not have to write unlock data to the lock/unlock register.

Returning to FIG. 4, step 306 ("Is LoSSI block locked?") determines if the LoSSI interface 206 is locked or not, and if it is, the data is examined in step 310 ("Is data an unlock register write?") to see if it is an unlock code. If the data is not an unlock code, the LoSSI interface 206 ignores the serial data and waits for the next segment of serial data. If the data is an unlock code, the appropriate data is written into the lock/unlock register to unlock the LoSSI interface 206 in step 164 ("Unlock LoSSI block"), and the serial interface 206 waits for the next segment of serial data.

If the LoSSI interface is unlocked, the serial data is examined to determine if it is a write to the RAM 224 in step 308 ("Is serial data RAM data?"). If the serial data is not a write command to the RAM 224, the data is processed as a command or a register write depending on whether the display driver 108-A is in the command mode or the register mode. Step 168 ("Is the display driver in command mode?") determines which of the two modes the display driver 108-A is in, and if it is the register mode, the data is written to the addressed register as indicated in step 316 ("Place the serial data into the addressed register"). The addressed register may be the register that stores the command mode or register mode configuration data to the display driver 108-A, in which case, assuming that the serial data configures the display driver 108-A into the command mode, the display driver 108-A would switch to the command mode, and the LoSSI interface 206 would await the next segment of serial data. If the display driver 108-A is in the command mode, the command is executed in step 318 ("Execute the command"). Similar to the register write which switches the display driver 108-A to the command mode, the command being executed in block 318 may be a command to switch the display driver 108-A to the register mode.

If the serial data into the LoSSI Interface 206 is to be written into the RAM 224, the data is transferred to the PM Data Packer 212 where the serial data is parsed and sent to the RAM 224 depending on the format of the RAM data in the serial data in step 320 ("Parse the input data according to the format of the LoSSI data and store the parsed data in the RAM") in FIG. 4. In FIG. 5, a diagram of five different configurations of the RAM data in each word of the serial data can be seen. As shown, the left hand bit is the first serial bit to arrive at the LoSSI Interface 206. The five configurations are a 1-bit per pixel configuration 502, a 3-bit per pixel standard configuration 504, a 3-bit per pixel efficient packing configuration 506, a 12-bit per pixel configuration 508, and an 18-bit per pixel configuration 510. When the RAM 224 is to be filled with 1-bit per pixel data shown in configuration 502, the first two bits are ignored, and the next six bits are data for six pixels. When the RAM 224 is to be loaded with 3-bits per pixel data, the pixel data can be sent to the display driver 108-A in one of two configurations, the configuration 504 in which each serial data word holds data for two pixels, and the efficient packing configuration 506 in which three serial data words provide pixel data for eight pixels. Thus, the efficient packing configuration provides faster transfer of 3-bit per pixel data into the RAM 224 than configuration 504 by a factor of 8 to 6 in each of three serial data words. This faster transfer of data enables the partial memory image to be updated faster, which may allow the partial memory image to be perceived as more animated than if the configuration 504 were used to place 3-bit pixels into the RAM 224. The 12-bit per pixel configuration 508 uses two serial words to load the 12-bit pixels into the RAM 224, and the 18-bit per pixel configuration 188 uses three serial words to load the 18-bit pixels into the RAM 224.

Figure 7A:
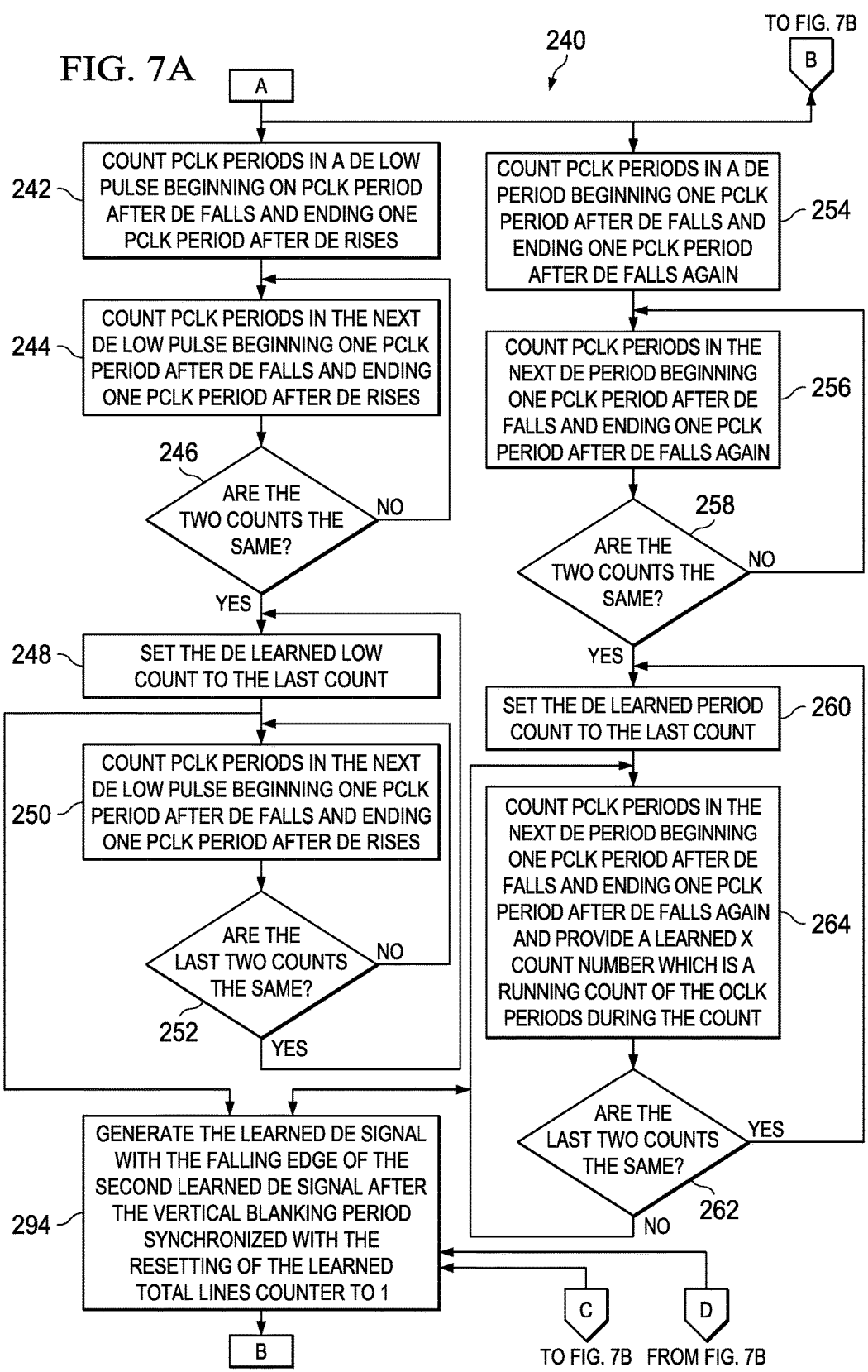

In FIGS. 7A and 7B, a flow diagram 600 of the transfer of partial memory data from the RAM 224 to the output channels 230 and the transfer of video or normal RGB data from the video input lines 40, 42, 126, and 124 to the output channels 230 is shown. The flow of pixel data from the RAM 224 to the output channels 230 is on the left side of FIG. 7A which begins by a determination if the display driver 108-A is in either the partial mode, meaning that the image in the RAM 224 is to be displayed, or the alpha mode meaning that the image in the RAM 224 is to be combined with the normal video data as indicated in step 602 ("Is the display driver in partial mode or alpha mode?"). If the display driver 108-A is in the partial mode or the alpha mode, the partial image data is read from the RAM 224 at a constant rate that depends on the partial mode configurations as indicated in step 604 ("Read data from the RAM at a rate determined by the format of the data stored in the RAM 224 and whether the display driver is in normal power or low power"). The partial mode configurations include whether the display driver 108-A is in alpha mode in which case the timing of the reading of data from the RAM 224 is set by the PCLK, or not in alpha mode in which case the timing of the display driver 108-A is set by an internal oscillator which may have a frequency of approximately 13.0 MHz. Other partial mode configurations which affect the RAM read rate is whether the partial mode operation is at normal power or low power, and whether the image is to be upscaled for a 2× increase in the size of the image. These other partial mode configurations are described in more detail below.

In the flow diagram of FIG. 7A, a determination is made in step 606 ("In low power mode?") whether the partial mode is in the normal power mode or the partial mode. If in normal power mode, the RAM 224 data is formatted into 18-bit pixels by placing zeros in the least significant bit positions if necessary in step 608 ("If necessary, format the data into sets of two 18 bit pixels to form 2-pixel groups"). If in low power mode, which may be selected by the host processor 102 only if the data in the RAM 224 is 1-bit per pixel or 3-bits per pixel, each 18-bits of data sent to the output channels 230 will have data for 4 pixels allowing the partial mode oscillator clock (not shown) to be divided by 4 thus reducing the power consumed by the display driver 108-A to be essentially one-fourth of the normal power. When the display driver 108-A is in low power mode, two sets of 18-bit pixels are transferred to the output channels 230 at a time, data for 8 pixels is transferred to four latches of the output channels 230 at a time as indicated in step 610 ("Set address lines to the first line latch so that four 2-pixel groups are load at a time using the same 36 bits").

As shown in FIG. 7A, if the partial mode is in normal power mode the partial memory RAM 224 data can be upscaled in step 612 ("Upscale PM data?"). Since in upscale mode each pixel is replicated in an adjacent column and in an adjacent line, the loading of data into the column latches is modified so that the sets of two-pixel data, or 36 pixel bits, consist of the data for one pixel replicated to fill both pixel positions as indicated in step 614 ("Load the first line latch so that both pixels have the same data value"). In addition, in order to provide two adjacent lines of the display with the same pixel data, the first line latch is loaded after every other line of the display is written in step 616 ("Load the first line latch once for every 2 lines output"). Whether the partial mode is in the low power mode or the upscale mode, the resulting partial data is passed to an alpha blend step 818 which may or may not blend the normal power partial data with the normal video data and the resulting data is passed to source drives 230 as indicated in step 620 ("Send pixel data to the source drivers"). After the 2 pixel data has been written to the output channels 230, the display driver 108-A begins the cycle again depending on whether the display driver 108-A is in the partial mode or the normal mode as determined in step 622 ("In partial mode?") of FIG. 7A.

In the normal video mode the data is input to the display driver 108-A as RGB 24 bit video or MPL video in steps 624 ("Is the display driver in RGB video mode?") and 626 ("Is the display driver in MPL mode?"), respectively. If the normal video data received is RGB 24 bit data, the data is sent directly to the video interface 208 where it is formatted into 24 bit pixels if necessary, the DE pulse is delayed, and the transitions in the DE pulse are synchronized with the PCLK in step 630 ("Transform all non-24 bit input data to 24 bits/pixel, delay and synchronize DE"). If the normal video data received is MPL data, it is decoded to parallel data in step 628 ("Decode MPL data"). After the normal video data is normalized by the processes in step 630, the normal video data is passed to DE Learning 218 and digitally filtered as indicated in step 632 ("Remove extraneous transitions in the DE input").

After the normal video data has passed through the DE Learning block 218, two normal video pixels are arranged as 36 bits of parallel data in the Video Mutiplexing block 220 in FIG. 3 in step 634 ("Double bus width to form a group of 2 pixels") in FIG. 7B. The resulting video data is passed to the Upscale, Dithering and/or Truncation block 222 in which the determination is made if the video data is to be upscaled in step 636 ("Upscale video data?"). If the normal video is not to be upscaled, the PCLK frequency is divided by 2 for use in the rest of the normal mode processing in step 640 ("Expand PCLK period by 2 for use in the rest of the normal mode operations"). If the normal video data is to be upscaled, then each 24 bit pixel is replicated so that each of the two sets of pixels being processed in parallel are the same in step 638 ("Set address lines to the first line latch so that two 2-pixel groups are loaded at a time using the same 36 bits"). Then the line timing is adjusted such that two output lines are written for each one line of video in step 642 ("Set the display line timing such that 2 output lines are written each 1 input video line").

The determination is made as to whether the 24 bits per pixel are to be dithered to 18 bits per pixel or if the last two bits of each subpixel are to be truncated in step 644 ("Is dither mode enabled?"). Dithering of the 24 bit data, if applicable, is performed in step 646 ("Dither 24 bit data to 18 bit data"), otherwise the 24 bit data is truncated in step 648 ("Truncate last 2 bits of each subpixel"). The resulting 18-bits per pixel data is then passed to the alpha blend block 228 in FIG. 3 in step 618.

In the DE Learning block 218 the number of PCLK periods that the DE signal is low is counted during each DE pulse, and if two successive counts are the same, the count is labeled the Learned DE Low count. This count does not change until there are two subsequent successive DE low counts which are the same but different than the previous Learned DE Low count. The same principal is applied to the DE period, that is, the number of PCLK periods between successive falling edges of the DE signal are counted, and if two successive DE period counts are the same, the count becomes the Learned DE Period count. By generating the Learned DE Low count and the Learned DE Period count a one-time variation in the DE low time or the DE period will not change the learned DE low count or the learned DE period count, respectively. The DE pulses are not present during the vertical blanking period of the display, and by detecting the absence of the DE pulses at the beginning of the vertical blanking period and the total time when the DE pulses are present and absent until they reappear, the number of valid lines and the number of total lines can be learned.

Figure 8:
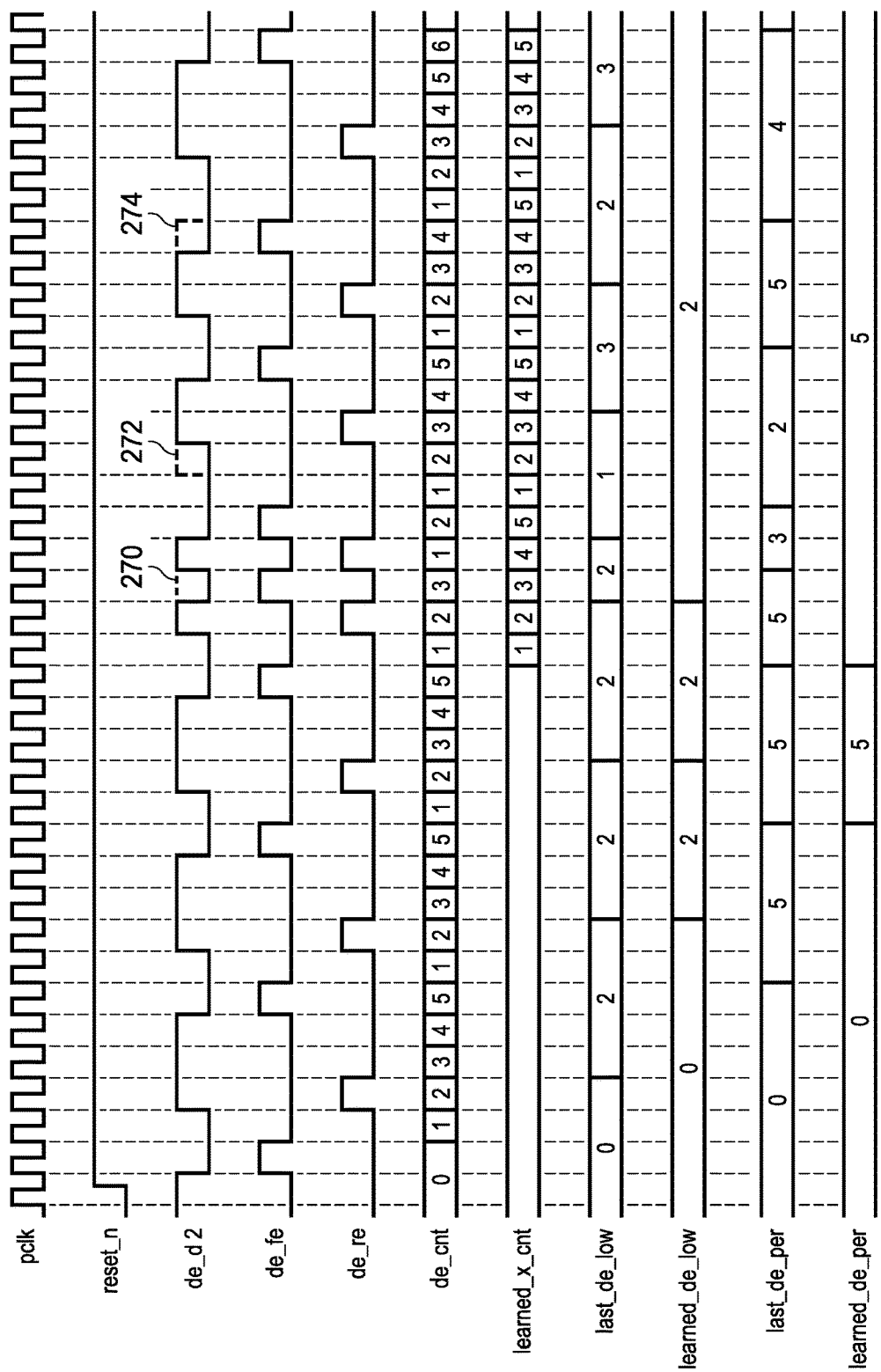
FIGS. 8A and 8B depicts example operations for the data enable (DE) Learning element of FIG. 3.
Figure 9:
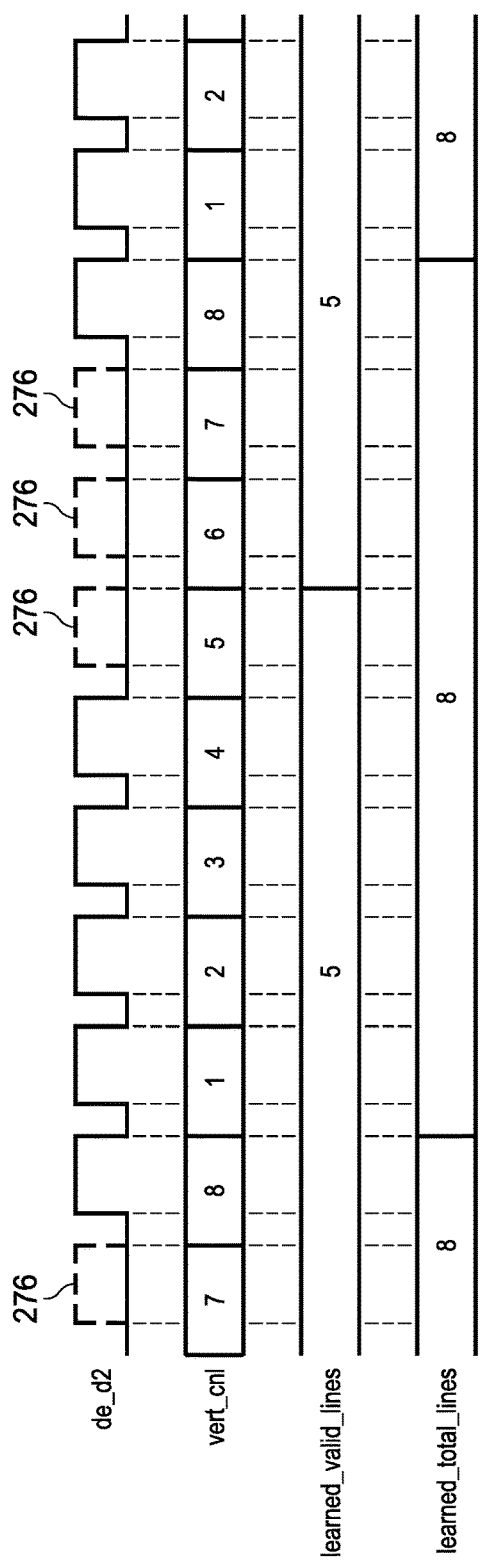
FIG. 9 is an example timing diagram of signals involved in operations for the DE learning element of FIG. 3.

In FIGS. 8A and 8B, a flow chart 632 of the DE learning process to provide a digitally filtered DE signal is shown. As shown in FIG. 9, the Learned DE Low count and the Learned DE Period count begin when the first DE pulses are input to the DE Learning block 218 in FIG. 3, while the learning of the Learned Valid Lines and the Learned Total Lines only begins after the Learned DE Low count and the Learned DE Period count are nonzero. In FIG. 8A, the number of PCLK periods during the low pulse of the DE signal is counted twice in steps 702 ("Count PCLK periods in a DE low pulse beginning one PCLK period after DE falls and ending one PCLK period after DE rises") and 704 ("Count PCLK periods in the next DE low pulse beginning one PCLK period after DE falls and ending one PCLK period after DE rises"), respectively, and the two counts are compared in step 706 ("Are the two counts the same?"). If the two counts are the same the Learned DE Low count is set to the last count in step 708 ("Set the DE learned low count to the last count"). If the two counts are different, then an additional count is made in step 704 and compared to the last count. This process continues until two successive counts are the same and the Learned DE Low count is set. After the count is set, during the next DE pulse the number of PCLK periods during the low state of the DE pulse is counted in step 710 ("Count PCLK periods in the next DE low pulse beginning one PCLK period after DE falls and ending one PCLK period after DE rises"), and if the last two counts are the same, the last Learned DE Low count is set to the last count in step 712 ("Are the last two counts the same?"). If the two counts are not the same, the number of PCLK periods during the low state of the next DE signal is counted as indicated in block 710 and then compared to the last count in step 712. Thus the Learned DE Low count does not change unless there are two successive counts that are the same but different than the current Learned DE Low count. This process not only digitally filters the DE low pulse time, but also allows the display driver 108-A to adjust to a new DE signal with a different low pulse time. Conversely, if there should be two glitches the same during two successive DE low pulse times, the Learned DE Low count will erroneously change, but will be corrected when two glitch free DE low pulses occur in a row. Since the display driver 108-A in one embodiment refreshes the display sixty times a second, the one-time glitch will result in virtually no perceptible change in the displayed image.

In the same manner as the Learned DE Low count is calculated, the Learned DE Period count is calculated. Thus the processes in steps 716 ("Count PCLK periods in a DE period beginning one PCLK period after DE falls and ending one PCLK period after DE falls again"), 718 ("Count PCLK periods in the next DE period beginning one PCLK period after DE falls and ending once PCLK period after DE falls again"), 720 ("Are the two counts the same?"), 722 ("Set the DE learned period count to the last count") and 726 ("Are the last two counts the same?") are the DE period counterparts of the processes in steps 702, 704, 706, 708, and 712, respectively. The process set forth in step 724 ("Count PCLK periods in the next DE period beginning one PCLK period after DE falls and ending one PCLK period after DE falls again and provide a learned X count number which is a running count of the PCLK periods during the count") performs the DE period counterpart of the process in step 710, but in addition generates a running count of the PCLK periods during the period count. This running count is used to determine when a DE pulse is missing indicating the start of the vertical blanking period.

FIG. 9 is a timing diagram of the relevant signals used to determine the Learned DE Low count, the Learned DE Period count, the Learned Valid Lines count, and the Learned Total Lines count. Shown at the top of FIG. 9 is the PCLK which in this embodiment is symmetric. Below the PCLK is a reset signal labeled reset_n from line 118 in FIG. 1. Below the reset signal is the DE signal on bus 114 which has been delayed by two DE signal periods as indicated by the label de_d2. The relative lengths of the low pulses and the high pulses of the DE signal have been distorted in FIG. 9 to better illustrate the invention. Typically the width of the low pulse, which is the horizontal blanking period, is less than 5% of the width of the high pulse. The falling edge of de_d2 is used to generate a falling edge signal de_fe which begins on the falling edge of de_d2 and is one PCLK period wide. Similarly, the rising edge of de_d2 is used to generate a rising edge signal de_re which begins on the rising edge of de_d2 and is also one PCLK period wide. Below the de_re pulse signal is a counter labeled de_cnt which begins after the next falling edge of de_fe after the reset is deactivated by going high, and the count increments for each PCLK period until the next falling edge of de_fe, at which point it resets to a "1" count to begin the count again.

In a line labeled last_de_low is the number of PCLK periods counted from the falling edge of de_fe to the next falling edge of de_re beginning after the display driver 108-A comes out of reset. As shown in FIG. 8B the first count of the last_de_low is 2, and the same is true for the next DE low pulse. As a result the learned_de_low changes from 0 to 2 after the second last_de_low count. Similarly, the last_de_per begins counting at the first falling edge of de_fe after the display driver 108-A comes out of reset, and stops counting at the next falling edge of de_fe, at which point the last_de per count starts again. After two consecutive counts which are the same, the learned_de_per is set to the last count of the of the last_de_per. After the Learned DE Low count is other than 0, and the Learned DE Period count is other than 0, the learned_x_cnt counter begins counting at the next falling edge of de_fe and starts recounting on the next falling edge of de_fe after the learned_de_cnt reaches the same count as the Learned D E Period count.

Shown in FIG. 9 are three errors in the DE signal at reference numbers 802, 804, and 806. The dashed lines show what the correct DE signal should be. Each of these errors changes the de_cnt, the DE Low count, and the DE Period count as shown in FIG. 8. But because none of these errors produces two consecutive erroneous de_cnt with the same count, two consecutive erroneous DE Low counts with the same count, or two consecutive erroneous DE Period counts with the same count, the learned_x_cnt, the Learned DE Low count, and the Learned DE Period counts are unchanged, and these three errors are filtered out of the generated DE signal used by the rest of the display driver 108-A.

Figure 10A:
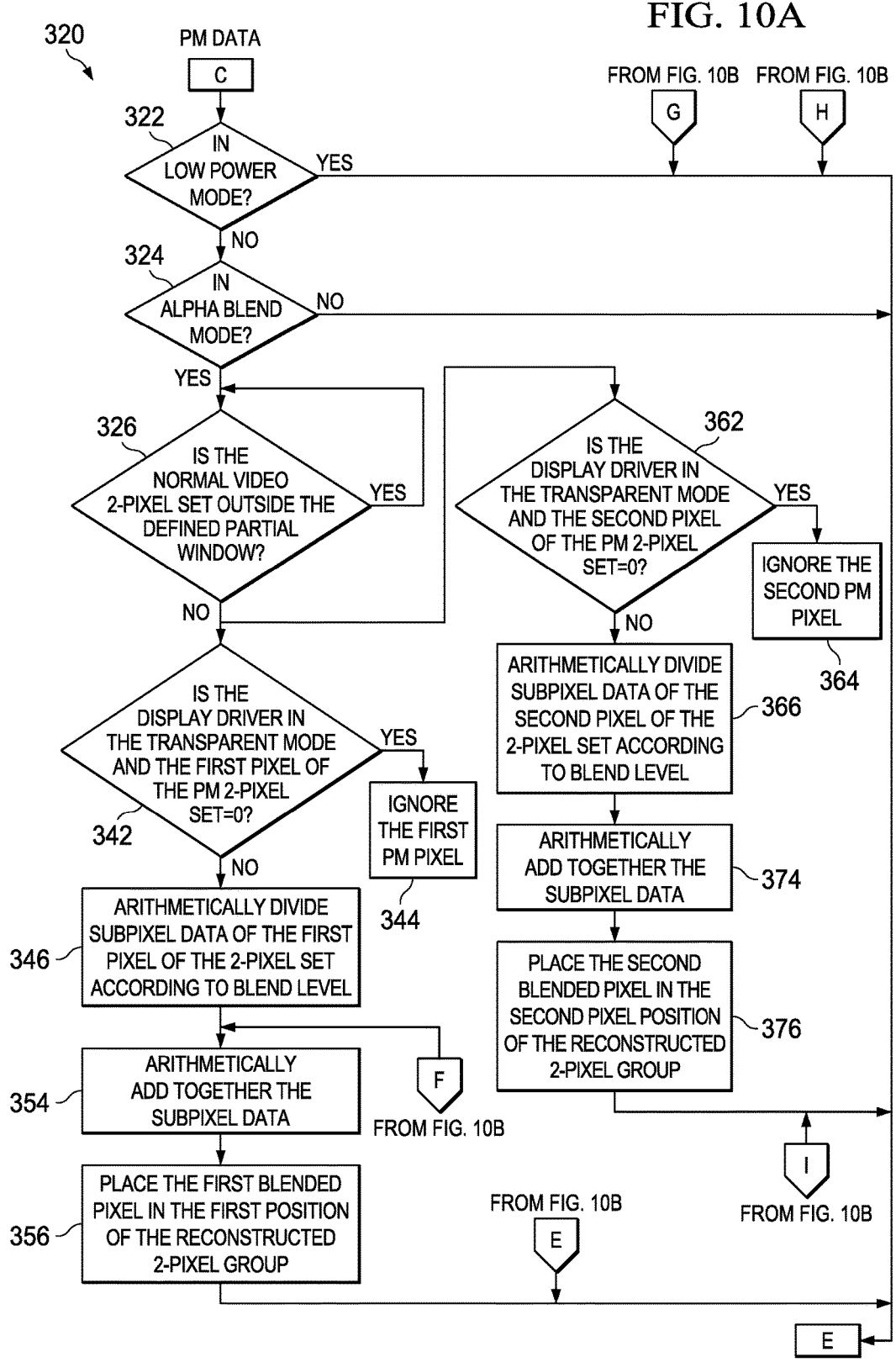
FIG. 10 is a example timing diagram of further signals involved in operations for the DE learning element of FIG. 3.
Figure 10B:
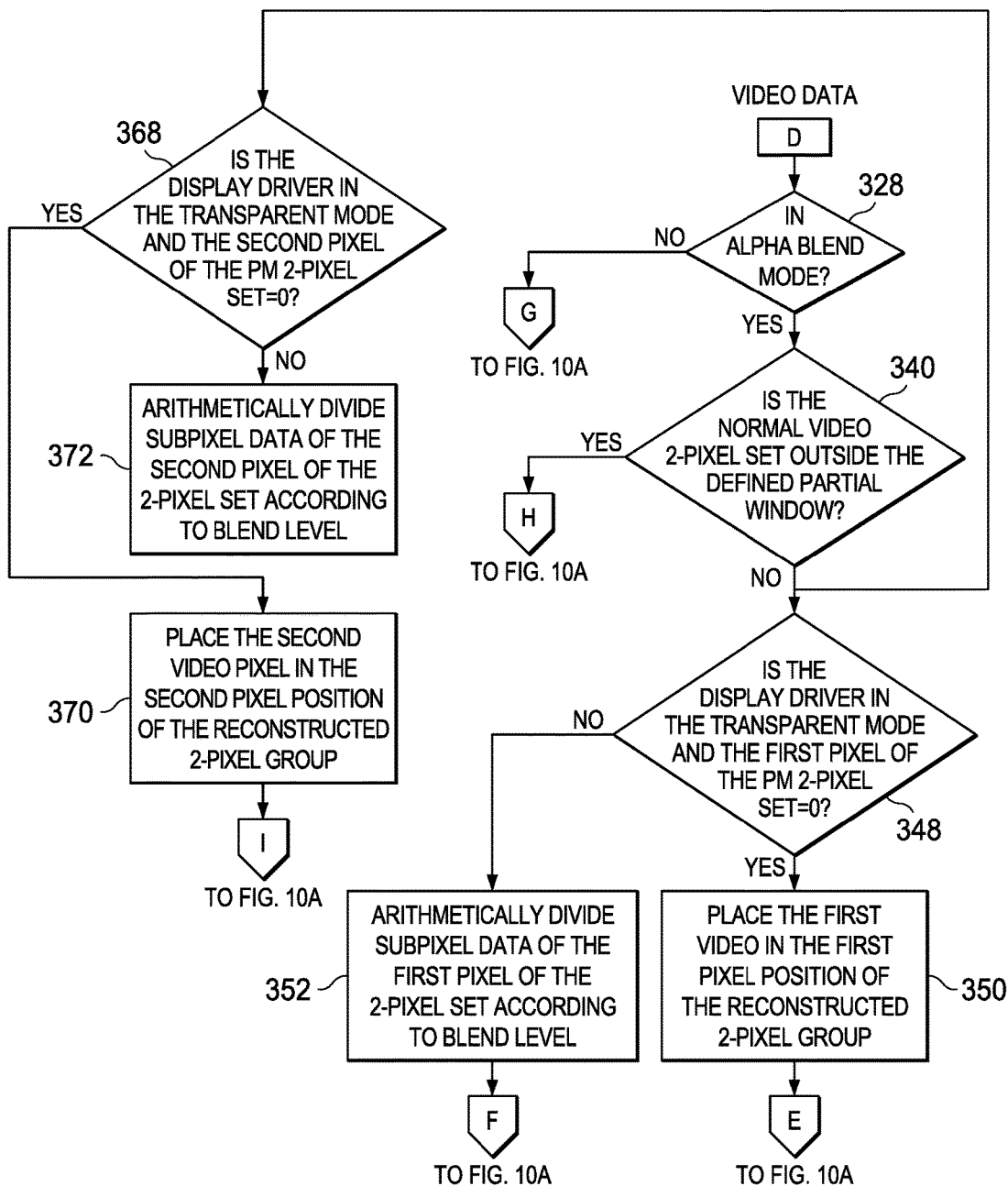

FIG. 10 is a timing diagram of a whole frame and is shown lasting for 8 DE periods to facilitate the illustration of the present invention. In practice, since each DE period corresponds to one row written into the display 106, the number of DE periods in each frame is much higher, usually in the hundreds. The DE pulses 808 shown as dashed lines indicate the vertical blanking period in each frame.

Returning to FIG. 8 and with reference to FIG. 10, a step 728 ("Are the learned DE low pulse count and the learned DE period count both >0?") shows that the process to determine the Learned Valid Lines and the Learned Total Lines does not begin until the Learned DE low count and the Learned DE Period count are both nonzero. The Learned DE Low count and the Learned DE Period count are set to zero when the display driver 108-A is reset. After that condition is satisfied the number of vertical blanking lines are counted in steps 730 ("Count the number of vertical blanking lines") and 732 ("Is DE high for 2 PCLKs in the next DE period?") which also finds the first valid line. The line counter is set to 1 in step 734 ("Set the line counter to 1"), and a test is made in steps 738 ("Is DE high for 2 PCLKs in the next DE period?") and 736 ("Increment the line counter") to find the first DE period of the vertical blanking. Then step 740 ("Have the valid lines been counted twice") determines if the present line count is the first valid line count. If not, the Learned Valid Line count is set to the current line count in step 742 ("Set learned valid lines to vast valid line count"), and in step 748 ("Set learned total lines to learned valid line count plus the number vertical blanking lines") the Learned Total Line count is set to the current line count plus the number of vertical blanking lines determined in steps 730 and 732. Then the first line is found in steps 752 ("Increment the counter") and 300 ("Is DE high for 2 PCLKs in the next DE period?"). Step 756 ("Have the total lines been counted twice?") determines if the total lines have been counted twice, and if not, the operation moves to step 734. If the total lines have been counted twice, the two counts are compared to determine if they are the same in step 764 ("Are the last 2 total line counts the same?"), and if not the operation moves again to step 734. If the two counts are the same, the Learned Total Lines count is set to the last line count in step 762 ("Set learned total lines to last total line count") and the operation returns to step 734. If the test in step 740 determines that the valid lines have been counted twice, the two counts are compared to determine if they are the same in step 746 ("Are the last 2 valid line counts the same?"), and if not the operation moves again to step 752. If the two counts are the same, the Learned Valid Lines count is set to the last line count in step 744 ("Set learned valid liens to last valid line count") and the operation returns to step 734. The no operation (NOOP) steps 750, 754, and 766 are flow diagram tools used to correctly show the processing flow of the DE Learning procedure.

If the Learned DE Low count or the Learned DE Period count changes during the DE learning process, which operates continuously unless the display driver 108-A is in a reset state or a sleep state, then the DE learning process is restarted.

Figure 11:
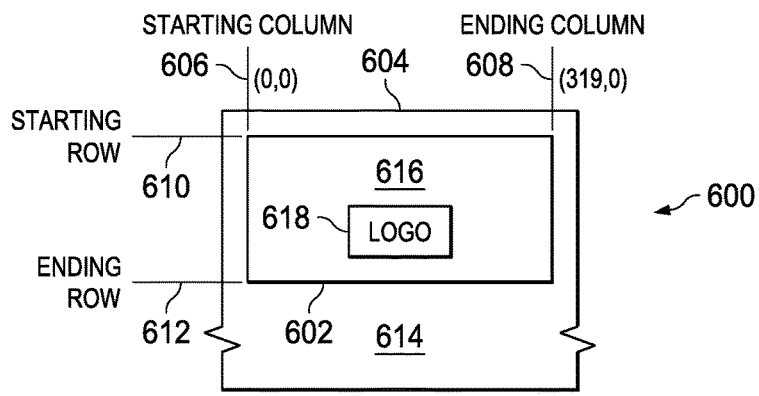
FIGS. 11A and 11B depicts example operations involving the Alpha Blend element of FIG. 3.

FIGS. 11A and 11B are a process flow diagram 618 showing the operation of the alpha blend block 228 in FIG. 3. As shown in FIGS. 11A and 11B, partial mode data is passed to the output of the alpha blend block 228 if the display driver 108-A is in the low power mode in step 902 ("In low power mode?") since the low power mode is not compatible with blending RAM 224 data and normal video data. Next a determination is made if the display driver 108-A is in the alpha blend mode in step 904 ("In alpha blend mode?"), and if not, the partial mode data is passed to the output. Next a determination is made if the normal 2-pixel set is outside the defined partial window in step 906 ("Is the normal video 2-pixel set outside the defined partial window?"). If so, the partial mode data is held until a normal 2-pixel set that is inside the defined partial window is presently being processed, the defined partial window being defined by the partial memory starting and ending rows and the partial memory starting and ending columns which are set in registers that the host processor 102 can change to place the partial memory window at a desired location on the display 106. If the normal pixel data being displayed is at least partially in the defined partial window, each pixel of the two-pixel set is then processed separately and in parallel and later recombined before being passed to the output channels 230 of the alpha blend block 228.

Normal video data, if present, enters the alpha blend flow diagram 618 and the determination is made in step 942 ("In alpha blend mode?") if the display driver 108-A is in alpha mode. If not the normal video data is passed directly to the output. If the display driver 108-A is in the alpha blend mode a determination is made in step 940 ("Is the normal video 2-pixel set outside the defined partial window?") if the normal video 2-pixel set is outside the defined partial window. If so, the normal video 2-pixel set is passed to the output.

Each of the two pixels in the 2-pixel set is blended separately and at the same time and in the same manner. The partial memory pixel is examined in step 908 ("Is the display driver in the transparent mode and the 1st pixel of the PM 2-pixel set=0?") to determine if the display driver 108-A is in the transparent mode, and if so, if the partial memory pixel data is all zeros (i.e., each of the three subpixel data is all zeros). If both conditions are satisfied, the partial memory pixel is ignored in step 912 ("Ignore the first PM pixel"). If one of these conditions is not satisfied the individual subpixels of the partial memory pixel are scaled down, if necessary, in step 910 ("Arithmetically divide subpixel data of the 1st pixel of the 2-pixel set according to blend level") to 75%, 50%, 25%, or 0% (set to all zeros) of their numerical value by methods well known in the art. In the normal video counterpart of this process, the partial memory pixel is also examined in step 938 ("Is the display diver in the transparent mode and the 1st pixel of the PM 2-pixel set=0?") to determine if the display driver 108-A is in the transparent mode, and if so, if the partial memory pixel data is all zeros (i.e., each of the three subpixel data is all zeros). If both conditions are satisfied, the normal video first pixel is placed in the first pixel position of the modified 2-pixel set to be formed in step 930 ("Place the first video pixel in the first pixel position of the reconstructed 2-pixel group"). If one of these conditions is not satisfied the individual subpixels of the normal video pixel are scaled down, if necessary, in step 928 ("Arithmetically divide subpixel data of the 1st pixel of the 2-pixel set according to blend level") to 0%, 25%, 50%, or 75% of their numerical value and the scaled partial memory subpixels and the scaled normal video subpixels are added together in step 920 ("Arithmetically add together the subpixel data"). The blended pixel is placed in the first pixel position of the modified 2-pixel set to be formed in step 922 ("Place the first blended pixel in the first pixel position of the reconstructed 2-pixel group").

The second pixel of the incoming 2-pixel set of the partial memory data and the normal video data is processed in the same manner as the first pixel of the 2-pixel set in steps 914 ("Is the display driver in the transparent mode and the 2nd pixel of the PM 2-pixel set=0?"), 918 ("Ignore the second PM pixel"), 916 ("Arithmetically divide subpixel data of the 1st pixel of the 2-pixel set according to blend level"), 918 ("Is the display driver in the transparent mode and the 2nd pixel of the PM 2-pixel set=0?"), 934 ("Place the second video pixel in the second pixel position of the reconstructed 2-pixel group"), 932 ("Arithmetically divide subpixel data of the 1st pixel of the 2-pixel set according to blend level"), 924 ("Arithmetically add together the subpixel data"), and 926 ("Place the second blended pixel in the second pixel position of the reconstructed 2-pixel group") which correspond with steps 908, 912, 910, 938, 930, 928, 920, and 922, respectively.

Figure 12:
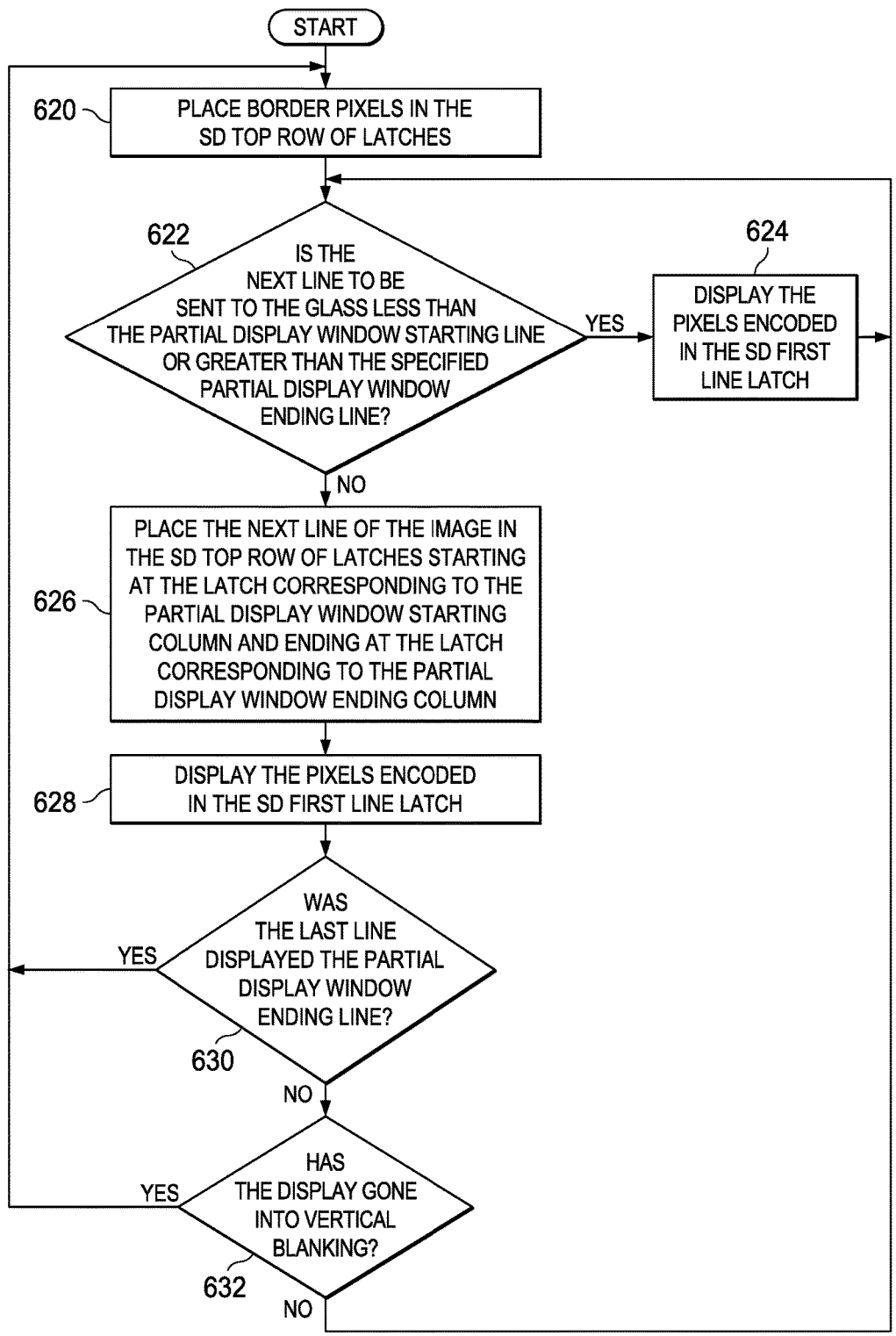
FIG. 12 illustrates an example display with an image within a window when a display driver is operated in a partial mode.

Turning to FIG. 12, there is shown a display 106 carrying a Display Image (DI) 1002 in window 1004 which may be a normal video image or an image generated when the display driver 108-A is in partial mode. The DI 1002 is defined by a set of coordinates on the display. Those coordinates are the starting column 1006, the ending column 1008, the starting row 1010 and the ending row 1012. The balance of the display 106 surrounding the DI 1002 is the border 1014. DI 1002, for example, may include a background color region 1016 that surrounds a trademark or logo region 1018 associated with the device itself, or with the service provided by the device. The image 1002 is displayed automatically when the device enters its partial mode of operation. The device may enter low power after a preset time without any user input. Transition to the low power mode and the reduced display may also be limited to battery charge status.

The RAM 224 described above is used to store image data for local refresh of the display. It may be used as the sole video source in partial mode or its contents can be blended with (or overlaid on) the incoming video data in alpha blend mode (e.g., 618). While operating in partial mode, system power is greatly reduced because the video controller in the system may be shut down. In this mode, image data is read from the RAM 224 and used to refresh the display. All display refresh timing is derived from the internal oscillator (not shown) so that no external video signals are required.

As an example, the RAM 224 contains 230,400 bits of memory. This size is sufficient to display an 80×320 window of 3-bit data, or any equivalent size in terms of the totals pixels contained in the display window (DW) multiplied by the color depth of each pixel.

Figure 13:
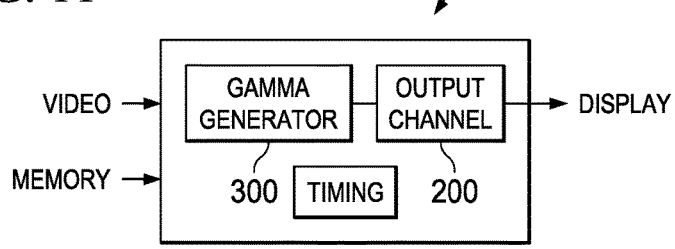
FIG. 13 depicts example operations for a power down mode, termination of video mode and expiration of time for displaying video.

The system processor (e.g., 102) senses when the device enters a power down mode, termination of the video mode and/or when the time for displaying video mode expires. Instructions stored in a memory may then operate the display to load the display with data from the RAM 224. The steps for carrying out this operation are shown on FIG. 13.

As a first step 1102 ("Place border pixels in the SD top row of latches"), the display driver 108-A reads the border data into the display.

In the next step 1104 ("Is the next line to be sent to the glass less than the partial display window starting line or greater than the specified partial display window ending line?"), the display driver 108-A reads the RAM 224 and the data in the registers 214 for the DI 1002. As explained elsewhere in this patent, the output of the RAM 224 is supplied to the output channels 230 via a pair of buses. The addresses of the data are examined and if the pixel is outside the coordinates of the DI, the pixel is a border pixel and remains unchanged, the answer is "yes" and the pixel in the latch remains the same and the pixels in the latch are sent to the display 106 in step 1106 ("Display the pixels encoded in the SD first line latch"). However, if the pixel is in the DW, the display driver 108-A proceeds to the next step 1108 ("Place the next line of the image in the SD top row of the latches starting at the latch corresponding to the partial display window starting column and ending at the latch corresponding to the partial display window ending column"). In that step, the non-border pixels are loaded into the top latch, multiple columns at a time, to form a row of the DW. As explained elsewhere, the display driver 108-A provides efficient data packing so that multiple columns are filled at the same time. The output channels 230 receive 36 bits of data at a time, and due to data packing, as many as eight columns may be filled in one clock cycle. Thereafter, the source driver loads the output channels as described above until an entire line of pixels is into latches. Upon completion of loading, the pixels are displayed as provided in step 1110 ("Display the pixels encoded in the SD first line latch").

If the last line displayed was the DW ending row 1012, the display driver 108-A repeats the steps described above with step 1112. If not, the processor (e.g., 102) checks to see if the display has gone into vertical blanking step 1114 ("Has the display gone into vertical blanking?"). If so, the processor jumps to step 1104 and repeats the subsequent steps.

The host processor 102 is thus able to position the image on the display 106 by loading the appropriate registers 214 with the display window starting line, the display window ending line, the display window starting column, and the display window ending column. By this method the image can be moved up or down with two register writes to load new starting and ending line numbers, can be moved right or left with two register writes to load new starting and ending line numbers, or can be moved to a new vertical and horizontal position with four register writes to the display driver 108-A. Thus the image can easily be positioned to operate as a screen saver.

Figure 14A:
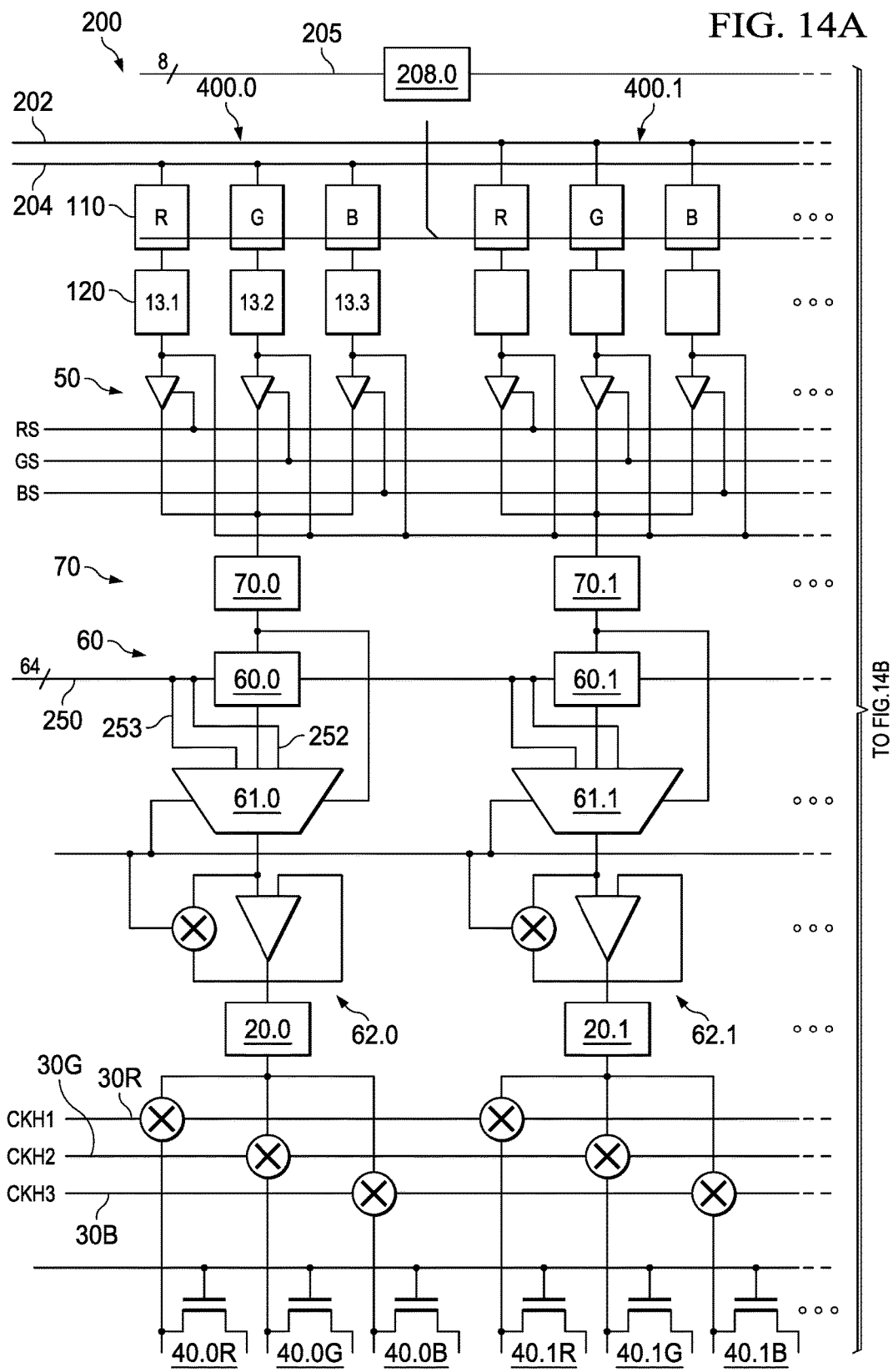
Figure 14B:
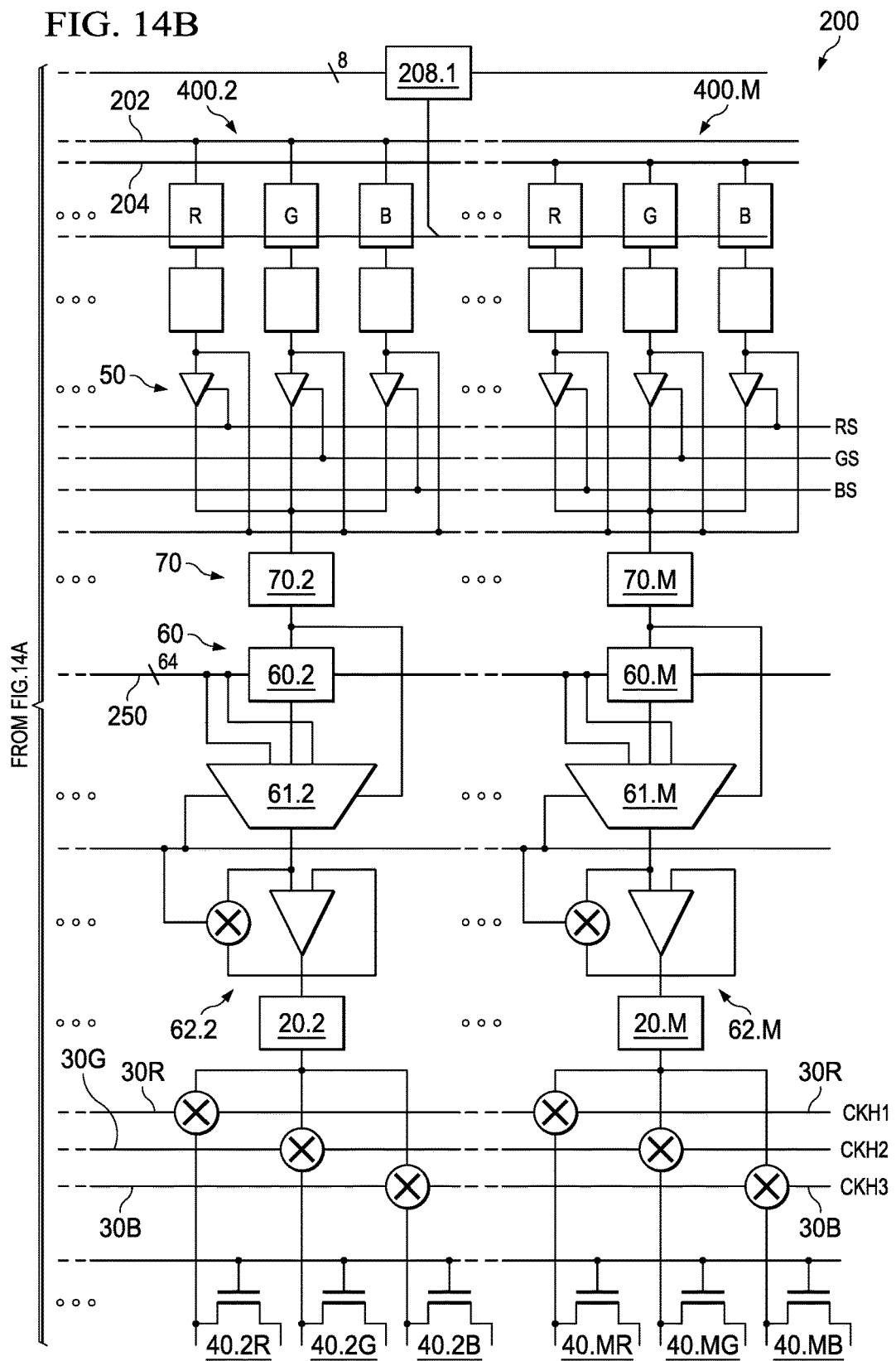

Turning to FIG. 14, another example of the display driver 108 (which is labeled 108-B) can be seen. With display driver 108-B, there is significant overlap in functionality with driver 108-A. As shown, the low speed serial interface (I/F) 1402 (which can generally correspond to LoSSI interface 206) is able to communicate with a host (e.g., 102) over bus 116 (which can corresponds to lines SP_CSX, SP_CLK, SP_DI, SP_DO, and SPI_CFG). The stochastic dither circuit 1408 is also able to receive video (i.e., RGB) data and signals DE and PCLK over buses 112 (which, as shown includes buses R[7:0], G[7:0], B[7:0]) and 114 (which, as shown includes lines DE and PCLK) from host (e.g., 102). The MDL receiver 1410 also can receive MPL data over bus 126 (which, as shown includes lines MD1, MC, and MD0) and power down data over bus 124 (which, as shown, includes lines MPL_PD_N and MPL_EN). Collectively, the circuit 1408 and receiver 1410 can generally correspond to video interface 210 and DE learning circuit 218. DC-DC converter 1420 and low dropout regulator (LDO) 1422 can generally correspond to power supply 202 and can receive power and ground via bus 110 (which, as shown, includes lines GND, VDD0, GND_MPL, VDDA_MPL, VDDDC) and supplies power via bus 242 (which, as shown, includes line XDON) Additionally, DC-DC converter 1420 can use lines VDDA, IND, GND_PS, GND_CP, VDDGR, C3A, C3B, VDDG, VSSGR, C4A, C4B, and VSSG for operation. The command and configuration circuit 1404, timing controller 1414, and level shifters 1418 can generally correspond to timing and control circuit 204 (which can at least it part function as a gate driver circuit) and, as shown, are coupled to buses 118 (which, as shown, includes line RESET_N), 240 (which, as shown includes lines CKH1, CKH2, CKH3, CKV1, GOE, STV, CSV, GPO_0, GPO_1, and GPO_2). The source drivers 1426 also can correspond to output channels 230 and are coupled to bus 236 (which can be 320 bits wide). Partial display memory 1406 (which, as shown, is coupled to interface 1402) may also generally correspond to RAM 224.

Additionally, as shown, driver 108-B includes several other components that may not necessarily have a direct correspondence to elements within driver 108-A, but may provide similar functionality. In this example, the circuit 1408 and receive 1410 are each coupled to multiplexer 1412 over buses (which can each be 20 bits wide). The multiplexer 1428 is then coupled to multiplexer 1428 so as to provide video data (i.e., RGB) over a bus (which may be 18 bits wide). Multiplexer 1412 is also coupled to timing controller 1414 (so as to provide signals PCLK and DE). Multiplexers 1412 and 1428 may also (at least in part) correspond to mideo multiplexing circuit 220. The oscillator 1416 can providing clock or timing signals to timing controller 1414 and DC-DC converter 1420.

Typically, the command and configuration circuit 1404 contains the command interpreter and configuration registers (e.g., registers 214) which control the functions, settings, and operating modes of the device. There are two methods that may be used to control the device and modify the configuration registers. In command mode, OpCodes received from the interface 1402 to cause mode changes or changes to the configuration registers based on the OpCode received and the "command profile" stored in the EEPROM 216. Device control using the command mode is beneficial in that it allows the host processor display driver software to be display independently. In register access mode, the interface 1402 can directly accesses the configuration registers. Upon assertion of hardware reset (RESET_N pin), the device is placed in the command mode. Register access mode can be selected from the interface 1402 by issuing the Enter Register Access Mode command. Command mode can be selected from the interface 1402 by issuing the Enter Command Mode OpCode.

The interface 1402 can be used for several functions: send commands; access the configuration registers; and send data to the partial display memory 1406. The interface 1402 uses either the SPI or TSI protocol as determined by the state of the SPI_CFG pin or line. The interface 1402 signals use CMOS logic levels (GND, VDDD). The interface 1402 includes four signals: SP_CSX (chip select input) is low-active; SP_CLK (serial clock input) is the data transfer synchronization signal, may operate at speeds up to 10 MHz during register writes or command operations, or up to 6.6 MHz during register read operations, and should be set high when idle; SP_DI (serial data input) is the serial data input pin and is sampled at the rising edge of SP_CLK; and SP_DO (serial data output) is the serial data output pin and is held in a high-impedance state except when data is being driven out during read operations. The SP_D$_1$ and SP_DO signals may be tied together if the host processor supports bi-directional data transfer. Two protocols are supported across the interface 1402: an 8-bit protocol (SPI protocol) and a 9-bit protocol (TSI protocol) which includes an extra bit at the beginning of each transaction. The SPI protocol is selected by connecting the SPI_CFG pin to VDD.

The extra bit in the TSI protocol (Data/Command or D/CX) is useful in Command Mode to identify the subsequent 8-bits as either a command or data field. This can be helpful to recover from a partially completed command argument transfer. For example, this condition might occur if a host interrupt occurs while transferring image data to the partial display memory 1406. If the TSI protocol is utilized, it is possible to terminate an in-process transaction and abort the transfer of the remaining data. Then after processing the interrupt, the remaining data can be sent to the partial display memory 1406 without re-issuing the command and previously sent data by identifying the transaction as a data transfer as opposed to a command. Alternatively, if the SPI protocol is used, it is still possible to service an interrupt and suspend data transfer as long as the interface select (SP_CSX) and clock signal (SP_CLK) are held in their current state until data transfer can resume.

The partial display memory 1406 can be used to store image data for local refresh of the display. It can be used as the sole video source in partial mode or its contents can be blended with (or overlaid on) the incoming video data in alpha mode. While operating in partial mode, system power is greatly reduced because the video controller in the system may be shut down. In this mode, image data is read from the partial display memory 1406 and used to refresh the display. All display refresh timing can be derived from an internal oscillator (e.g., oscillator 1416), thus no external video signals are required. In alpha mode, the partial display memory 1406 contents can be used as a transparent text or border overlay on the incoming video data. It is also possible to blend the contents of the partial display memory 1406 to add full-color logos and other effects to the video data. The partial display memory 1406 can contain 230,400 bits of memory. This size is sufficient to display an 80×320 window of 3-bit data, or any equivalent size in terms of the total pixels contained in the partial display window (e.g., 1016) multiplied by the color depth of each pixel. In register access mode, image data should be streamed in raster-order into the partial display memory 1406 by writing data to the RAM_P-ORT register as described in the next sections. In command mode, the Memory Write command is used to send image data to the partial display memory 1406.

During partial mode, pixel data is read from the partial display memory 1406 and displayed in a rectangular Partial display window as shown in FIG. 12. Regions outside this window are blanked to minimize power. The color of the blanked regions is specified in the Partial Mode Border Color registers. The raster always begins at the starting row and starting column. The column is incremented first thus, the raster is filled from left to right and then from top to bottom.

Figure 6A:
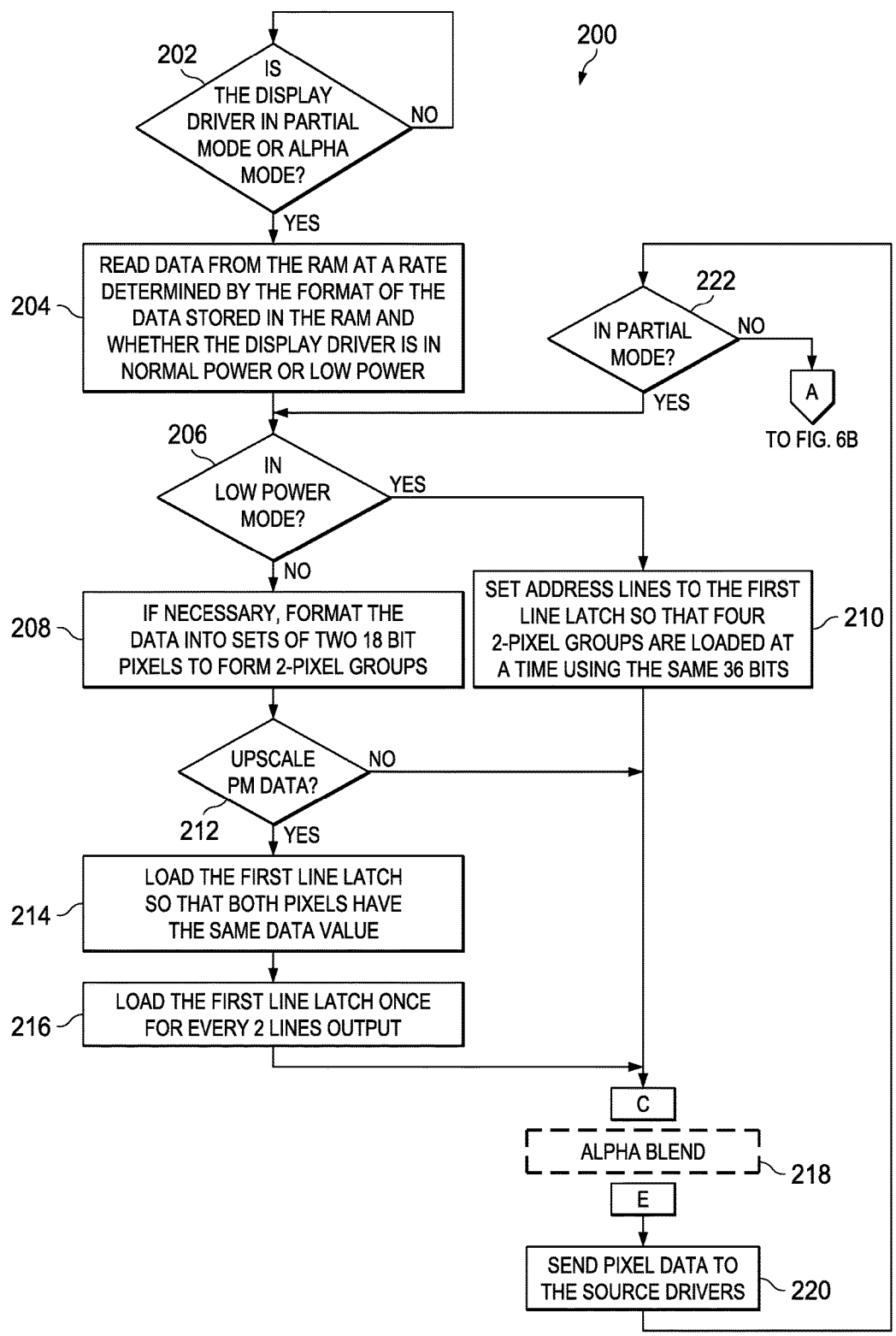
FIG. 6 is a diagram of five example configurations of random access memory (RAM) data.
Figure 6B:
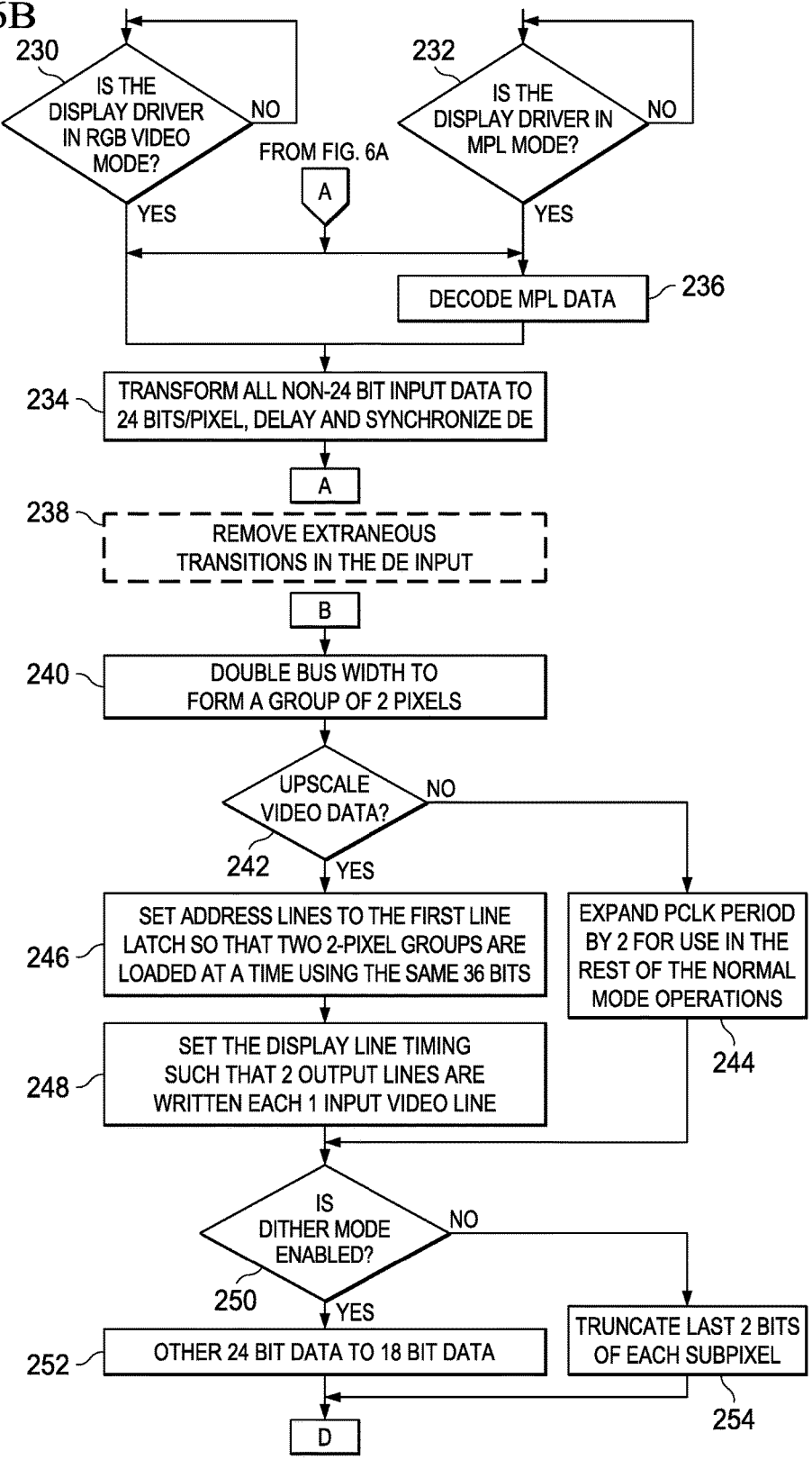

Supported color depths for the Partial display window include 1-bit, 3-bit, 12-bit and 18-bit. In Command Mode, the color depth is set via the PM Color Set command (EEh OpCode). In Register Access Mode, the Partial display window color depth is controlled by the BITS_PER PIXEL register. The maximum size of the Partial display window is related to the number of bits in the Partial display memory 1406 and to the color depth setting. The Partial display memory 1406 can fill a complete 320×560 screen for 1-bit color depth operation, 76,800 3-bit pixels (e.g. 240×320×3-bit window), 19,200 12-bit pixels (120×160×12-bit window) and 12,800 pixels in 18-bit color depth operation (128×100×18-bit window). The window size for the partial display window can be doubled in both dimensions through the use of an upscale feature. In order to maximize the useable memory for each color depth, the image data is packed into the Partial display memory 1406 based on the color depth setting. It is then unpacked to the current color depth setting as it is read out for Partial Display refresh. Therefore, if the size or color depth of the partial display window is changed, the partial display memory 1406 is reloaded with updated image data corresponding to the new window settings. There is also a relationship between the Partial Mode color depth setting and the pixel data packing on the interface 1402 as is illustrated in FIG. 6.

A pixel scaling function enables incoming video or image data stored in the partial display memory 1406 to be upscaled by a factor of 2 in both the x-dimension and y-dimension. In this manner, a single pixel is mapped into a 2×2 cluster of pixels.

The number of pixels sent correspond to a whole number of bytes. Accordingly, dummy pixels may be sent, so long as the total number of pixels sent does not exceed the capacity of the memory. Preferably, the partial display memory 1406 word size is fixed. To efficiently use the available bits in the partial display memory 1406, the pixel data is packed into the fixed memory word size. Incoming pixel data is not written into the memory until all the bits of the memory word have been filled. Therefore, it may be necessary to pad extra bits onto the end of the data stream so that the data stream contains an integral multiple of 36 bits.

The timing controller circuit 1414 can generate the timing signals required to load data into the source driver and controls the scanning of the display. The display may be operated in one of three modes: Normal Mode, Partial Mode or Alpha Mode. In Normal Mode, the display scan timing is developed from the DE and PCLK signals and the video data stream. The data displayed is obtained from the video data stream. In Partial Mode, the display is self-refreshed by the timing controller circuit 1414 using the oscillator 1416 as the clock source. The data sent to the display is read from the internal partial display memory 1406. In Alpha Mode, the display scan timing is also developed from the DE and PCLK signals, and data obtained from the video stream is displayed in the background. In addition, data is read from the internal partial display memory 1406 and displayed in a partial display window in the foreground. Within this window, the foreground and background may be blended in one of four ratios: 25% foreground+75% background; 50% foreground+50% background; 100% foreground; or Transparent foreground (OSD function).

The timing controller circuit 1414 is designed to interface with many configurations of LTPS/CGS glass: single-phase or two-phase vertical clocking; RGB or BGR subpixel ordering for horizontal scanning; timing pulse widths and non-overlap times which are register-adjustable to optimize display settling performance; polarity and phasing of glass signals controlled via register settings; and vertical timing relationships associated with various configurations of dummy lines on the glass controlled by register settings.

The timing controller circuit 1414 has ten outputs that are designed to control the display refresh and scanning. The level shifter 1418 performs logic level translation for these signals such that they can interface properly to the glass control inputs. The output voltage for the level shifter signals is $V_{SSG}$ to $V_{DDG}$. There are 3 outputs (GPO_0, GPO_1, GPO_2) whose signal function changes depending on the setting of the GPO register. All level shifter outputs are driven to GND when in the Sleep state.

An additional level-shifted output XDON is provided by the DC-DC converter block. Normally, XDON is at the $V_{SSG}$ level whenever $V_{DDDC}$ is present. If $V_{DDDC}$ is suddenly interrupted, XDON immediately goes to the $V_{DDG}$ level. Because there is external capacitance on the $V_{DDG}$ and $V_{SSG}$ nodes, XDON will persist at the $V_{DDG}$ level for a brief period of time after $V_{DDDC}$ is interrupted. Thus, XDON may be reliably used by the glass as a control signal to discharge all nodes on the glass in the event of a sudden power interruption.

The oscillator 1416 can generate a 13.5 MHz internal clock signal. The clock signal can be used as the clock source for the timing controller circuit 1414 during Partial Mode and during certain command sequences such as the power-down sequence.

The source driver circuit 1426 converts the digital image data received from the MPL interface or sartial display memory 1406 to analog voltages required to drive the source lines on the glass. The source driver circuit 1426 can consists of 320 drive channels. Each drive channel receives RGB data for one pixel and performs a digital-to-analog conversion of the red, green and blue data in a time-multiplexed sequence that is synchronized to the glass multiplex select signals (CKH1-3). The conversion sequence of the RGB data within each line time is determined by the SCAN register settings. The SCAN[1] register bit controls the data loading direction of the source driver circuit 1426, S0→S319 or S319→S0 direction. For display applications in which the pixels/line on the glass is less than 320 channels, the COL_OFFSET register can be used to specify which outputs are active and which outputs are unused by the application. This can help optimize the source line fan-out region between the driver and the glass active region. The COL_OFFSET is specified in conjunction with the SCAN[1] setting. If the load direction is set for the S0 S319 direction, then the COL_OFFSET is referenced to the S0 output. If the load direction is set for the S319→S0 direction, then the COL_OFFSET is referenced with respect to the S319 output. The voltage transfer characteristic of the source driver digital-to-analog converter (DAC) is determined by the 64 gamma reference voltages generated by the gamma reference circuit 232. The drive strength for the source driver output is also programmable to optimum settling and power performance via the GAMMA_CFG1 [4:0] register bits.

Four intrinsic gamma curves are available for the 64 reference voltages. The intrinsic curves can be used to accomplish various goals for the module user. One goal might be to obtain matching optical performance from various module suppliers. It is even possible to optimize the individual curve shapes for the different color channels of a given supplier. In these cases, the four curve options can be optimized for each of the module supplier's glass characteristics and the selection of the proper curve and settings is included in the SLEEP_OUT command. The GAMMA_SET command is not used in this case as the other choices are optimized for a different module supplier. Another reason for using multiple intrinsic curve settings might be to provide multiple gamma characteristics (e.g. $\gamma=1.0, 1.8, 2.2, 2.5$) for a given module in order to optimize performance for various viewing conditions and applications. In this case, the various curves can be selected via the Gamma Set command or through direct register access to gamma register settings.

Gamma generator circuit 242 converts input digital image data to analog voltages required to drive the source lines on the glass. The digital image data may come from a streaming video interface or another source such as a register, a full frame memory, or a partial display memory 1406. There are a predetermined number of output channels (e.g., 320). Each output channel receives RGB data for one pixel and performs a digital-to-analog conversion of the red, green, and blue data in a time-multiplexed sequence that is synchronized to the glass demultiplexer select signals (CKH1-3). The conversion sequence of the RGB data within each line time is determined by the settings for a first register.

A register bit in the first register controls the data loading direction of the output channels. For display applications in which the pixels/line of the glass is less than 320 channels, a second register can be used to specify which outputs are active and which outputs are unused by the application. This can help optimize the source line fan-out region between the driver and the glass active region. The second register is specified in conjunction with the first register setting. If the load direction is set for the S0→S319 direction, the second register is referenced to the S0 output. If the load direction is set for the S319→S0 direction, then the second register is referenced with respect to the S319 output.

The voltage transfer characteristic of the channel driver DAC is determined by the 64 gamma reference voltages generated by the gamma reference circuit 232. The drive strength for the channel driver output is also programmable to optimize settling and power performance for panels of various sizes and parasitic capacitive loads.

There are (for example) four different intrinsic gamma curves available in the gamma reference circuit 232. It generates 64 reference voltages for each gamma curve. The intrinsic curves may accomplish various goals for the module user. One goal might be to obtain matching optical performance from various module suppliers. It is even possible to optimize the individual curve shapes for the different color channels of a given supplier. In these cases, the four curve options can be optimized for each of the module supplier's glass characteristics and the selection of the proper curve and settings is possible.

Another reason for using multiple intrinsic curve settings might be to provide multiple gamma characteristics (e.g. $\gamma=1.0, 1.8, 2.2, 2.5$) for a given module in order to optimize performance for various viewing conditions and applications. In this case, the various curves can be selected via a Gamma Set command or through direct register access to the Gamma Register settings.

After selecting the intrinsic curve that most closely matches the desired characteristic, the curve shape can then be further optimized as explained later in this patent. Four shapes are used in the preferred embodiment, but those skilled in the art understand that the invention may be practiced with one or any number of gamma selection curve shapes. The user may select one shape for all colors or choose separate curves or adjustment settings for each color channel. This same intrinsic shape may be used for the green and blue curves with different optimization settings, or different intrinsic shapes and optimization settings may be chosen for each color channel. For a given color channel, the same intrinsic curve shape may be used for both drive polarities. Other customized gamma curves may be generated from the disclosed gamma-generating block, for example, by adding output multiplexers with more than 4-to-1 selections.

Figure 16:
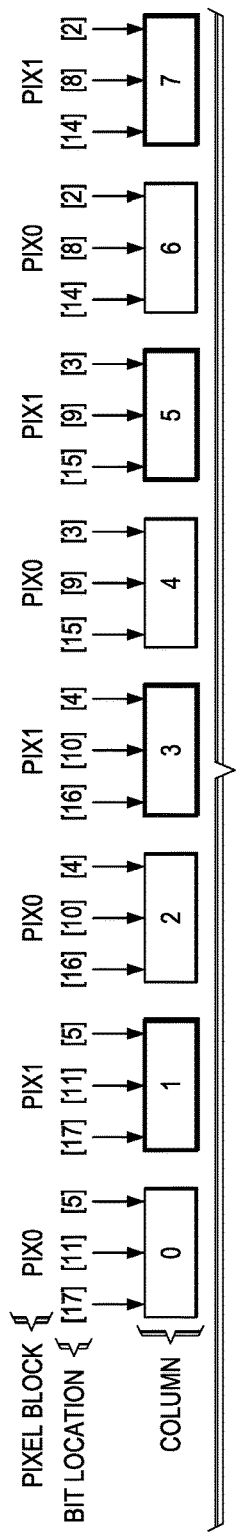
FIG. 16 is a diagram of an example of the display of FIGS. 1 and 2.
Figure 15A:
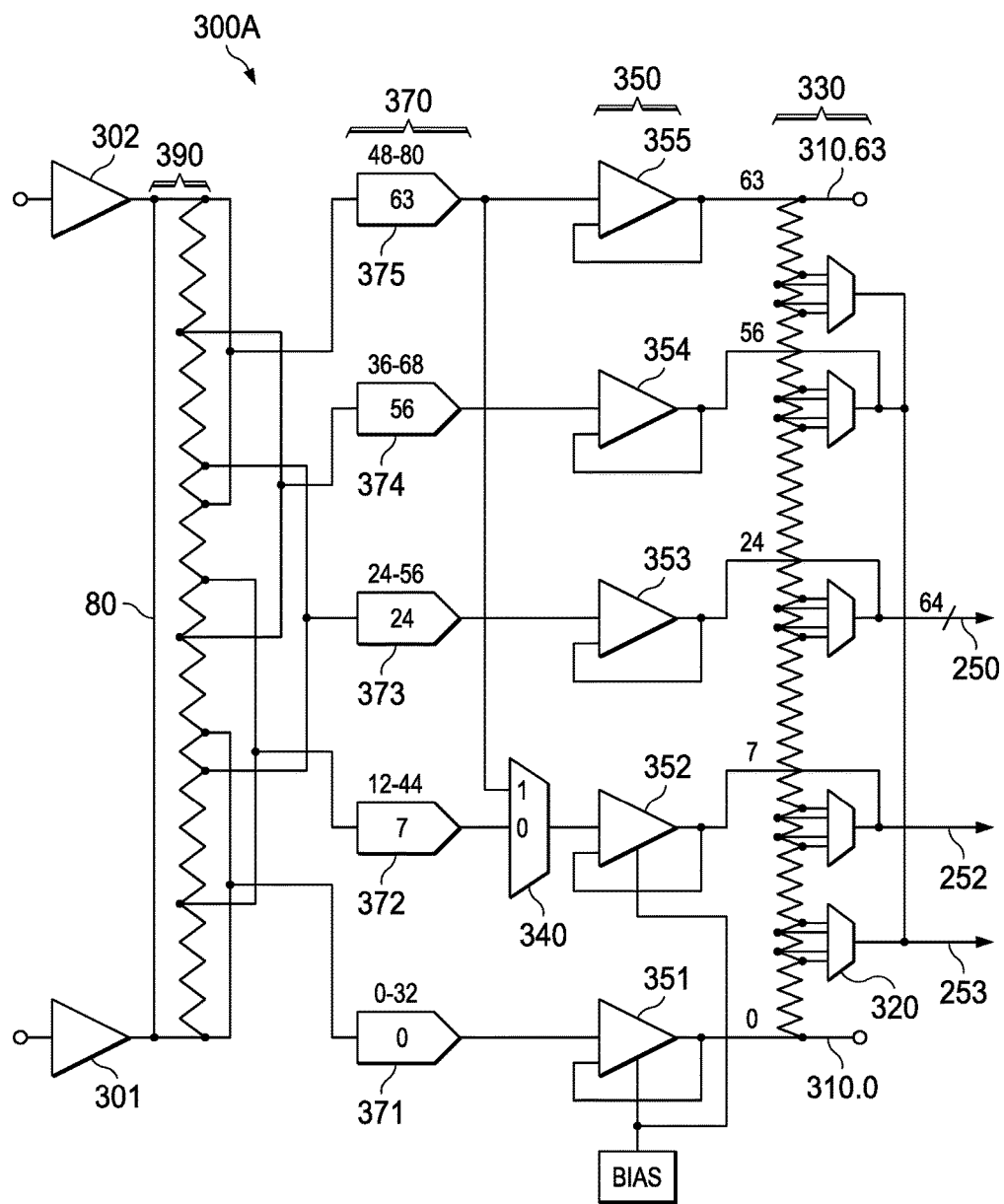
FIGS. 15A and 15B are a schematic of an example of the source driver circuit of FIG. 14.
Figure 15B:
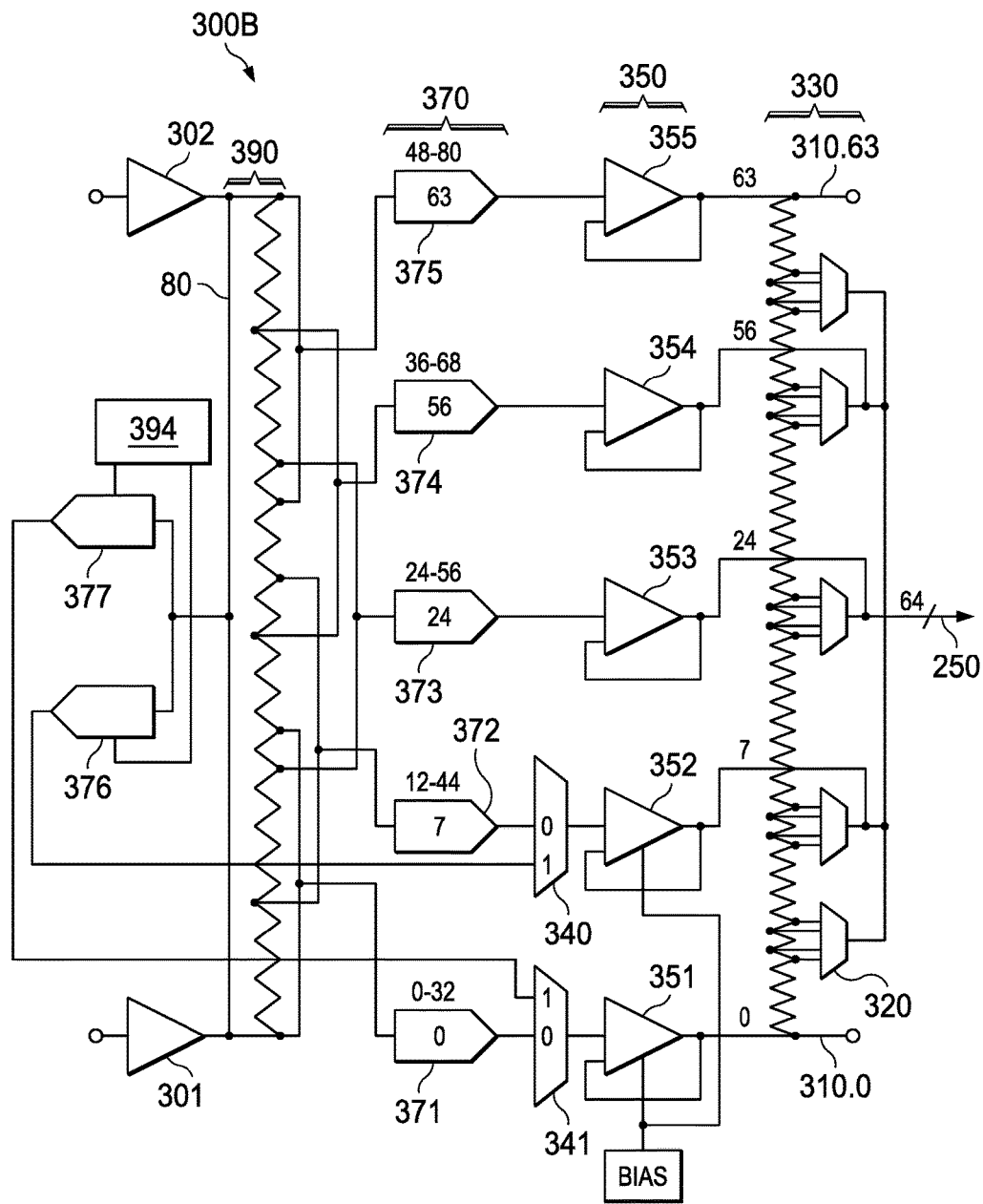
Figure 15C:
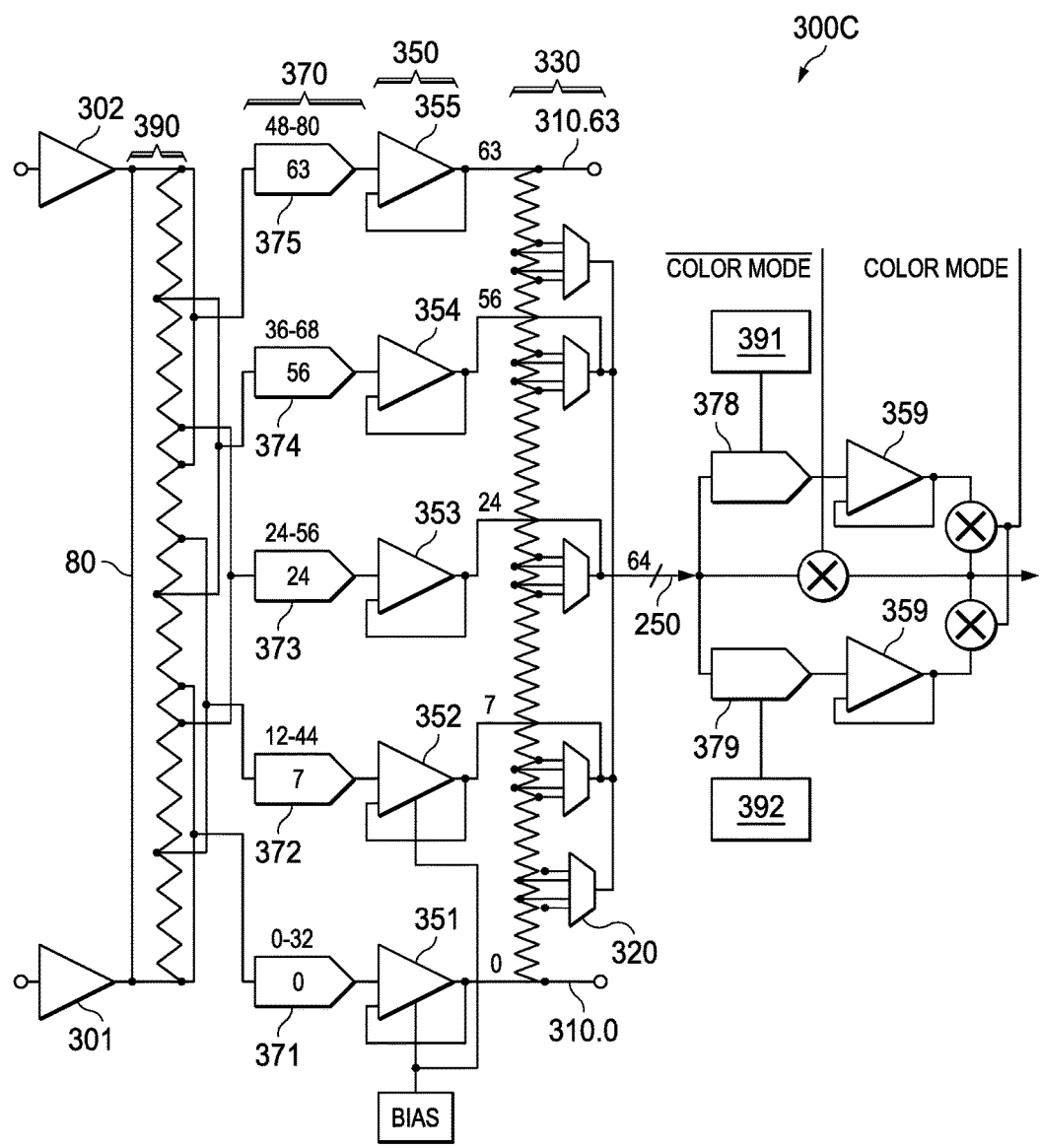

Turning to FIGS. 15A, 15B, and 16, an example of the source drivers or source driver circuit 1426 can be seen in greater detail. As shown, the circuit 1426 has channels 1502-1 to 1502-*n* (which can, for example, be 320 channels), and these channels 1502-1 to 1502-*n* are arranged in pairs (e.g., adjacent pairs) that receive odd and even video or RGB data over buses ODD and EVEN. In operation, address data is provided to address decoder 1504-1 to 1504-*m* over bus ADDR (which can, for example, be 8 bits wide). The address decoders 1504-1 to 1504-*m*, as shown, are shared between pairs of channel (e.g., 1502-1 and 1502-2) that receive odd and even video data. These channels 1502-1 to 1502-*n* can include cascaded or sequential red row latches 1506-1 to 1506-*n* and 1512-1 to 1512-*n*, cascaded or sequential green row latches 1508-1 to 1508-*n* and 1514-1 to 1514-*n*, cascaded or sequential blue row latches 1510-1 to 1510-*n* and 1516-1 to 1516-*n*, red tri-state buffers 1518-1 to 1518-*n*, green tri-state buffers 1520-1 to 1520-*n*, and blue tri-state buffers 1522-1 to 1522-*n*. The appropriate sets of tri-state buffer (i.e., red tri-state buffers 1518-1 to 1518-*n*) can be selected using the red select signal RS, green select signal GS, and blue select signal BS. Each channel 1502-1 to 1502-*n* also includes a level shifter 1524-1 to 1524-*n* and decoder 1526-1 to 1526-*n* that allow the digital video data from red tri-state buffers 1518-1 to 1518-*n*, green tri-state buffers 1520-1 to 1520-*n*, and blue tri-state buffers 1522-1 to 1522-*n* to be converted into an analog signal or voltage for driving a sub-pixel. The resulting analog voltages (after passing through multiplexers or muses 1528-1 to 1528-*n* and amplifiers 1530-1 to 1530-*n*) can be applied to pads 1532-1 to 1532-*n*. The glass demultiplexers 1534, 1536, and 1538 (which can be controlled by signals CKH1 to CKH3, respectively), red pass transistors Q1-1 to Q1-*n*, green pass transistors Q2-1 to Q2-*n*, and blue pass transistors Q3-1 to Q3-*n* at the intersections of rows and columns switch the analog voltage on the pads 1532-1 to 1532-*n* to the liquid crystal sub-pixel in the display 104.

Collectively, the source drivers 1426 and gamma reference circuit 232 can operates in two modes: a normal mode where video data streams into the LCD and a low power mode (three-bit or one-bit) where data from the partial display memory 1406 or other memory drives the display. In normal mode, video data streams from the system processor (e.g., 102). The image data is loaded into the output channels and each data value is converted into analog voltages supplied from the gamma reference circuit 232 to drive the color pixels in a liquid crystal display (e.g., 104). Normal mode can use eighteen (18) bits of data for each pixel. Each pixel has three sub-pixels, one for red, a second for blue and third for green. Each sub-pixel can be a 6-bit word. Thus, there can be 18 bits of data for each pixel including three 6-bit words, one for each sub-pixel. The source driver circuit 1426 can convert the digital data value for each sub-pixel into an analog voltage for driving the sub-pixel. Conversion is done one color at a time and each color conversion may be made with a separate gamma for each color. The driving analog voltage is applied to the liquid crystal at the sub-pixel location in the display.

Looking back to the cascaded or sequential red row latches 1506-1 to 1506-*n* and 1512-1 to 1512-*n*, cascaded or sequential green row latches 1508-1 to 1508-*n* and 1514-1 to 1514-*n*, cascaded or sequential blue row latches 1510-1 to 1510-*n* and 1516-1 to 1516-*n*, the source driver circuit 104 can output 36 bits of data at a. The data can be fed over busses ODD and EVEN. In the normal mode, each bus can carry 18 bits of data for one pixel and together the busses ODD and EVEN can carry the data for two adjacent (even and odd) columns. The address decoders 1504-1 to 1504-*n* can direct the data from one bus to the even latches (e.g., 1506-2) and odd latches (e.g., 1506-1). There can be a latch for each pixel. Within each latch can be three six-bit registers that hold 18 bits of RGB data for each pixel. After latches 1506-1 to 1506-*n*, 1508-1 to 1508-*n*, and 1510-1 to 1510-*n* are fully loaded, the contents can be transferred to the latches 1512-1 to 1512-*n*, 1514-1 to 1514-*n*, and 1516-1 to 1516-*n*. As a result, the channels 1502-1 to 1502-*n* can be loaded with data for future pixels. Data is usually into the latches 1506-1 to 1506-*n*, 1508-1 to 1508-*n*, and 1510-1 to 1510-*n* whether the device operates in normal mode, three-bit mode or one-bit mode. During three-bit mode, there are eight possible states for each sub-pixel: white, black, red, blue, green, and combinations of the colors to produce yellow, cyan and magenta. In one-bit mode, the sub-pixels are all the same and each pixel is only white or black.

To save power in 3-bit mode then, the clock signal output from the oscillator 1416 can be divided by 4. This divided oscillator signal can clock all the digital blocks. One or more unnecessary circuit blocks (e.g., backlight, not shown) can be gated off to save power. Eight 3-bit pixels can then be output at a time, and the address and address (bar) outputs will have the two least significant bits (lsbs) set to one, addressing eight, three-bit pixels at a time. The pix0 and pix1 outputs will pack the eight, three-bit pixels as shown in FIG. 6.

Typically, pixel blocks have 18 bits of data. For three-bit mode, the data of pixels blocks pix0 and pix1 are loaded into the even/odd (left/right) columns as shown. The loading is redundant and repeated four times. However, after four loads, each latch will have at least four bits for each sub-pixel. The two least significant bits in each sub-pixel latch of the data bus are not used. In the one-bit mode, the data for all three bits of one color are the same.

Turning to the decoders 1526-1 to 1526-*n*, data from latches 1512-1 to 1512-*n*, 1514-1 to 1514-*n*, and 1516-1 to 1516-*n* can be converted from digital to analog, one color at a time, in order to drive the source lines of the thin film transistors (e.g., Q1-1) on the display 104. Typically, the outputs of the latches 1512-1 to 1512-*n*, 1514-1 to 1514-*n*, and 1516-1 to 1516-*n* are multiplexed (through red tri-state buffers 1518-1 to 1518-*n*, green tri-state buffers 1520-1 to 1520-*n*, and blue tri-state buffers 1522-1 to 1522-*n*) to the level shifters 1524-1 to 1524-*n*. The level shifters 1524-1 to 1524-*n* operate in a digital domain to save power with a voltage of about 1.8V and the analog voltage up to about 5.5V. At any one time a single color, six-bit word representative of red, or blue or green, can be enabled and passed to the decoders 1526-1 to 1526-*n*. In other words, the data in registers in each of latches 1512-1 to 1512-*n*, 1514-1 to 1514-*n*, and 1516-1 to 1516-*n* can be sequentially converted from digital to analog voltages.

The decoders 1526-1 to 15226-*n* can at least in part function as digital-to-analog converters or DAC to convert digital signals to analog voltages. Each decoder 1526-1 to 1526-*n* can be a 64-to-1 analog multiplexer. For digital input from latches 1512-1 to 1512-*n*, 1514-1 to 1514-*n*, and 1516-1 to 1516-*n*, the decoders 1526-1 to 1526-*n* can select one of 64 input analog voltages, which can drive the color pixel. Each decoder 1526-1 to 1526-*n* is coupled to the bus GAMMA (which is typically 64 lines wide and which is coupled to gamma reference circuit 252). As will become clear below, each color in the gamma reference circuit 252 has its own gamma. Digital-to-analog conversion is usually performed serially, one color at a time. For example, upon setting red select, a 6-bit red word is input to the one of the decoder (e.g. 1526-1). The decoder (e.g., 1526-1) in this example receives 64 red reference voltage signals from which it selects the voltage level that corresponds to the 6-bit red word. Typically, decoders 1526-1 to 1526-*n* are a 64-to-1 analog multiplexers in the form of a tree decoder, and for any given 6-bit digital word, there is one valid path through the decoder tree. The input end of each potential valid path is coupled to one of the 64 reference voltages and the digital signals from latches 1512-1 to 1512-*n*, 1514-1 to 1514-*n*, and 1516-1 to 1516-*n* set the valid path to connect the analog voltage that corresponds to the digital signal.

Figure 17:
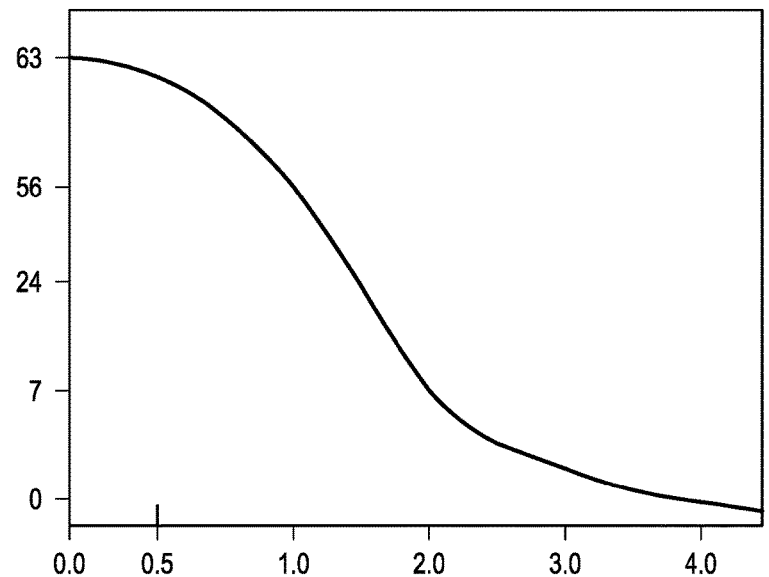
FIGS. 17-19 are schematics of examples of the gamma generation circuit in the source driver circuit 1426.

The analog output of each of the decoders 1526-1 to 1526-*n* is, as shown, coupled to a 3-to-1 analog multiplexer 1528-1 to 1528-*n*. As shown, each has three analog inputs (which includes an analog input representative of 6-bit data input for normal mode, and inputs, which are shown as 1B and 3B in FIG. 17, representative of 1-bit data inputs for 1-bit and 3-bit mode). Additionally, as shown, each has two control signals: one selects normal mode for decoding the first analog signal; and the other selects for the 1-bit and 3-bit modes. During normal mode, each of the multiplexers 1528-1 to 1528-*n* can receive the color analog voltage and pass it to its pad 1532-1 to 1532-*n*. However, during 3-bit mode, each of the multiplexer 1528-1 to 1528-*n* can take the zero or one data from the other analog inputs and can apply them to its pad 1532-1 to 1532-*n*.

The output of each multiplexer 1528-1 to 1528-*n* is, as shown, coupled to an amplifier 1530-1 to 1530-*n* that buffers the analog voltage during 18-bit mode from the pads 1532-1 to 1532-*n*. During normal mode, each multiplexer 1528-1 to 1528-*n* can pass the decoded analog voltage output to its operational amplifier 1530-1 to 1530-*n*. It buffers the color voltage signal and applies it to its pad 1532-1 to 1532-n. However, during 3-bit operation, each of the operational amplifiers 1530-1 to 1530-n can be powered down and a parallel switch can shunt the input to the output. As such, the output of each multiplexer 1528-1 to 1528-n during three-bit mode can be coupled to its pad 1532-1 to 1532-n. The each multiplexer 1528-1 to 1528-n can receive a reference voltage directly from the gamma reference circuit 232 and can apply the reference voltage directly to each multiplexer 1528-1 to 1528-n via the bypass connection of its operational amplifier 1530-1 to 1530-n.

As shown in the example of FIG. 16, the display 104 (which has shown is an LCD with a glass display) has thin film pass transistors Q1-1 to Q1-n, Q2-1 to Q2-n, and Q3-1 to Q3-n) (one for each color and for each pixel). The glass panel, as shown in this example, has three clock lines CKH1 (for red), CKH2 (for green), and CKH3 (for blue) that control, respectively, the operation of the red, green, and blue sub-pixels. As an example, the select signals RS, GS, and BS (which control red tri-state buffers 1518-1 to 1518-n, green tri-state buffers 1520-1 to 1520-n, and blue tri-state buffers 1522-1 to 1522-n) and the clock signals CKH1 to CKH3 may be the same or may be switched to be the same. In all cases, when CKH1 goes high, the red voltages for each of the columns are clocked into the red sub-pixels for the selected row. The color selection and clocking is repeated for blue, green until the entire row has its color voltages. A timing controller 1414 can control the clocking of the color select signals and the clock lines CKH1 to CKH3. The timing controller 1414 can also move from row to row until the display 104 is filled.

For example, the thin film transistor Q1-1 turns on when red is selected. The output analog voltage on the pad 1532-1 is applied to the red sub-pixel in the first column of the display 104. All the red sub-pixels are enabled simultaneously. The process is repeated for the other two colors until the row is entirely energized. The display 104 is capacitive and that feature allows the sub-pixels to be rapidly set to their color level determined by the 6-bit color word. The capacitive feature holds the voltage on the sub-pixels until the display is refreshed. As such, each sub-pixel is energized rapidly to provide a mix of three colors and the rows in the display are rapidly loaded to display a frame of an image. The sequencing of the illumination of the red, green, and blue sub-pixels occurs in too short a time to be notice by the human eye and the capacitance of the display is sufficient to maintain the appearance of continuous color.

Turning to FIG. 17, an examples of the gamma reference circuit 232 (which is labeled 232-A) can be seen. As shown, it is a network of eighty range resistors 1608, five range decoders or digital-to-analog converters (DACs) 1610, five range amplifiers 1612, a reference resistor string 1614 with 64 reference voltage outputs and 64, 4-to-1 analog multiplexers 1616. For the sake of simplicity of illustration, FIG. 17 shows only five output multiplexers. The outputs of the multiplexers 1616 are placed on the 64 line output bus GAMMA to provide a selection of 64 reference voltages to the DACs (i.e., decoders 1526-1 to 1526-n). The gamma reference generator 232-A is capable of generating separate gamma values for each color, both for positive and negative voltages. The gamma reference generator 232-A overcomes the problem of look up tables and instead is a real time analog voltage generator for the display 104. The gamma reference generator 232-A is also capable of switching on the fly from one gamma curve to another to enable the display to have different gammas for each color. The gamma reference generator 232-A is adjustable to be compatible with gammas for different displays. Each gamma value may be altered to accommodate different displays.

Those skilled in the art understand that the polarity applied to the liquid crystals should be reversed periodically. If a single polarity voltage is continuously applied to a liquid crystal the crystal may become permanently oriented or lose its ability to change. As a result a ghost image will be imposed on the display (e.g., 104). In order to avoid this problem the voltages applied through buffers 1604 and 1606 are periodically reversed to provide opposite polarity voltages to the lines/rows of the display. A typical technique is line inversion where each line has a first polarity voltage applied in one frame and an opposite polarity voltage applied in the next frame. Another technique is pixel inversion where adjacent pixels a first frame have opposite polarities and the polarities on the pixels are reversed on the next frame. Inversion is usually accomplished by the reversal of the polarity signal in FIG. 17. This in effect "flips" or inverts the range resistor string by applying a low voltage to the upper end and a high voltage to the lower end or vice versa. Once these voltages are changed, the voltages propagate through the gamma reference and the gamma curve is inverted without any additional circuit changes.

The operation of the gamma reference generator 232-A is best explained from the reference resistor string 1616 back to the input range resistor string 1608. The gamma reference generator 232-A outputs 64 reference voltages ranging from zero ($V_{REFMIN}$) to a maximum ($V_{REFMAX}$). However, the 64 outputs are not linear. Those skilled in the art understand that the driving voltages for and LCD should vary non-linearly. Human perception of color is not linear and thus the reproduction of color images by LCDs must be nonlinear in order to appear acceptable to the viewer. In addition the transmissivity response of the LCD is non-linear and is built into the gamma curve.

As an example, the decoders 1526-1 to 1526-n have 64 reference voltages. Those reference voltages are found at taps on the reference resistor string 1614. The non-linearity is programmed into the reference resistor string 1608 in several ways. First, the spacing between the taps is not equal. As such, voltage drops between sequential taps are different. Second, the reference voltages at five taps (0, 7, 24, 56, and 63) on the string 1608 are driven by five operational amplifiers 1612. Those amplifiers are coupled to range DACs 1610 that select the reference voltage from the range resistor string 1608. This provides a coarse adjust of the gamma curve and allows the user to have different gamma curves on the fly for red, green, or blue, positive and negative. In effect, this is six sets of voltages.

The resistor string 1608 typically has 80 taps that are equally spaced from each other. The string 1608 can provide a linear voltage divider of equal voltage divisions. There are five range DACs 1610. Each range DAC selects one of 32 possible reference voltages available on the range resistor string 1608. For example, one of the DACs 1610 may connect to any tap between 0 and 32. Range DACs 1610 can allow the user to modify the gamma output voltages of the output reference resistor string 1614 by modifying the input voltages to resistor string 1614. For example, the reference voltage at location 24 on the reference resistor string 1614 can be adjusted by altering the tap input to a range DAC. Of course, that will affect the voltages between locations 7 and 56. Voltages may driven at five locations, 0, 7, 24, 56 and 63. Voltages between locations are determined by the selected location between two driven locations. For example, the voltages between locations 24 and 7 are the result of a voltage divider that has non-uniform steps between locations 24 and 7. In order to achieve this result, the outputs of 4-to-1 multiplexers at various locations are coupled to the outputs of their respective range amplifiers 1612.

For example, the voltage drop across the range resistor string 1614 varies from the high reference voltage $V_{HR}$, typically 3-5 volts, to the low reference voltage $V_{AR}$, typically ground, or zero. Although there are only 80 resistances, each DAC 1610 receives thirty-two reference voltages from the range resistor string 1608. As such, there is a relative large overlap of reference voltages among the DACs 1610. The outputs of the DACs 1610 are the break points of a four-segment non-linear curve. Each range DAC is individually selectable to establish a reference voltage at one of the ends of the range. The voltage drop from one region to the next is different and the individual steps are typically nonlinear.

Figure 21:
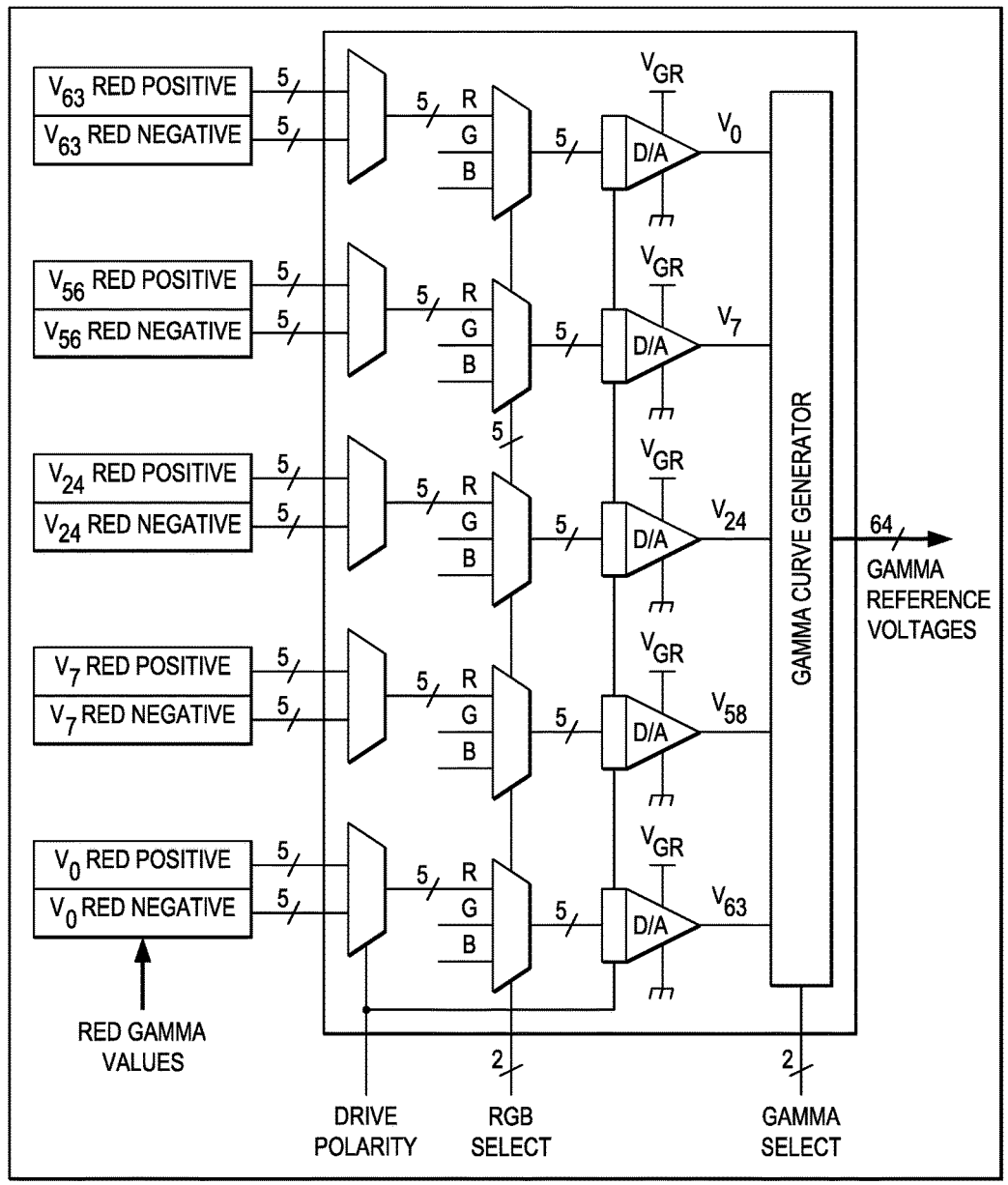
FIG. 21 is graphical illustration of an example gamma curve.

For example, FIG. 21 displays a typical gamma curve for one color. It has 64 nominal levels. Between level 63 and level 56, the output voltage may vary by one volt. However, between level 56 and level 24, the voltage change is about 0.4 volts. Between the level 24 and level 7, the voltage changes by about 0.7 volts. Between level 7 and level 0, the change is almost two volts. Stated another way, the resistance value between tap 63 and 62 is not the same as the resistance value between the tap 62 and 61. Tapping into the reference resistor string at different and unequal locations generates the nonlinear gamma output.

The gamma reference generator 232-A can divide the gamma curve into four adjustable curve regions: 63-56, 56-24, 24-7 and 7-0. The range DAC determines one end of each region and the output taps determine the other end of the curve region. The maximum output voltage, approximately 4 volts, is at level 63 and the minimum voltage, zero, is at level 0. The voltages at levels 63, 56, 24, 7 and 0 may be configured to the display specifications.

The low power mode may use one bit or three bits. In the one bit mode, users often prefer to use black and white. However, it is also possible to use any color that can be created using the range of voltages that can be supplied by the DACs 1610. One color may be a background color and the other color a foreground color. It is also possible to switch from one foreground color to another. For example, when battery power is low, a manufacturer could set the gamma generator circuit to switch the foreground color from white to red and thus use the color to warn of low power in addition to a text message or low power image. In three bit mode, the sub-pixels switch differently to provide color. In the one bit mode the sub-pixels switch the same (i.e., have the same value) to provide only two colors, typically black and white.

In typical low power mode the colors are at their maximum values and one may generate red, green, blue, cyan, magenta, yellow, black and white. Three bit mode uses primary colors (red, green, or blue) or combinations of those colors. Each color may be high or low. However, a feature of the invention is that the colors may be set to less than their maximum or minimum. As such, a lighter shade of red (a voltage less than the highest possible voltage) is selectable. Selection is made by the range multiplexers 1616. By setting red at less than its maximum value and other colors at their maximum, the red contribution is reduced. In this way, by varying the contribution from each color, the gamma circuit is not limited to the basic combinations of red, green and blue, but rather a set of eight (in 3-bit mode) or two (in 1-bit mode) custom colors.

One of the features of the invention is its flexibility to provide optimum power in normal mode and to save power in low power mode. In normal mode, each channel (column) is individually driven by an amplifier (e.g., 1530-1). However, in low power mode, the amplifiers 1530-1 to 1530-*n* are shut down and the display is centrally driven by only two of the range amplifiers. During low power mode, amplifiers 1530-1 to 1530-*n* and range amplifiers 1612 are powered down and all the gamma multiplexers 1616 are discoupled. A bias circuit 1618 can boost the power of some range amplifiers 1612 by enough to drive the display from a central gamma reference.

In low power mode, the channel driver may only use a high and low voltage. Since the high and low voltages are used, the reference resistor string 1614 is not needed and it is effectively decoupled to save power. The low power voltages are not decoded. Instead, the analog voltage corresponding to the low power mode signal is directly coupled to the multiplexers 1528-1 to 1528-*n*. As such, the bias circuit 1618 and the amplifiers 1612 power the display. A color mode multiplexer 1620 is coupled to the high reference voltage. When color mode is selected and the device enters low power mode, the high reference voltage is coupled directly to the one of range amplifiers 1612. Two valid reference voltages appear and they are at locations 0 and 7 and are applied to the bus GAMMA. Compared to other circuit traces, the circuit traces that carry voltage and current from the zero and 7 locations to the channel multiplexers 1528-1 to 1528-*n* are larger than the rest. The larger size reduces the resistance which in turn enables the display to be driven from a central location.

Figure 20:
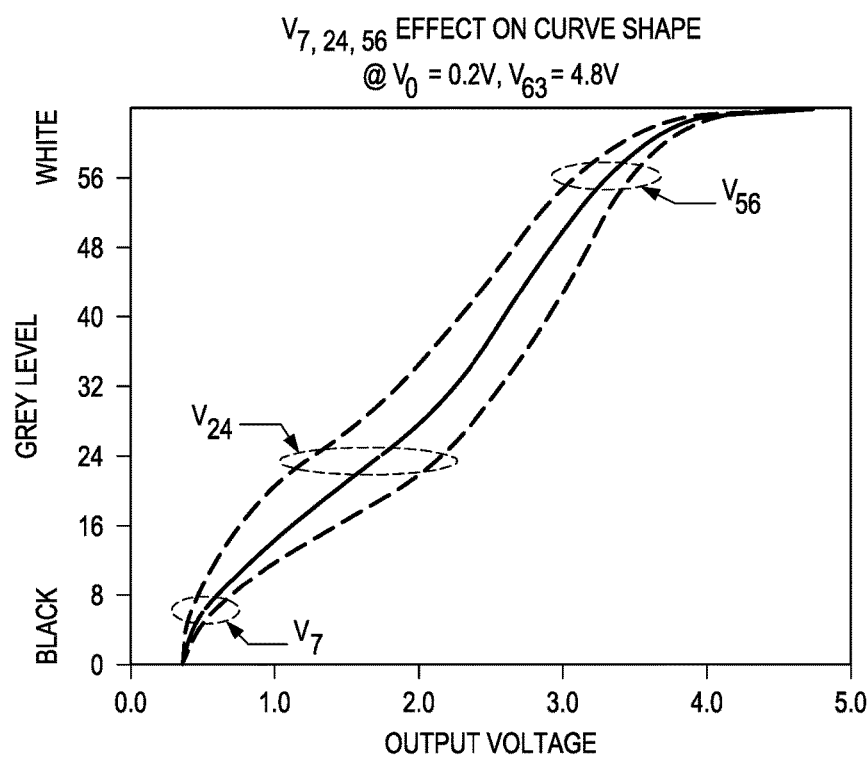
FIG. 20 shows an example of how pixels are packed in the three-bit mode.

In low power three-bit mode, the channel driver performs data packing as explained above in connection with FIG. 20. Referring to FIG. 14, the tri-state switches 1518-1 to 1518-*n*, 1520-1 to 1520-*n*, and 1522-1 to 1522-*n* receive the three-bit data. Each color is, in effect, demultiplexed and passed to the multiplexer 1528-1 to 1528-*n* via the LSBs that control the multiplexer (e.g., 1528-1). The gamma multiplexers 1616 are powered down, and this eliminates the possibility of contention during three-bit mode.

The 64 gamma multiplexers 320 allow the manufacturer to adjust the individual tap points of the reference resistor string 330. Each multiplexer has four or more input tap points. A select signal on the multiplexer allows the user to select desired tap points. The reason there are not 64 DACs, one for each gamma reference voltage, is that reference voltages 0 and 63 are always endpoints of the curve and are always coupled to the ends of the reference resistor string.

The 64 gamma output multiplexers 320 permit further adjustment. For example, in the preferred embodiment each gamma multiplexer 320 is a 4-to-1 analog multiplexer for generating four distinct gamma curves. However, the multiplexers could be of any size, greater or smaller than the preferred embodiment, including, and not limited to, for example, 8-to-1 or 3-to 1.

Figure 18:
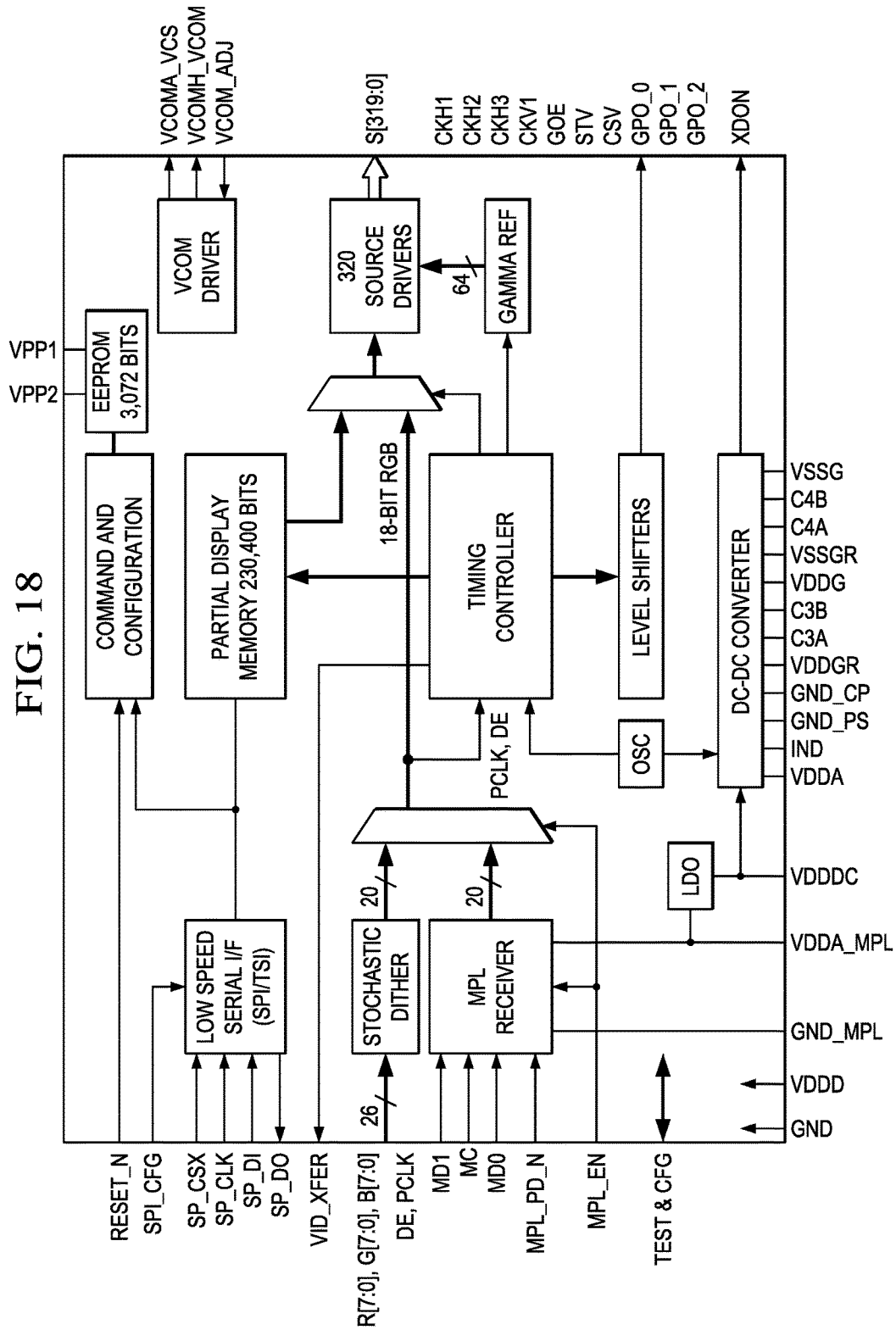

Turning to FIG. 18, another example of the gamma reference circuit 232 (labeled 232-B) can be seen. This circuit 232-B has an alternate low power color palate. The gamma reference circuit 232-B has two 64-to-1 DACs 1624 and 1626 coupled to the range resistor string 1608. Color registers in block 1626 can set the DACs 1624 and 1626 to select one of the locations on the reference resistor string 1608. Each DAC 1624 and 1626 may select one of 80 voltages from the full range of the range resistor string 1608. One of the DACs 1624 and 1626 is set for a higher voltage and one for lower. The color register settings lets the manufacturer individually adjust the on and off intensity of each of the colors red, blue, green, to provide more colors for low power mode. In operation, control signals in the multiplexers 1620 and 1628 select the outputs of the DACs 1624 and 1626 and other controls shut down DACs 1610, and range amplifiers 1612. Range amplifiers (show at the bottom) have their inputs coupled to the outputs of the select multiplexers 1620 and 1628 and have outputs are coupled to lines 1B and 3B for directly driving the display 104.

An alternate method provides more color resolution by adding a 64-to-1 multiplexer at the output of the reference resistor string 1614 and keep the range amplifiers 350 powered up during three-bit mode. That would provide 64 output reference voltages, which could be applied directly to the pads (e.g., 1532-1). For example, one skilled in the art could leave all the gamma multiplexers powered up, use the multiplexers to select the high and low voltage for the a given color, and then directly apply the color from the gamma multiplexers to the channel drivers. One would need two additional 64-to-1 multiplexers and two buffers to drive the columns directly from the gamma reference circuit 232. This would allow a user to select a color in low power mode in a manner similar to the ability in normal mode. In effect, one could have one independent color and seven other colors dependent on the one independent color.

Figure 19A:
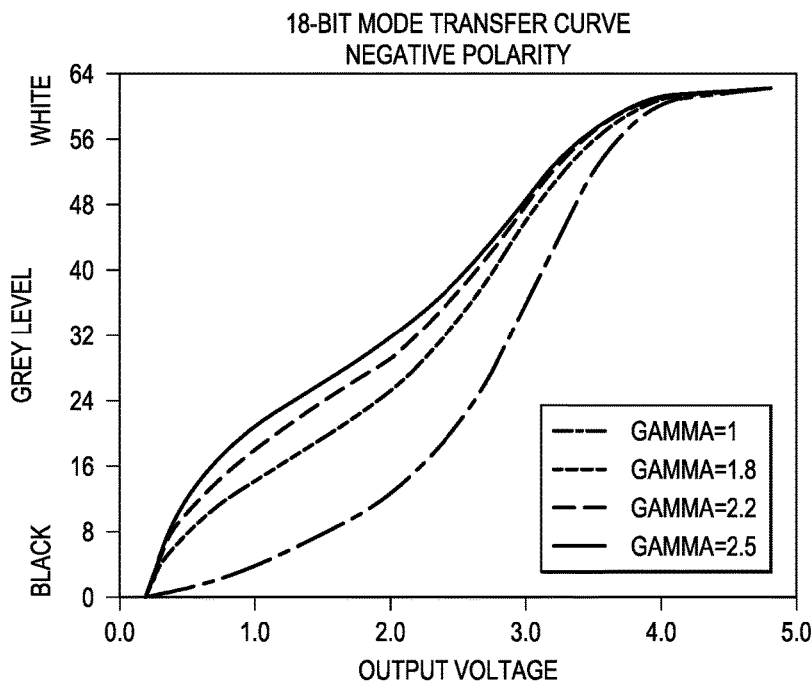
Figure 19B:
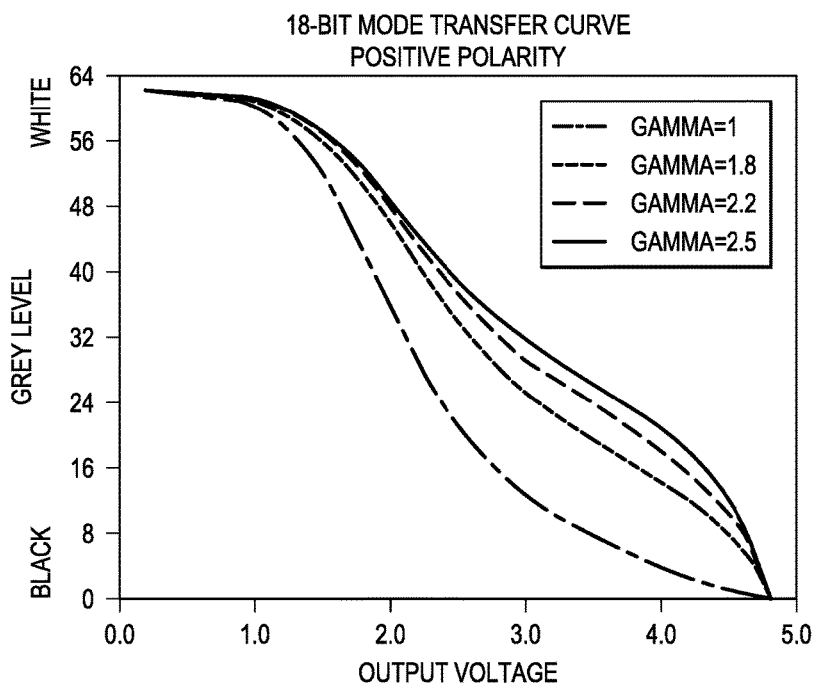

Gamma generator circuit 232-C diagrams this approach and is shown in FIG. 19. There 64-to-1 decoders 1634 and 1636 are coupled to the bus GAMMA. Inputs to amplifiers 1638 and 1640 are coupled, respectively, to the outputs of the decoders 1634 and 1636 and the amplifier outputs are coupled to larger-than-normal output lines in bus GAMMA to drive the display 104. Color registers 1630 and 1631 set the color levels in the decoders 1634 and 1636. In operation, the entire gamma circuit 232-C remains fully on. While this example consumes more power, it has the added advantage of a broader selection of colors because the color selection is made from the 64 bit output of the circuit 232-C.

Figure 22:
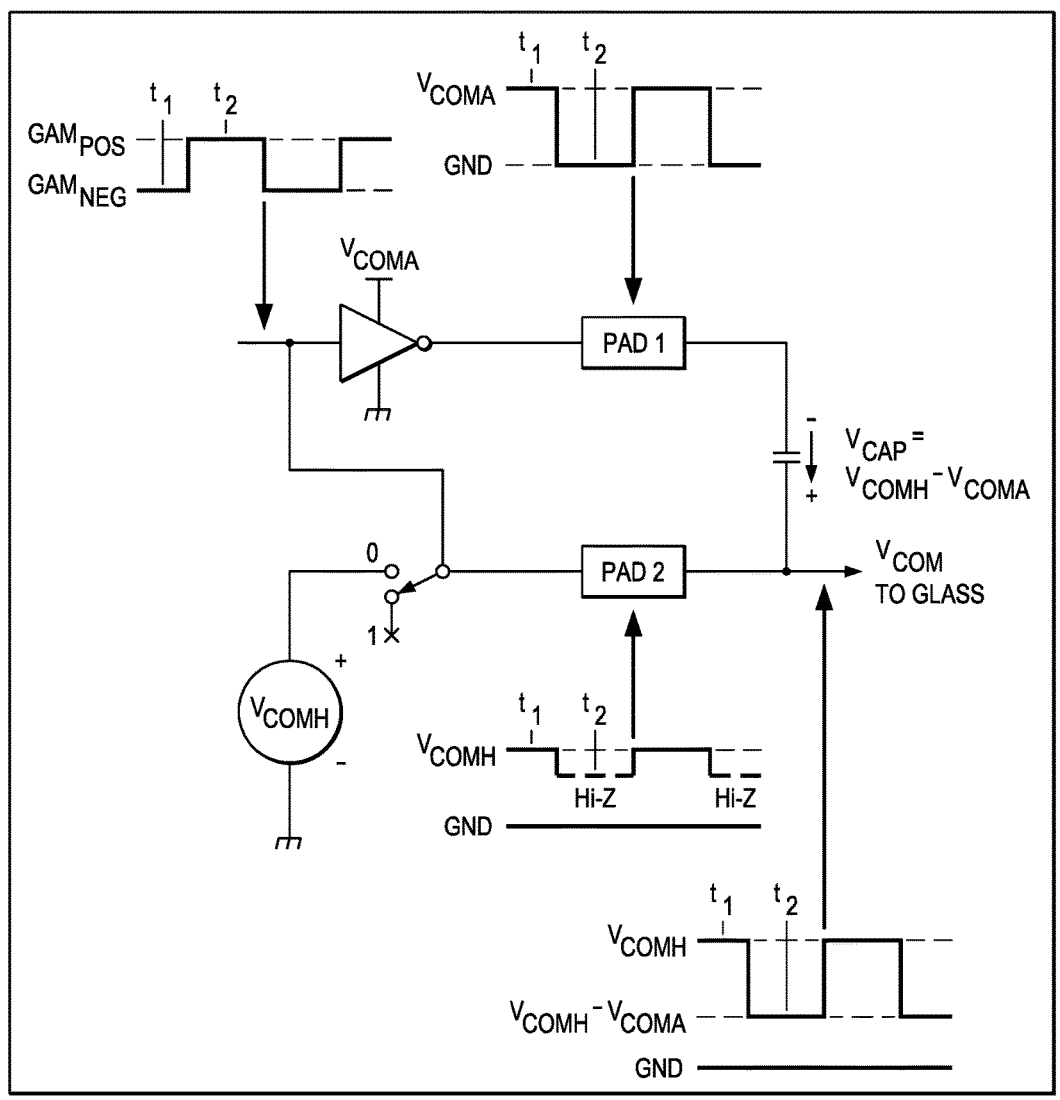
FIGS. 22 and 23 illustrate possible negative and positive gamma polarity curves, respectively.
Figure 23:
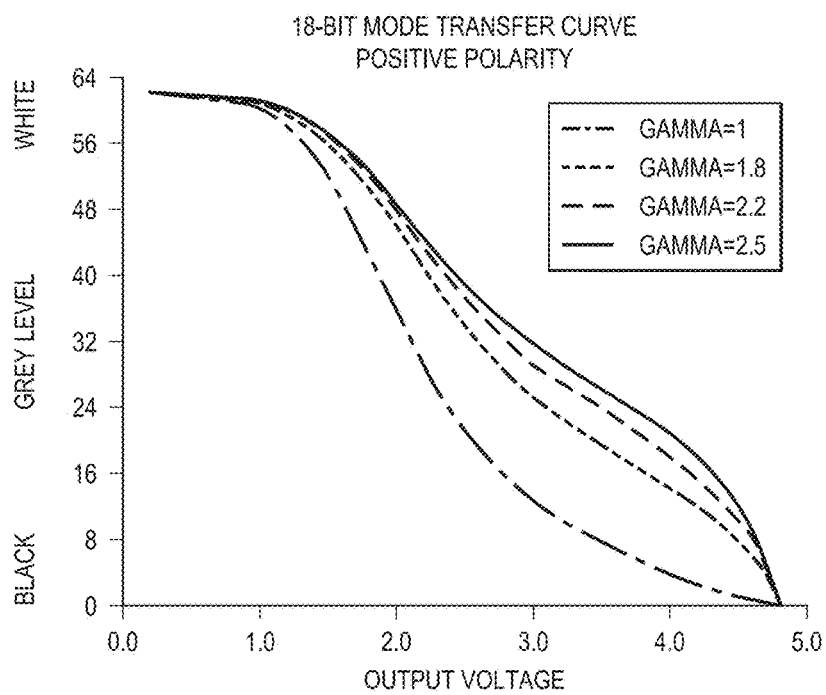

Referring to FIGS. 22 and 23, which illustrate possible negative and positive intrinsic curve shapes, respectively, after selecting the intrinsic curve which most closely matches the desired characteristic, the curve shape can then be optimized to better match the desired characteristic through the use of the gamma register settings. The shape and gamma labels in these figures are for illustration purposes only. The GAMMA_CFG1 [7] register bit determines whether one of these four shapes is used with all three color channels or if separate curves or adjustment settings are selected for each color channel. This same intrinsic shape may be used for the green and blue curves with different optimization settings (see below discussion of optimization settings), or different intrinsic shapes and optimization settings may be chosen for each color channel. For a given color channel, the same intrinsic curve shape will be used for both drive polarities.

Figure 25:
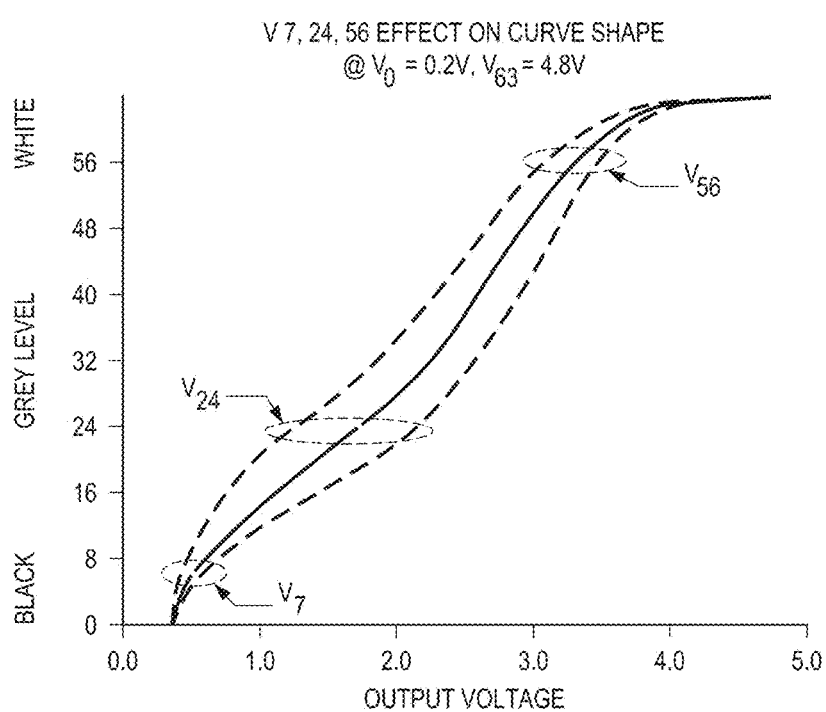
FIG. 25 illustrates an example of a gamma curve adjustment.

Referring to FIGS. 24A and 24B, values can be generated in accordance with equations for four intrinsic gamma curves as shown. Referring to FIG. 25, the selected intrinsic curve shape may be optimized by setting the voltage values of the endpoints (V0 and V63) and of three taps (V7, V24 and V56) via range adjustment DACs (referred to as Range DACs). According to an example embodiment, the settings for the positive polarity gamma curve are independent from those for the negative polarity gamma curve, though the same intrinsic curve shape will be used for both drive polarities. The voltages for V0, V7, V24, V56 and V63 are determined by the $V_{GR}$ reference voltage which is adjustable to match the curve dynamic range by the VDD_ADJ[7:5] register bits and the Gamma Reference registers. The settings for VDDA and VGR in the VDD_ADJ register should be determined as follows: calculate VGR setting required base upon the most positive value of VCOMH, VCOMA, V0+ or V63− using predetermined relationships; and calculate the value of VDDA from the maximum value for VGR, VDDGR, VSSGR plus operating voltage headroom.

Figure 26:
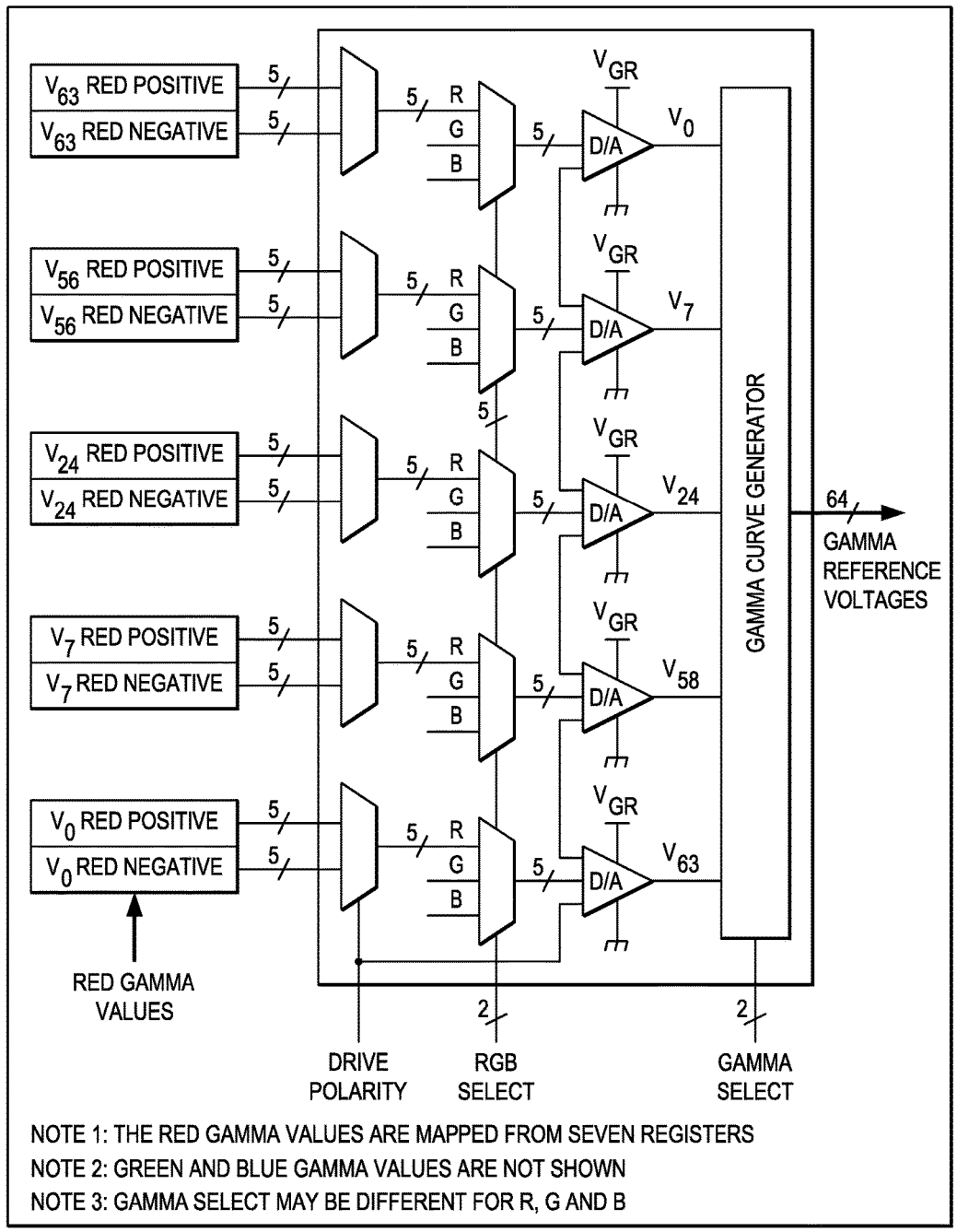
FIG. 26 is a block diagram of an example gamma reference architecture.

Referring to FIG. 26, the architecture of the Gamma reference circuit 232 can be implemented as shown (for simplicity, only the Range DAC optimization registers for the red channel are shown). The DRIVE POLARITY signal is provided by the Timing Controller and does two things: select the adjustment values for either the negative or for the positive drive polarities, for each of the colors (green and blue registers are not shown); and select the correct output voltage ranges for the D/A converters. For negative drive polarity, the D/A for $V_0$ will generate a voltage near ground, and the D/A for $V_{63}$ will generate a voltage near $V_{GR}$ (FIG. 19A). For positive drive polarity, the D/A for $V_0$ will generate a voltage near $V_{GR}$, and the D/A for $V_{63}$ will generate a voltage near ground (FIG. 23). If GAMMA_CFG1 [7]=0, the RGB select signals will always select the values corresponding to the red channel. If GAMMA_CFG1 [7]=1, the RGB select signals from the Timing Controller select the red, green or blue gamma values according to the clock signals CKH1, CKH2 and CKH3 and the RGB/BGR select bits (SCAN[7] and SCAN[0]).

Figure 27:
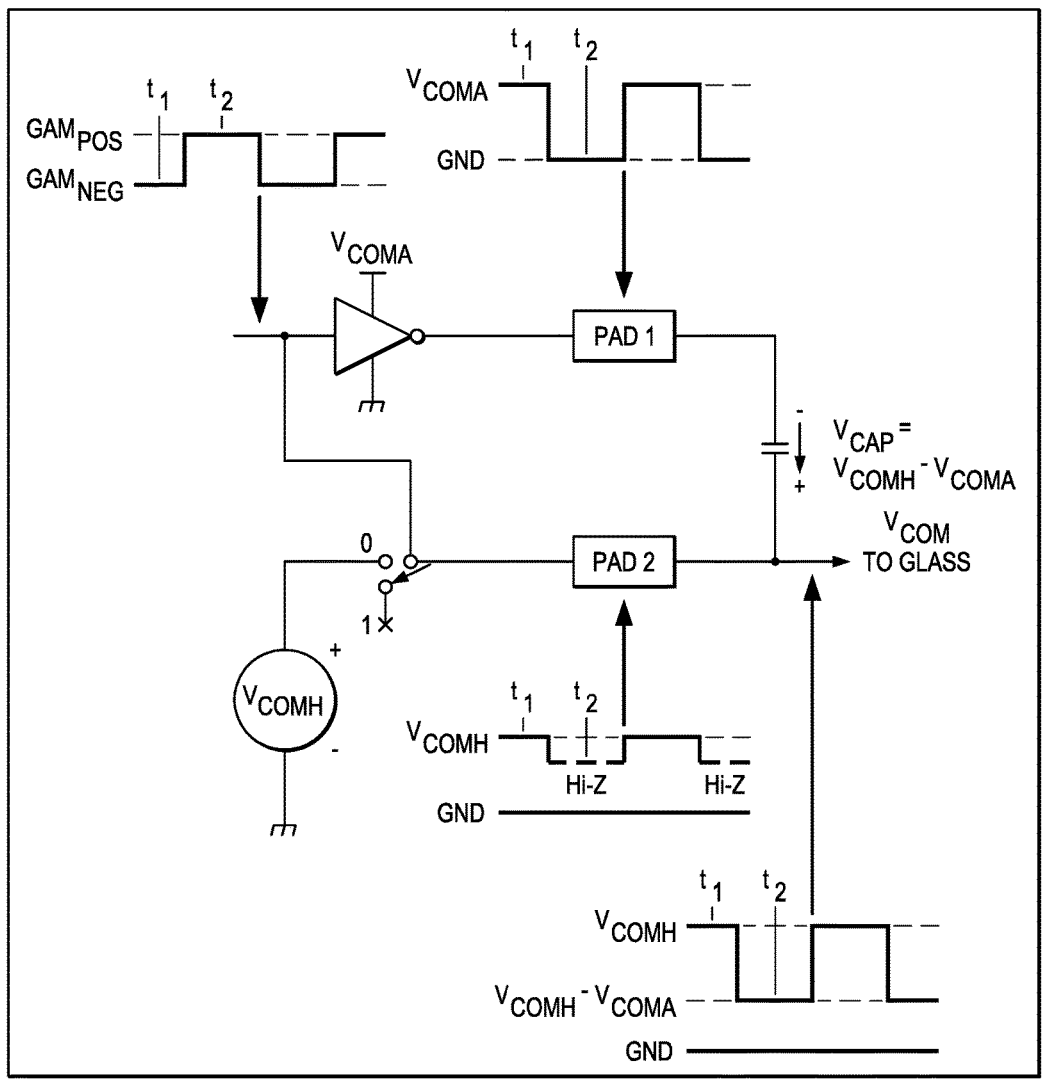
FIG. 27 is a block diagram of an example of an AC VCOM circuit of FIG. 14.

Referring to FIG. 27, DC VCOM or AC VCOM drive may be selected by the VCOM_ADJ[7] register bit. The AC VCOM drive scheme utilizes two device pins and an external coupling capacitor. In this mode, the VCOMA_VCS pin (Pad 1) is functioning to output the VCOMA signal to the coupling capacitor. The second device pin, VCOMH_VCOM (Pad 2), is functioning to establish the dc value of the VCOM node during the high time of the waveform. The AC VCOM Mode is selected by setting VCOM_ADJ[7]=1. The VCOM AC signal is provided at the VCOMA_VCS pads. The amplitude of this signal is set by the VCS_ADJ register.

The VCOMH_VCOM output is used to clamp the VCOM high level, and should be coupled directly to the VCOM line to the glass. If VCOM_ADJ[6]=0, this high level is determined by VCOM_ADJ[5:0]. If VCOM_ADJ[6]=1, this high level is adjusted by an external voltage coupled to the VCOM_ADJ pin. The VCOMH_VCOM pads should be coupled directly to the VCOM input of the glass, and the VCOMA_VCS pads should be coupled through a large capacitor to the VCOM input to the glass.

During time $t_1$, pad 1 (VCOMA_VCS signal) is driven to the voltage $VCOM_A$ and pad 2 (VCOMH_VCOM signal) is driven to the voltage $VCOM_H$. As a result, the VCOM voltage to the glass will be equal to $VCOM_H$ and the external capacitor will be charged to a voltage of ($VCOM_H$−$VCOM_A$). During time $t_2$, pad 1 is driven to ground and pad 2 is floating. Because the external capacitor remains charged to a voltage of ($VCOM_H$−$VCOM_A$), the voltage on pad 2 (the VCOM signal to the glass) will be also equal to ($VCOM_H$−$VCOM_A$). Thus, the VCOM voltage applied to the glass will swing between $VCOM_H$ and ($VCOM_H$−$VCOM_A$).

The DC VCOM Mode is selected by setting VCOM_ADJ [7]=0. In this case the DC VCOM voltage to the glass is provided by the VCOMH_VCOM output. The $C_{STORE}$ voltage to the glass (VCS) is provided by the VCOMA_VCS output. The DC level of VCOMA_VCS is set by the VCS_ADJ register.

Flicker is minimized by setting the VCOMH_VCOM level either by changing the VCOM_ADJ[5:0] register or by adjusting an external voltage coupled to the VCOM_ADJ pin. If the register method is used, then the optimized value for the VCOM_ADJ register should be included in the Sleep Out initialization profile in the EEPROM such that the register is always set to the optimized value during the power-up sequence. Alternatively, if multiple gamma curves and VCOM settings are used in the operation of the device, the optimized VCOM_ADJ setting can be included in the appropriate Gamma Set command profile. In this manner, it is possible to optimize flicker independently for each Gamma Curve selection.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A circuit suitable for use in a system with an LCD (liquid crystal display), comprising:
   an LCD display driver integrated circuit(IC),including multiple LCD source driver circuits and a gamma reference circuit;
   each LCD source driver circuit to
   convert video image data input to the LCD display driver integrated circuit into N analog gray-level gamma-adjusted source voltage signals, each based on a respective one of N gamma reference voltages, and
   drive out the gamma-adjusted source voltage signals;
   the gamma reference circuit to generate the N gamma reference voltages based on at least one pre-defined gamma curve that includes the N (0 to N−1) gamma reference voltages divided into M−1 regions defined by M breakpoint voltages corresponding to M−1 segments of the gamma curve, including
      a gamma-breakpoint circuit, including
         a range resistor string with a sequence of voltage taps;
         M breakpoint digital-to-analog converters (DACs), designated DAC(1) to DAC(M),
         each breakpoint DAC including inputs coupled to a respective subset of the voltage taps of the range resistor string, where at least some of the M subsets of voltage taps overlap, and
         each breakpoint DAC to output a respective breakpoint voltage based on the respective subset of voltage taps, including
            a breakpoint voltage BP(1) from breakpoint DAC(1) and a breakpoint voltage BP(M) from a breakpoint DAC (M), and
            intermediate breakpoint voltages BP(2) to BP(M−1) from respectively breakpoint DAC(2) to DAC(M−1);
      a gamma-reference output circuit to generate the N gamma reference voltages, including
         a reference resistor string having a set of reference voltage taps, and
         N reference multiplexers, designated MUX(0) to MUX(N−1) each to select from a subset of the reference voltage taps of the reference resistor string, and to generate at an output a respective one of the N gamma reference voltages,
         the reference resistor string including a first end point provided by the breakpoint voltage BP(1) from DAC(1), and a second end point provided by the breakpoint voltage BP(M) from DAC(M),
         M−2 selected reference multiplexers designated MUX(2) to MUX(M−1) each having its output coupled respectively to the intermediate breakpoint voltages BP(2) to BP(M−1) from DAC(2) to DAC(M−1).

2. The circuit of claim 1, wherein N=64, M=4 and the M breakpoint voltages correspond to reference voltages N=0, 7, 24, 56, 63.

3. The circuit of claim 1, wherein the gamma reference circuit to generate the N gamma reference voltages selectively for each of multiple pre-defined gamma curves, and, for each selected gamma curve,
   the gamma-breakpoint circuit to generate respective M breakpoint voltages corresponding to M−1 segments for the selected gamma curve;
   the gamma-reference output circuit to generate the N gamma reference voltages from the N reference multiplexers, including the M−2 selected reference multiplexers having respective outputs coupled respectively to the intermediate breakpoint voltages BP(2) to BP(M−1)from the gamma-breakpoint circuit.

4. The circuit of claim 3,
   wherein gamma-breakpoint circuit includes polarity inversion circuitry to selectively invert a polarity of the voltages at respective endpoints of the range resistor string corresponding to positive and negative pre-defined gamma curves; and
   wherein the multiple pre-defined gamma curves are for at least one of (a) red, green and blue, and (b) positive and negative inversion polarity.

5. The circuit of claim 1, further comprising:
   M buffer amplifiers coupled to respective breakpoint DACs, to output respective buffered breakpoint voltages BP(1) to BP(M).

6. The circuit of claim 1, the gamma-breakpoint circuit further including
   first and second inversion buffers coupled to the range resistor string respectively at first and second endpoints;
   the first and second inversion buffers switched between high/low and low/high voltage outputs to invert a polarity of the voltages at the first and second endpoints.

7. The circuit of claim 1, wherein spacings between the reference voltage taps of the reference resistor string are selectively non-uniform, to provide programmable nonlinearity for the pre-defined gamma curve.

8. An LCD display system, comprising:
   an LCD (liquid crystal display);
   an LCD display driver including,
      multiple LCD source driver circuits, and
      a gamma reference circuit;
   each LCD source driver circuit to
      convert video image data input to the LCD display driver into N analog gray-level gamma-adjusted source voltage signals output to the LCD, each based on a respective one of N gamma reference voltages, and
      drive out the gamma-adjusted source voltage signals to the LCD;
   the gamma reference circuit to generate the N gamma reference voltages based on at least one pre-defined gamma curve that includes the N (0 to N−1) gamma reference voltages divided into M−1 regions defined by M breakpoint voltages corresponding to M−1 segments of the gamma curve, including a gamma-breakpoint circuit, including
a range resistor string with a sequence of voltage taps;
M breakpoint digital-to-analog converters (DACs), designated DAC(1) to DAC(M), wherein
each breakpoint DAC including inputs coupled to a respective subset of the voltage taps of the range resistor string, where at least some of the M subsets of voltage taps overlap, and
each breakpoint DAC to output a respective breakpoint voltage based on the respective subset of voltage taps, including
a breakpoint voltage BP(1) from breakpoint DAC(1) and a breakpoint voltage BP(M) from a breakpoint DAC (M), and
intermediate breakpoint voltages BP(2) to BP(M−1) from respectively breakpoint DAC(2) to DAC(M−1); and
a gamma-reference output circuit to generate the N gamma reference voltages, including
a reference resistor string having a set of reference voltage taps, and
N reference multiplexers, designated MUX(0) to MUX(N−1) each to select from a subset of the reference voltage taps of the reference resistor string, and to generate at an output a respective one of the N gamma reference voltages,
the reference resistor string including a first end point provided by the breakpoint voltage BP(1) from DAC(1), and a second end point provided by the breakpoint voltage BP(M) from DAC(M),
M−2 selected reference multiplexers designated MUX(2) to MUX(M−1) each having its output coupled respectively to the intermediate breakpoint voltages BP(2) to BP(M−1) from DAC(2) to DAC(M−1).

9. The system of claim 8, wherein N=64, M=4 and the M breakpoint voltages correspond to reference voltages N=0, 7, 24, 56, 63.

10. The system of claim 8, wherein the gamma reference circuit to generate the N gamma reference voltages selectively for each of multiple pre-defined gamma curves, and, for each selected gamma curve,
the gamma-breakpoint circuit to generate respective M breakpoint voltages corresponding to M−1 segments for the selected gamma curve;
the gamma-reference output circuit to generate the N gamma reference voltages from the N reference multiplexers, including the M−2 selected reference multiplexers having respective outputs coupled respectively to the intermediate breakpoint voltages BP(2) to BP(M−1) from the gamma-breakpoint circuit.

11. The system of claim 10,
wherein gamma-breakpoint circuit includes polarity inversion circuitry to selectively invert the polarity of the voltages at respective endpoints of the range resistor string corresponding to positive and negative pre-defined gamma curves; and
wherein the multiple pre-defined gamma curves are for at least one of (a) red, green and blue, and (b) positive and negative inversion polarity.

12. The system of claim 8 further comprising:
M buffer amplifiers coupled to respective breakpoint DACs, to output respective buffered breakpoint voltages BP(1) to BP(M).

13. The system of claim 8, the gamma-breakpoint circuit further including
first and second inversion buffers coupled to the range resistor string respectively at first and second endpoints;
the first and second inversion buffers switched between high/low and low/high voltage outputs to invert a polarity of the voltages at the first and second endpoints.

14. The system of claim 8, wherein spacings between the reference voltage taps of the reference resistor string are selectively non-uniform, to provide programmable nonlinearity for the pre-defined gamma curve.

15. A method for use in a system with an LCD (liquid crystal display), comprising:
converting video image data into N analog gray-level gamma-adjusted source voltage signals for input to the LCD, each based on a respective one of N gamma reference voltages, and
generating the N gamma reference voltages based on at least one pre-defined gamma curve that includes the N (0 to N−1) gamma reference voltages divided into M−1 regions defined by M breakpoint voltages corresponding to M−1 segments of the gamma curve, including
generating the M breakpoint voltages designated BP(1) to BP(M) using M respective range decoders with inputs coupled to a respective subset of voltage taps of a range resistor string, where at least some of the M subsets of voltage taps overlap;
generating the N gamma reference voltages using N reference multiplexers, each to select from a respective subset of reference voltage taps of a reference resistor string,
the reference resistor string including a first end point provided by the breakpoint voltage BP(1), and a second end point provided by the breakpoint voltage BP(M),
the N reference multiplexers including M−2 selected reference multiplexers with outputs respectively couple to intermediate breakpoint voltages BP(2) to BP(M−1).

16. The method of claim 15, wherein N=64, M=4 and the M breakpoint voltages correspond to reference voltages N=0, 7, 24, 56, 63.

17. The method of claim 15, wherein N gamma reference voltages are selectively generated for each of multiple pre-defined gamma curves.

18. The method of claim 15, further comprising:
selectively inverting a polarity of the voltages at respective endpoints of the range resistor string corresponding to positive and negative pre-defined gamma curves.

19. The method of claim 18, wherein multiple pre-defined gamma curves are generated for at least one of (a) red, green and blue, and (b) positive and negative inversion polarity.

20. The method of claim 15, wherein spacings between the reference voltage taps of the reference resistor string are selectively non-uniform, to provide programmable nonlinearity for the pre-defined gamma curve.

* * * * *